United States Patent [19]
Fuller et al.

[11] Patent Number: 6,104,912
[45] Date of Patent: Aug. 15, 2000

[54] MEET-ME TELEPHONE SYSTEM WITH SUBSCRIBER NOTIFICATION FEATURE

[75] Inventors: Robert M. Fuller, Redmond; Frederick A. Epler, Issaquah; Maxwell E. Manowski, Enumclaw, all of Wash.

[73] Assignee: Aspect Telecommunications Corporation, San Jose, Calif.

[21] Appl. No.: 08/428,282

[22] Filed: Apr. 25, 1995

Related U.S. Application Data

[62] Division of application No. 08/249,453, May 26, 1994, Pat. No. 5,673,299, which is a division of application No. 07/480,242, Feb. 15, 1990, Pat. No. 5,375,161, which is a continuation-in-part of application No. 07/439,601, Nov. 21, 1989, abandoned, which is a continuation-in-part of application No. 06/841,931, Mar. 20, 1986, Pat. No. 4,893,335, which is a continuation-in-part of application No. 06/650,821, Sep. 14, 1984, abandoned.

[51] Int. Cl.[7] .................................................. H04Q 7/00
[52] U.S. Cl. ............................................................. 455/31.1
[58] Field of Search ...................... 379/57, 58, 210–212, 379/201; 340/311.1

[56] References Cited

U.S. PATENT DOCUMENTS

| | | | |
|---|---|---|---|
| Re. 32,365 | 3/1987 | Sebestyen . | |
| 3,676,603 | 7/1972 | Budrys et al. | 379/217 |
| 3,739,329 | 6/1973 | Lester | 379/201 |
| 3,963,873 | 6/1976 | Pommerening et al. . | |
| 3,997,731 | 12/1976 | Wilmot et al. | 379/201 |
| 4,054,756 | 10/1977 | Comella et al. . | |
| 4,069,397 | 1/1978 | Hashimoto | 379/77 |
| 4,277,649 | 7/1981 | Sheinbein | 379/142 |
| 4,278,844 | 7/1981 | Jones | 379/201 |
| 4,313,025 | 1/1982 | Grube, Jr. . | |
| 4,313,035 | 1/1982 | Jordan et al. | 379/211 |
| 4,371,752 | 2/1983 | Matthews et al. . | |
| 4,420,656 | 12/1983 | Freeman | 379/199 |
| 4,424,418 | 1/1984 | Moore et al. . | |
| 4,578,540 | 3/1986 | Borg et al. | 379/199 |
| 4,580,016 | 4/1986 | Williamson . | |
| 4,581,486 | 4/1986 | Matthews et al. . | |
| 4,584,434 | 4/1986 | Hashimoto | 179/100 |
| 4,585,906 | 4/1986 | Matthews et al. . | |
| 4,591,664 | 5/1986 | Freeman | 379/212 |
| 4,598,179 | 7/1986 | Clark et al. | 379/200 |
| 4,602,129 | 7/1986 | Matthews et al. . | |
| 4,608,458 | 8/1986 | Hashimoto | 179/79 |
| 4,611,094 | 9/1986 | Asmuth et al. | 379/201 |
| 4,611,096 | 9/1986 | Asmuth et al. . | |
| 4,625,081 | 11/1986 | Lotito et al. . | |
| 4,640,991 | 2/1987 | Matthews et al. . | |
| 4,642,425 | 2/1987 | Guinn, Jr. et al. . | |
| 4,652,700 | 3/1987 | Matthews et al. . | |
| 4,674,115 | 6/1987 | Kaleita et al. . | |
| 4,696,028 | 9/1987 | Morganstein et al. | 379/212 |
| 4,748,655 | 5/1988 | Thrower et al. . | |

(List continued on next page.)

FOREIGN PATENT DOCUMENTS 61-88365 of 0000 Japan .

OTHER PUBLICATIONS

Newton, "Newton's Telecom Dictionary", page 511 & 762, 1994.

"SR 19000 PBX Digital Private Branch Exchange Product Reference Guide"; Solid State Systems, Inc., Nov. 1987.

CCITT paper: Universal Personal Telecommunication Definition and Attributes, Oct. 1989.

*Primary Examiner*—William Cumming
*Attorney, Agent, or Firm*—Ladas & Parry

[57] ABSTRACT

A paging system wherein each user carries a paging device adapted to receive radio frequency signals broadcast from a central paging system with a unique identification code assigned to each paging device. Each paging device includes a radio frequency transmitter and controller for controlling the radio frequency transmitter, the controller being operable in two distinct user selectable modes, the first such mode being responsive to receiving a signal broadcast by the central paging system and responding by transmitting predetermined data back to said central paging system.

21 Claims, 55 Drawing Sheets

U.S. PATENT DOCUMENTS

| | | |
|---|---|---|
| 4,761,807 | 8/1988 | Matthews et al. . |
| 4,860,347 | 8/1989 | Costello . |
| 4,878,240 | 10/1989 | Lin et al. .................................. 379/67 |
| 4,879,743 | 11/1989 | Burke et al. . |
| 4,893,335 | 1/1990 | Fuller et al. . |
| 4,918,725 | 4/1990 | Takahashi . |
| 4,922,490 | 5/1990 | Blakley ...................................... 379/88 |
| 4,932,042 | 6/1990 | Baral et al. . |
| 4,935,958 | 6/1990 | Morganstein et al. .................. 379/201 |
| 4,942,598 | 7/1990 | Davis . |
| 4,955,047 | 9/1990 | Morganstein et al. . |
| 4,989,230 | 1/1991 | Gillig et al. . |
| 5,027,384 | 6/1991 | Morganstein . |
| 5,029,196 | 7/1991 | Morganstein ........................... 379/211 |
| 5,033,079 | 7/1991 | Catron et al. . |
| 5,036,535 | 7/1991 | Gechter et al. ......................... 379/201 |
| 5,090,051 | 2/1992 | Muppidi et al. . |
| 5,109,405 | 4/1992 | Morganstein . |
| 5,151,929 | 9/1992 | Wolf ......................................... 379/57 |
| 5,161,181 | 11/1992 | Zwick ...................................... 379/88 |
| 5,193,110 | 3/1993 | Jones et al. . |
| 5,199,062 | 3/1993 | Von Meister et al. . |
| 5,206,900 | 4/1993 | Callele . |
| 5,222,120 | 6/1993 | McLeod et al. . |
| 5,222,125 | 6/1993 | Creswall et al. . |
| 5,276,731 | 1/1994 | Arbel et al. . |
| 5,307,399 | 4/1994 | Dai et al. ................................. 379/57 |
| 5,315,636 | 5/1994 | Patel . |
| 5,327,486 | 7/1994 | Wolff et al. . |
| 5,327,489 | 7/1994 | Anderson et al. . |
| 5,384,831 | 1/1995 | Creswell et al. . |

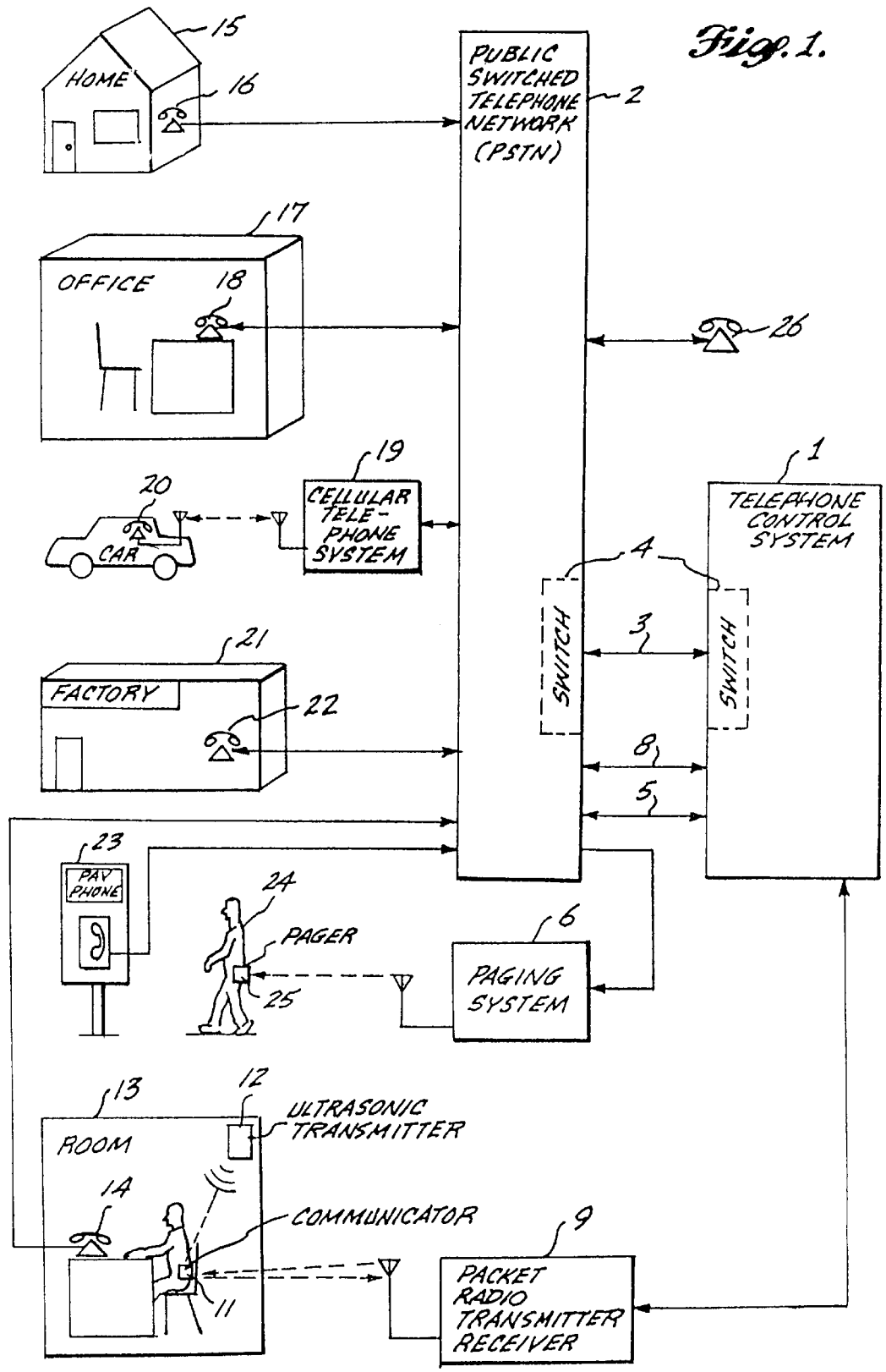

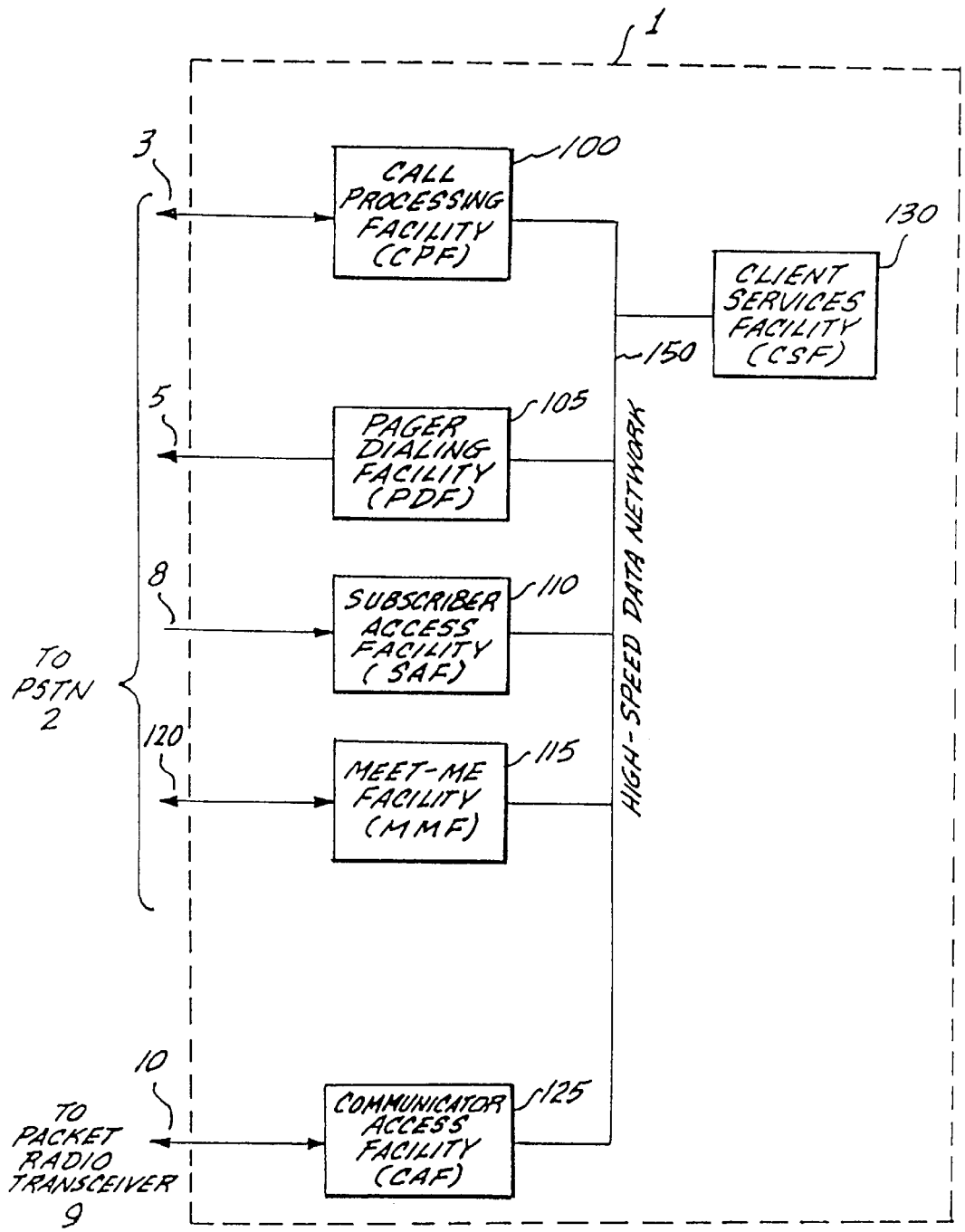

Fig. 7.

SUBSCRIBER MASTER RECORD — 700

| | |
|---|---|
| 701 | ACCESS (DID) NUMBER |
| 702 | P.I.N. CODE |
| 703 | CALL HANDLING MODE |
| 704 | STANDARD GREETING TYPE |
| 705 | OPTIONS |
| 706 | TRANSFER MESSAGE TYPE |
| 707 | TRANSFER NUMBER |
| 708 | EXTENSION NUMBER |
| 709 | MESSAGE CENTER NUMBER |
| 710 | PAGER NUMBER |
| 711 | OFFICE NUMBER |
| 712 | HOME NUMBER |
| 713 | MOBILE PHONE NUMBER |
| 714 | VIP SCREEN CODE |
| 715 | CURRENT MODE MEMORY NUMBER |
| 716 | PAGER MESSAGE CENTER DISPLAY NUMBER |
| 717 | PAGER FORWARDING DISPLAY NUMBER |
| 718 | COMMUNICATOR DYNAMIC MODE DISPLAY NUMBER |
| 719 | LAST MEET-ME ABANDON |
| 720 | LAST MEET-ME MESSAGE LEFT |
| 721 | EXTERNAL MSSG CNTR TRANSFER COUNT |
| 722 | BRANCH ROUTING - NUMBER 0 |
| | BRANCH ROUTING - NUMBER 1 |
| | ⋮ |
| | BRANCH ROUTING - NUMBER 9 |
| 723 | BRANCH ROUTING - DEFAULT NUMBER |
| 724 | FEATURE TIMER - DURATION |
| 725 | FEATURE TIMER - TERMINATION MODE |
| 726 | WEEKLY SCHEDULE - STEP 1 TIME & DATE |
| | WEEKLY SCHEDULE - STEP 1 MODE |
| | ⋮ |
| | WEEKLY SCHEDULE - STEP 32 TIME & DATE |
| | WEEKLY SCHEDULE - STEP 32 MODE |
| 727 | WEEKLY SCHEDULE - CURRENT STEP |
| 728 | WEEKLY SCHEDULE - ACTIVE |
| 729 | MULTIPLE OUTSIDE CALLS ALLOWED |
| 730 | DYNAMIC MODE ASSIGNMENT FLAG |
| 731 | CALL COUNT |

Fig. 8.
MODE MEMORY

| | |
|---|---|
| 801 — | ACCESS (DID) NUMBER |
| 802 — | MODE MEMORY NUMBER |
| | CALL HANDLING MODE |
| | OPTIONS |
| | TRANSFER MESSAGE TYPE |
| | TRANSFER NUMBER |
| | EXTENSION NUMBER |
| | MESSAGE CENTER NUMBER |
| | PAGER NUMBER |
| | VIP SCREEN CODE |
| | BRANCH ROUTING — NUMBER 0 |
| 803 — | BRANCH ROUTING — NUMBER 1 |
| | ⋮ |
| | BRANCH ROUTING — NUMBER 9 |
| | BRANCH ROUTING — DEFAULT NUMBER |
| | WEEKLY SCHEDULE — STEP 1 TIME & DATE |
| | WEEKLY SCHEDULE — STEP 1 TERM. MODE |
| | ⋮ |
| | WEEKLY SCHEDULE — STEP 32 TIME & DATE |
| | WEEKLY SCHEDULE — STEP 32 TERM. MODE |

(800 at top-right of table)

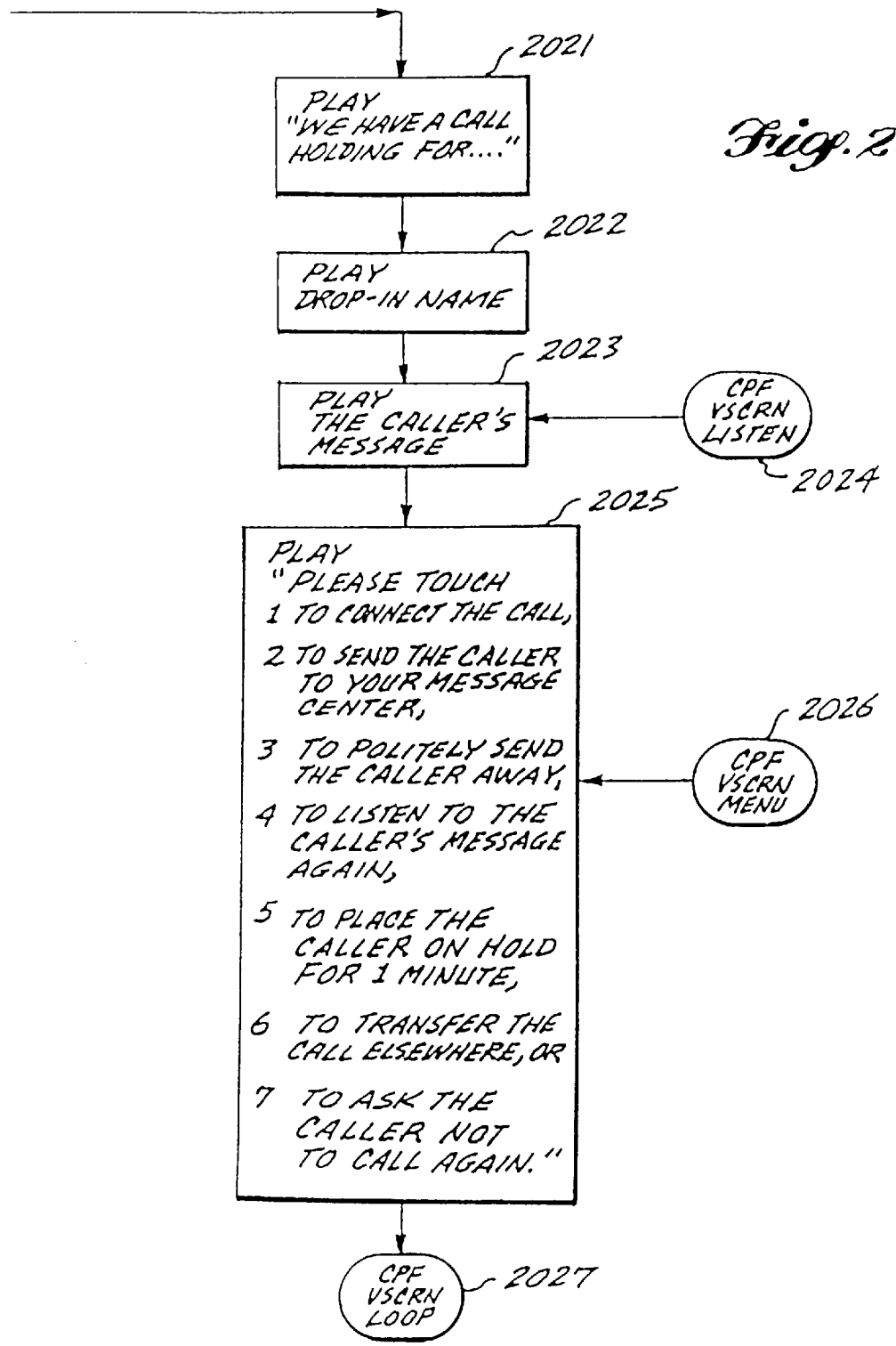

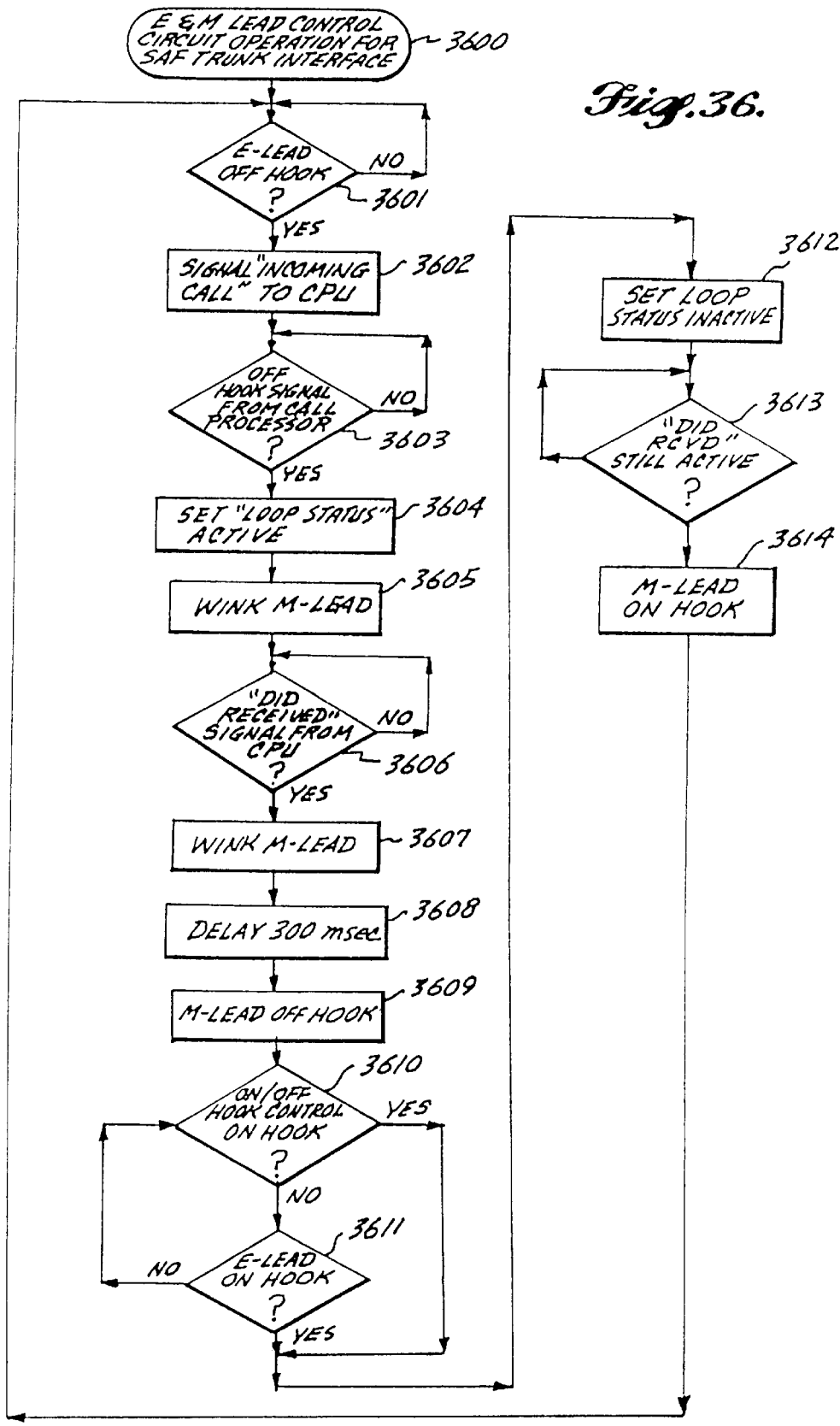

MEET-ME TELEPHONE SYSTEM WITH SUBSCRIBER NOTIFICATION FEATURE

This application is a division of application Ser. No. 08/249,453 filed May 26, 1994, now U.S. Pat. No. 5,673,299, which application is in turn is a division of application Ser. No. 07/480,242, filed Feb. 15, 1990 (now U.S. Pat. No. 5,375,161, issued Dec. 20, 1994), which is a continuation-in-part of application Ser. No. 07/439,601, filed Nov. 21, 1989 (now abandoned), which is a continuation-in-part of application Ser. No. 06/841,931, filed Mar. 20, 1986 (now U.S. Pat. No. 4,893,335, issued Jan. 9, 1990), which is a continuation-in-part of application Ser. No. 06/650,821, filed Sep. 14, 1984 (now abandoned).

INCORPORATION BY REFERENCE

The subject matter disclosed and claimed in copending and allowed U.S. application Ser. No. 06/841,931, entitled "Remote Access Telephone Control System", invented by the same inventors and assigned to the same assignee as the instant application, is hereby incorporated by reference.

BACKGROUND OF THE INVENTION

The present invention pertains to the telephone equipment art and, more particularly, to a telephone control system which allows subscribers to remotely control a plurality of call handling utilities to predeterminedly direct incoming calls.

Despite the availability of numerous telephone central exchange provided functions, such as "call-forwarding", "three-way calling", "call-waiting" and "speed-dialing", as well as the advent and availability of paging and mobile telephone systems, the completion of a call to a system subscriber can often be a complicated, time consuming and tedious task. Unless the telephone subscriber is located at the telephone which receives calls to his assigned phone number, completion of a call from a calling party, despite the aforementioned services, generally involves the calling party leaving a message and awaiting a call back by the subscriber. Even if the subscriber is accessible via mobile telephone or a paging system, human intervention is commonly required to look up and dial specific mobile telephone or paging numbers to attempt to contact the subscriber. Thus, additional delays and costs are incurred.

In addition, even if the subscriber is on a paging system, the successful direction of a message to the subscriber requires that the subscriber manually inform the system of his whereabouts.

Finally, existing telephone control systems offer very limited control to either the subscriber or the calling party with respect to the processing of calls.

SUMMARY OF THE INVENTION

This invention relates generally to a telecommunications system that provides communications services to a number of subscribers. The subscribers can carry pagers and thus be informed when another party has telephoned them.

The telecommunications system of the present invention includes a control system which is connected to a telephone exchange and where each user or subscriber of the system is assigned a unique telephone number. The telecommunications system routes calls to the user via their unique telephone number. The control system includes a message center where messages can be left for later pick up by the subscriber.

In accordance with a one feature of the invention, the control system may handle calls by a "meet-me" mode in which the caller is placed on hold while the control system pages the called subscriber. At first, the caller hears normal call processing sounds (preferably conventionally sounding ringback tones) which are generated by the control system while the page is being generated. This is a useful feature of the invention in that the page can be initiated while the caller is still hearing audible ringback tones. Because the caller must wait for a subscriber to get to a telephone when being paged, the playing ringback tones to the caller initially (while the page is underway) has the effect of reducing the delay perceived by the caller. After the control signal has played audible ringback tones to the caller for a predetermined period of time, the caller may then be advised (for the first time) that the subscriber is being paged to a telephone.

In response to the page, the subscriber dials the control system and the control system, upon recognizing the new incoming call as being from the subscriber, the subscriber is advised that they have a meet-me call waiting and if the subscriber elects to take the meet-me call, a prompt is played to the subscriber just before being placed in telecommunication with the caller.

BRIEF DESCRIPTION OF THE DRAWINGS

FIG. 1 is a block diagram illustrating the various modes of operation and interfacing equipment for the preferred embodiment of the telephone control system;

FIG. 2 is a block diagram illustrating the principle components of the telephone control system;

FIG. 7 is a diagram illustrating the Subscriber Master Record;

FIG. 8 is a diagram illustrating the Mode Memory;

FIGS. 20a, 20a-1, 20b and 20c form a flowchart of the Call Processing Facility—Voice-Screen Function;

FIG. 36 is a flowchart illustrating operation of the E & M Control Circuit for the Subscriber Access Facility;

FIGS. 37a, 37b and 37b-1 form a flowchart of the Subscriber Access Facility Main Task;

SPECIFICATION

Overview

Figure 37A:
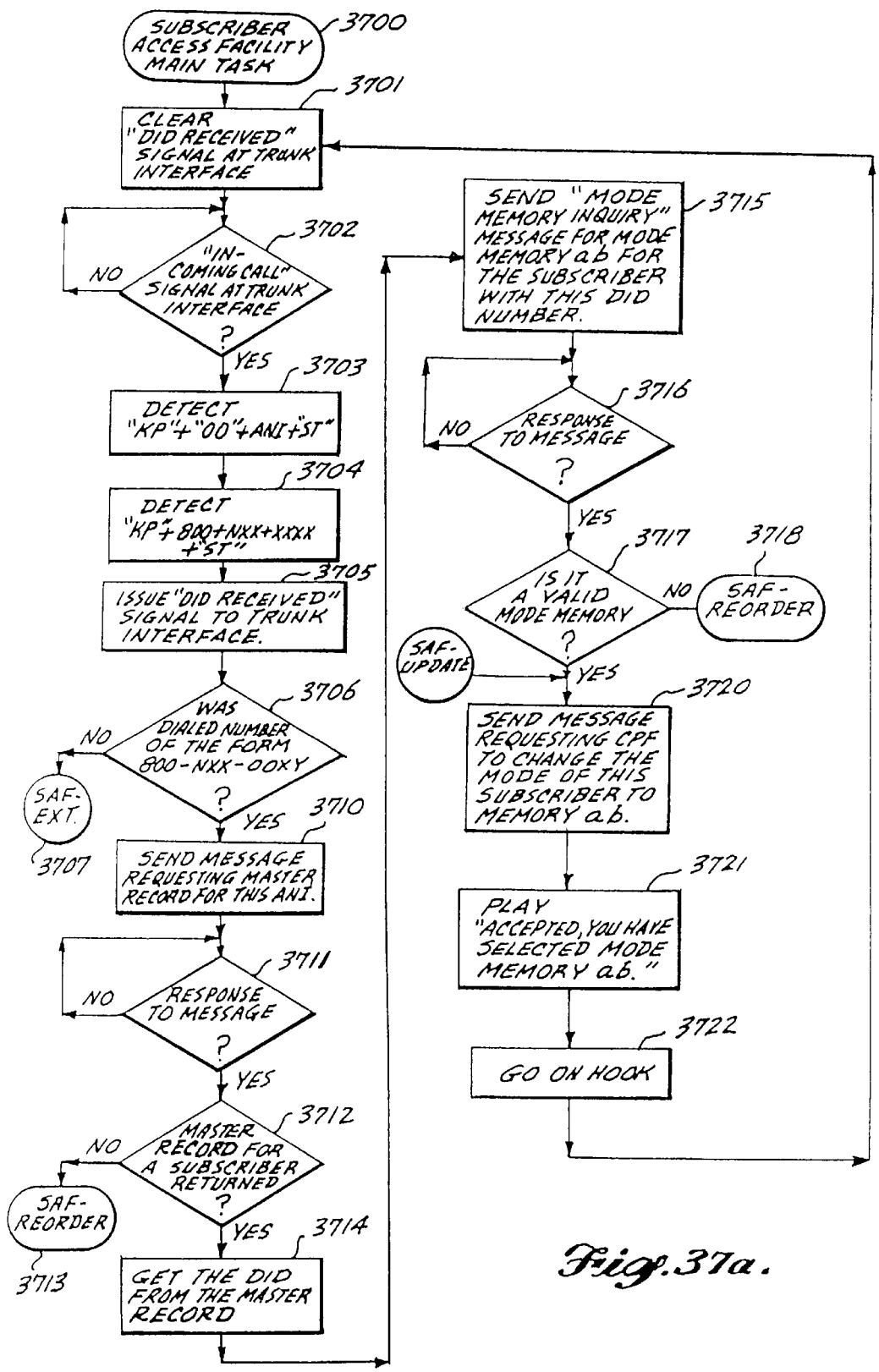
Figure 37B:
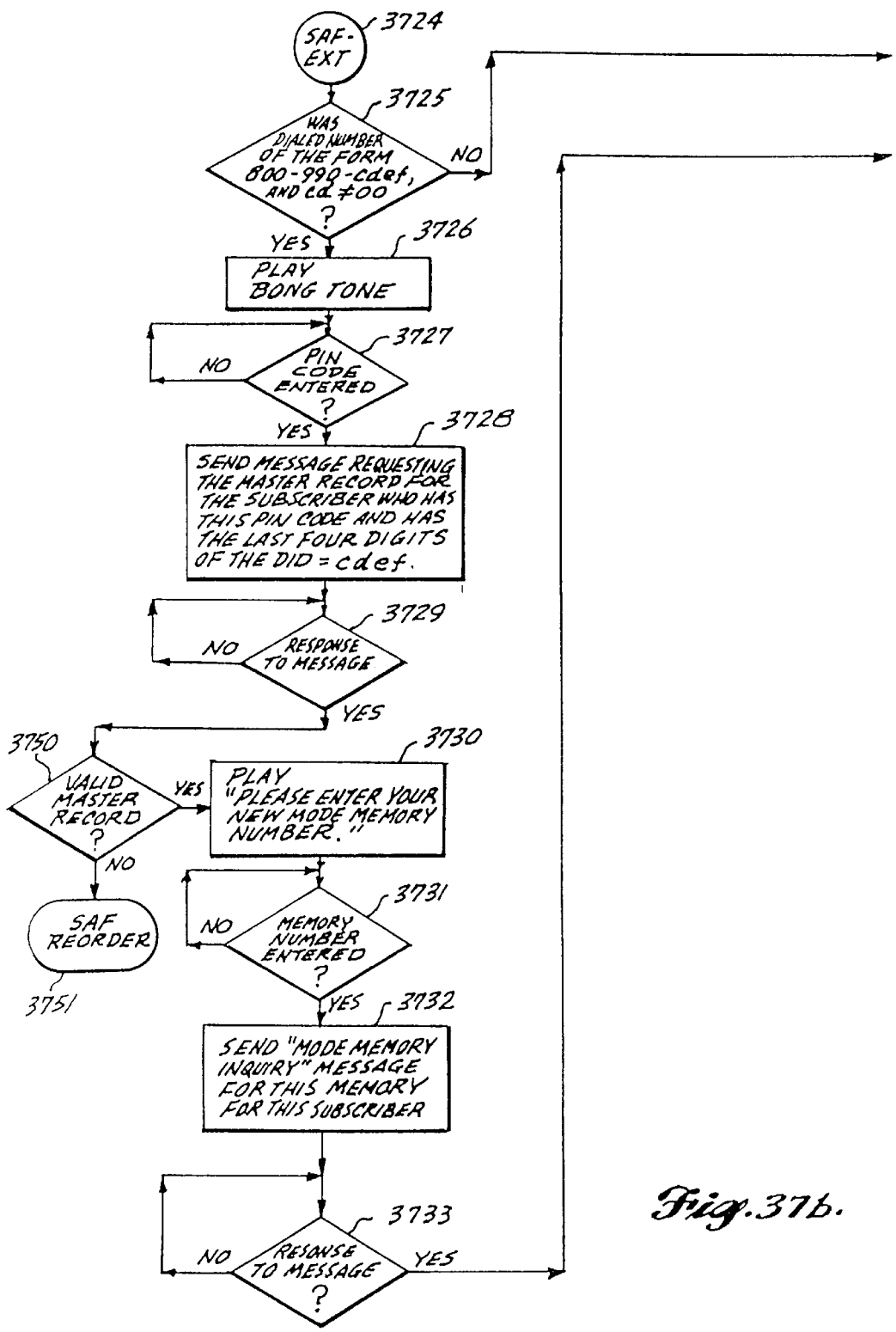
Figures 1, 37B:
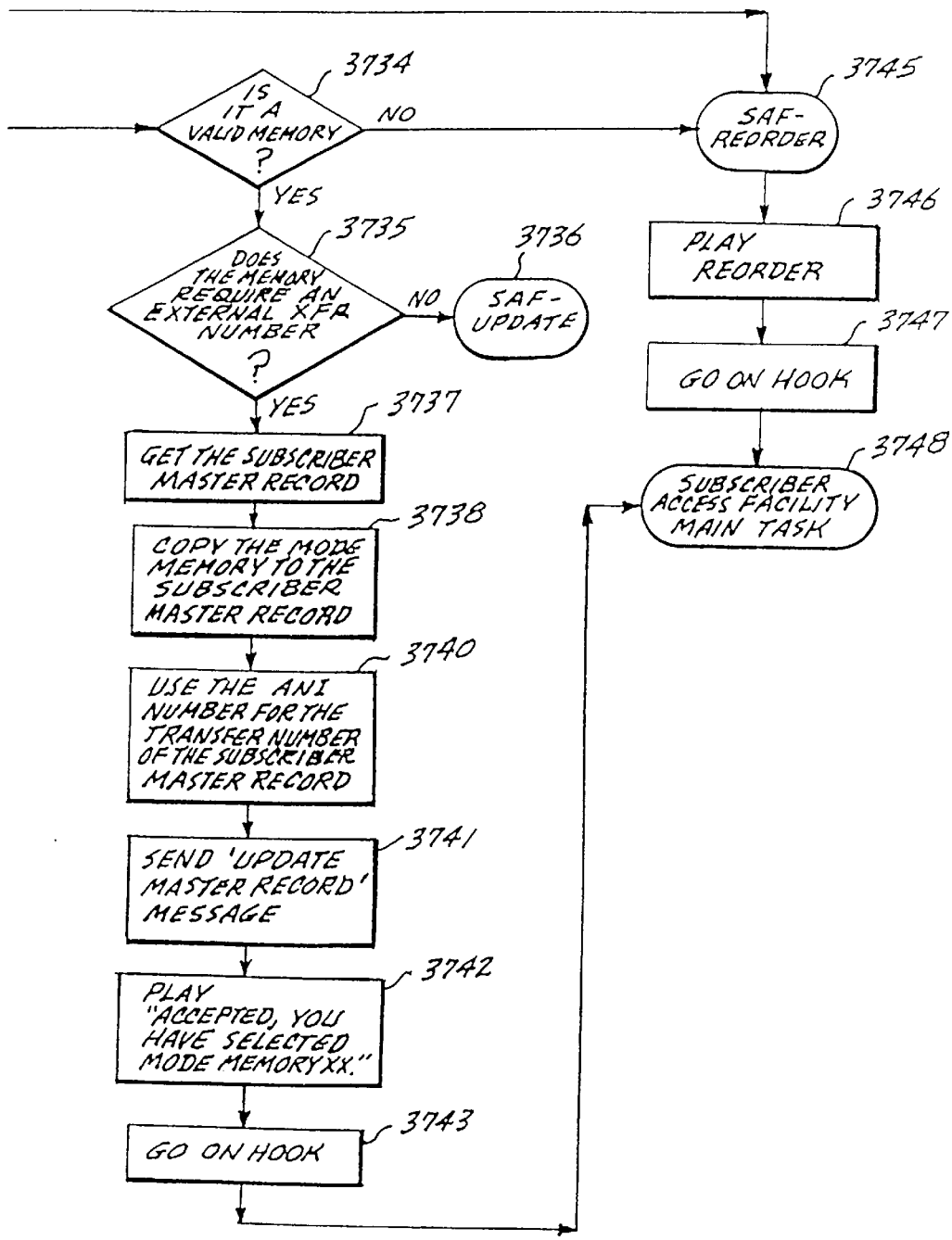

FIG. 1 illustrates in block diagram form, the manner in which the Telephone Control System may be used to enhance the accessibility of it's subscribers. As is shown, the Telephone Control System 1 connects with the PSTN 2 via facilities 3. The Telephone Control System 1 may control switch 4, causing it to connect incoming and outgoing trunks.

As is shown, alternate preferred embodiments exist with respect to switch 4.

In the first preferred embodiment, the switch 4 is actually part of the PSTN 1. In this embodiment, the facilities 3 must be capable of transmitting switch control signals from the Telephone Control System 1 to the switch 4. An example of this type of facility is a CENTREX line, which allows the transmission of switch control signals in the form of 'hook-switch flashes' and touch tones to initiate call-conferencing and call-transfer. A recently available variation of the CENTREX facility is a CENTREX DID trunk, which not only has the 'hookflash' capability, but also provides the called number in the form of Direct-Inward-Dialing digits. This is the form of facility 3 which is referred to in the detailed description of the preferred embodiment. Another variation of the CENTREX facility provides the called number via a separate data-link known as Simplified Message Desk Interface (SMDI).

Copending U.S. application Ser. No. 06/841,931, which issued Jan. 9, 1990, as U.S. Pat. No. 4,893,335, incorporated by reference herein, describes in detail a system for controlling the PSTN switch.

In an alternate preferred embodiment, the switch 4 is part of the Telephone Control System 1. In this embodiment, the facilities 3 need only include standard DID trunks for the incoming calls, and standard outgoing trunks. The access control system 1 controls switch 4 directly, causing it to connect paths between various incoming and outgoing trunks as required.

Again referring to FIG. 1, the Telephone Control System 1 also connects to the PSTN 2 via standard tip-ring phone lines 5, for purposes of communicating with Paging System 6. The Paging System may be any of the commonly known paging systems such as those comprised of transmitters such as Motorola's PACE or Quintron model QT250B and paging terminals such as Glenayre model GL3000XL or BBL System 3, which send encoded messages via radio frequency to cause a unique pager, or beeper, worn by a paging system subscriber, to sound an alert, produce a message in a display, activate a light, vibrate, or produce any of a variety of other alerting mechanisms. Typically, these paging systems will cause a pager to be alerted in response to another individual dialing a phone number which corresponds to that individual's pager. This phone number is routed via the PSTN 2 to a paging terminal via facilities 7, which in turn determines, typically via DID digits, who the call is intended for, and then sends a radio frequency message to alert that individual's pager. To cause a subscriber's pager to be activated, the Telephone Control System 1 then need only come off hook on one of the lines 5, and dial the phone number that corresponds to the subscriber's pager. Although not described in this preferred embodiment, it is anticipated that the Telephone Control System 1 could also interface to a paging system directly via a dedicated data link.

An additional facility 5 connects the Telephone Control System 1 to the PSTN 2. This facility is a trunk which provides the Automatic Number Identification (ANI) of the calling party. An example of such a trunk is the Feature Group D (FGD) trunk which is commonly used by interexchange carriers. The interexchange carriers use the ANI information to properly bill the calling party. The Telephone Control System 1 uses this ANI information in a new and different manner. As will be described in further detail herein, subscribers of the Telephone Control System 1 may program the Telephone Control System 1 by calling it through trunking facilities 5. The access control system 1 automatically acquires the ANI, or phone number of the calling party. This allows the access control system 1 to program the forwarding number for the subscriber without the subscriber needing to manually enter it. Although not described in the preferred embodiment, it is anticipated that other types of facilities which provide ANI information may also be used for this purpose. An example of another type of facility which provides ANI is a CENTREX line with an SMDI data link, which is now available from several types of central offices. The SMDI data link is capable of passing both the called party number and the calling party number (ANI).

Still referring to FIG. 1, The Telephone Control System 1 is also connected to a Packet Radio Transmitter/Receiver 9 via data-link 10. The Packet Radio Transmitter/Receiver 9 may consist of any of the commonly known radio transceivers such as YAESU FT-470 and ICOM IC-u 4AT, equipped with a packet radio interface such as HEATHKIT HK-21. As will be described in further detail herein, the Packet Radio Transmitter/Receiver 9 is used by the Telephone Control System 1 to interface with the portable Communicator device 11, carried by an Telephone Control System subscriber. The Communicator 11 may both send and receive DATA messages via radio frequency. The Communicator 11 may also receive ultrasonic messages from fixed ultrasonic transmitter 12, shown located in room 13. Ultrasonic transmitter 12 continuously transmits the phone number, and, if appropriate, the extension, of the phone 14 located in the same room or a signal indicating an appropriate call control mode for a given situation such as do not disturb in a hospital operating room. It should be noted that, although the preferred embodiment disclosed herein describes transmitter 12 as ultrasonic, it is anticipated that an infrared transmitter may also be used. The ultrasonic transmitter has the advantage that it will pass signals through a layer of clothes, which would be important for example if the subscriber were carrying the Communicator 11 in a shirt pocket.

To aide in the discussion of the illustrative examples which follow, FIG. 1 also shows a subscriber's home 15, with a home phone 16; a subscriber's office 17, with an office phone 18; a cellular telephone system 19, which interfaces to a subscriber's car-phone 20; a factory 21, with a factory phone 22; a pay telephone 23; a subscriber 24 with pager 25; and a caller's telephone 26.

The illustrative examples which follow are intended only to clarify some of the concepts, features, and objects of the invention, and do not define the scope of the invention. In the examples, the greetings include the phrase "ACCESSLINE". It should be understood that the phrase "ACCESSLINE" is a registered trademark of AccessLine Technologies, Inc., and therefore those practicing the present invention will need to select alternate terminology if they are not licensed to use that phrase.

Methods of Call-Handling

Following are several illustrative examples of the various call-handling modes of the Telephone Control System 1.

Direct Forwarding

For the sake of this example, assume that a caller at phone 26 wishes to speak to a subscriber to the access control system 1, and further assume that the subscriber is at home 15, and that he has preprogrammed the system to 'direct forward' his calls to him at his home phone 16. The caller dials the, access number for the subscriber, and the PSTN delivers the call to the Telephone Control System 1 via facilities 3. The facilities 3 provide the access control system 1 with the called party information (DID) digits. The Telephone Control System then refers to it's internal database to determine how to handle the call. The access control system determines that calls for this subscriber are to be handled via 'direct forwarding' mode, and that the call is to be forwarded to the subscriber's home. The access control system then dials the subscriber's home on an outgoing facility 3, and instructs the switch 4 to connect the incoming facility to the outgoing facility to complete the call. The PSTN 2 then delivers the call to home phone 16, causing it to ring, and the subscriber may pick up the phone and connect to the caller. Note that this mode of call-handling is referred to as 'direct forwarding' because the call is forwarded without any announcement or prompting from the Telephone Control System 1.

Announced Forwarding

Assume again that a caller at phone 26 wishes to speak to a subscriber to the Telephone Control System 1. Also assume that the subscriber is at home 15, and that this time he has preprogrammed the system to 'Announce-forward' his calls to him at his home phone 16. Again, the caller dials the access number for the subscriber, and the PSTN delivers the call to the Telephone Control System 1 via facilities 3. Upon receiving the DID digits for this subscriber, the Telephone Control System 1 determines that calls for this subscriber are to be handled via 'announced forwarding' mode, and that the call is to be forwarded to the subscriber's home. The access control system then plays a brief greeting to the caller: "Hello, you have reached the ACCESSLINE for Mr. Jones. We're connecting your call." The Telephone Control System then dials the phone number for phone 16 on an outgoing facility 3, and instructs the switch 4 to connect the incoming facility to the outgoing facility to complete the call. The PSTN 2 then delivers the call to home phone 16, causing it to ring, and the subscriber may pick up the phone and connect to the caller.

Forwarding with Page

Assume again that a caller at phone 26 wishes to speak to a subscriber to the Telephone Control System 1. Also assume again that the subscriber is at home 15, and that this time he has preprogrammed the system to 'Forward with page' his calls to him at his home phone 16. Again, the caller dials the access number for the subscriber, and the PSTN delivers the call to the Telephone Control System 1 via facilities 3. Upon receiving the DID digits for this subscriber, the access control system 1 determines that calls for this subscriber are to be handled via 'forward with page' mode, and that the call is to be forwarded to the subscriber's home. The access control system then plays a brief greeting to the caller: "Hello, you have reached the ACCESSLINE for Mr. Jones. We are sending a page to inform your party of the call. Please stay on the line." The Telephone Control System 1 then dials the phone number for the pager corresponding to this subscriber and informs the caller "We have sent a page to alert your party and will connect you momentarily." The access control system then dials the phone number for phone 16 on an outgoing facility 3, and instructs the switch 4 to connect the incoming facility to the outgoing facility to complete the call. The PSTN 2 then delivers the call to home phone 16, causing it to ring, and the subscriber may pick up the phone and connect to the caller. The subscriber, having been alerted to the incoming call by his pager, was ready to receive it.

Message Center

In some cases the subscriber may not be able to take calls and may wish that his callers simply leave a message. In these cases, the subscriber may program the access control system 1 to connect calls to the subscriber's preselected 'message center'. The Telephone Control System 1 may connect calls to either an 'internal message center' or an 'external message center'. The 'external message center' is simply a phone number that the Telephone Control system 1 will forward calls to if in this mode. This may be the phone number for an answering service, a receptionist, a voice mail system, or any other appropriate location as desired by the subscriber. If the subscriber elects to use the 'internal message center', then an example of a typical call may be as follows.

Assume that a caller at phone 26 wishes to speak to a subscriber to the Telephone Control System 1. Also assume that the subscriber does not wish to be disturbed and that he has preprogrammed the system to 'internal message center' mode. The caller dials the access number for the subscriber, and the PSTN delivers the call to the Telephone Control System 1 via facilities 3. Upon receiving the DID digits for this subscriber, the Telephone Control System 1 determines that calls for this subscriber are to be handled via 'internal message center' mode. The Telephone Control System then plays a brief greeting to the caller: "Hello, you have reached the **\*\*ACCESSLINE\*\* for Mr. Jones. Your party is not readily available at the moment, however we will connect you to your party's message center where you may leave a detailed message . . . Please leave your message at the tone." The Telephone Control System 1 then records the callers message and saves it for later playback by the subscriber. In addition, should the subscriber have so elected, the access control system 1** may dial the phone number corresponding to the subscriber's pager, to alert the subscriber to the message.

Priority-Call Screening

Assume again that a caller at phone 26 wishes to speak to a subscriber to the Telephone Control System 1. This time assume that the subscriber is at his office 17, and that he has preprogrammed the system to send his calls to him at his office via 'priority call-screening', with a message asking the caller to ask for extension 123, which in this example is the extension number of the phone 18 on his desk. Again, the caller at phone 26 dials the access number for the subscriber, and the PSTN 2 delivers the call to the access control system 1 via facilities 3. Upon receiving the DID digits for this subscriber, the Telephone Control System 1 determines that calls for this subscriber are to be handled via 'priority call-screening' mode, and that the call is to be forwarded to the subscriber's office. The access control system 1 then plays a brief greeting to the caller: "Hello, you have reached the **\*\*ACCESSLINE\*\* for Mr. Jones. Your party is not readily available at the moment. If this call is urgent then please touch 0 now and we will attempt to connect you to your party. Otherwise, please hold the line and we will connect you to your party's message center where you may leave a detailed message." If the caller does not touch 0, then the call is delivered to the 'message center' as described above. If the caller does touch 0, then the Telephone Control System 1 may inform the caller: "Please standby while we connect your call. When the call is answered please ask for extension number 123." The access control system then dials the preprogrammed lead phone number for the subscriber's office 17 on an outgoing facility 3, and instructs the switch 4 to connect the incoming facility to the outgoing facility to complete the call. The PSTN 2 then delivers the call to the receptionist at office 17, causing it to ring. When the receptionist answers, the caller will ask for extension 123, as he was instructed by access control system 1, and the receptionist may connect the call to the subscriber's desk phone 18**.

VIP Code Screening

Assume again that a caller at phone 26 wishes to speak to a subscriber to the Telephone Control System 1. This time assume that the subscriber is in his car, and that he has preprogrammed the system to send his calls to him at his car-phone 20 via 'VIP code-screening'. In this mode, only those callers who have been told a special VIP code will be able to reach the subscriber. All other callers will be sent to the message center. Again, the caller at phone 26 dials the access number for the subscriber, and the PSTN 2 delivers the call to the Telephone Control System 1 via facilities 3. Upon receiving the DID digits for this subscriber, the access control system 1 determines that calls for this subscriber are to be handled via 'VIP code-screening' mode, and that the call is to be forwarded to the subscriber's car phone 20. The Telephone Control System 1 then plays a brief greeting to the caller: "Hello, you have reached the **\*\*ACCESSLINE\*\* for Mr. Jones. Your party is not readily available at the moment. Please enter your VIP code now, or hold the line and we will connect you to your party's message center where you may leave a detailed message." If the caller does not enter the correct VIP code, then the call is delivered to the 'message center' as described above. If the caller does enter the VIP code, then the Telephone Control System 1 may inform the caller: "Please standby while we connect your call." The Telephone Control System then dials the telephone number for car-phone 20 on an outgoing facility 3, and instructs the switch 4 to connect the incoming facility to the outgoing facility to complete the call. The PSTN 2 then delivers the call to the cellular telephone system 19, which in turn delivers the call to the car-phone 20**.

Voice-Screening

Assume again that a caller at phone 26 wishes to speak to a subscriber of the Telephone Control System 1. This time assume that the subscriber, Mr. Jones, is visiting his client's factory 21, and that he has preprogrammed the system to send his calls to him at this location via 'voice-screening'. Again, the caller at phone 26 dials the access number for the subscriber, and the PSTN 2 delivers the call to the access control system 1 via facilities 3. Upon receiving the DID digits for this subscriber, the Telephone Control System 1 determines that calls for this subscriber are to be handled via 'voice-screening' mode, and that the call is to be forwarded to his client's factory 21. The access control system 1 then plays a brief greeting to the caller: "Hello, you have reached the **\*\*ACCESSLINE\*\* for Mr. Jones. Please state your name and the purpose of your call at the tone. After the tone, please stay on the line while we attempt to locate your party and connect your call." The access control system 1 then records the caller's name and business, and then responds: "Thank you, please standby." The access control system then dials the telephone number for factory 21 on an outgoing facility 3, leaving the incoming call on hold. The PSTN 2 then delivers the outgoing call to the lead telephone number of factory 21, which is answered by the factory's receptionist. The Telephone Control System tells the receptionist "We have a call holding for Mr. Jones. Please locate the party." The receptionist pages Mr. Jones via the factory's speaker system, informing him of the call. Mr. Jones then answers the call at phone 22, and enters his Personal Identification Number (PIN) code. The access control system 1 then plays back the callers name and business. The Telephone Control System 1 then asks Mr. Jones: "Please touch 1 to connect the call, 2 to send the-caller away, or 3 to send the caller to your message center." In this example, Mr. Jones wishes to speak to the caller, so he touches 1. The Telephone Control System 1 instructs the switch 4** to connect the incoming facility to the outgoing facility to complete the call.

Branch-Routing

Assume again that a caller at phone 26 wishes to speak to a subscriber of the Telephone Control System 1. This time assume that the subscriber is not a person, but a business; the ABC Factory Company 21, and that the Telephone Control System 1 has been preprogrammed to handle their calls via 'branch-routing' mode. Again, the caller at phone 26 dials the access number for the subscriber, and the PSTN 2 delivers the call to the Telephone Control System 1 via facilities 3. Upon receiving the DID digits for this subscriber, the Telephone Control System 1 determines that calls for this subscriber are to be handled via 'branch-routing' mode. The Telephone Control System 1 then refers to it's memory and plays a pre-recorded 'branch-routing' greeting to the caller: "Hello, you have reached the ABC Factory Company. Please touch 1 to speak to the manufacturing manager, 2 to speak to accounts receivable, 3 to speak to accounts payable, 4 to speak to purchasing, or hold the line to speak to the receptionist." Should the caller need help, he will hold the line for a moment, and the Telephone Control System 1 responds: "Please standby." The Telephone Control System then dials the telephone number for the factory's reception phone 22 on an outgoing facility 3, and instructs the switch 4 to connect the incoming facility to the outgoing facility to complete the call.

Meet-Me

Assume again that a caller at phone 26 wishes to speak to a subscriber to the Telephone Control System 1. This time assume that the subscriber, Mr. Jones, is away from the office today, and that he has preprogrammed the system to handle his calls via 'meet-me' mode. Again, the caller at phone 26 dials the access number for the subscriber, and the PSTN 2 delivers the call to the Telephone Control System 1 via facilities 3. Upon receiving the DID digits for this subscriber, the Telephone Control System 1 determines that calls for this subscriber are to be handled via 'meet-me' mode. The Telephone Control System 1 then responds by producing audible ringback to the caller, while dialing the phone number for the pager corresponding to this subscriber on facilities 5. The Telephone Control System 1 then plays a brief message to the caller: "Hello, you have reached the \*\*ACCESSLINE\*\* for Mr. Jones. We are paging your party to a phone, please standby. If you are unable to wait you may touch 9 to leave a message. Otherwise please hold the line." The Telephone Control System 1 then places the caller on hold and waits for the subscriber to call in. Meanwhile the subscriber 24 has received the page via his pager 25, and is proceeding to pay phone 23 to answer the call. The subscriber dials his own access number and the PSTN 2 delivers the call to the Telephone Control System 1 via facilities 3. The subscriber then enters his own PIN code and is informed "You have a caller holding for you on your meet-me service. Please touch 4 to be connected to the caller." It is also anticipated that if the caller had hung up or left a message in the meantime, that the subscriber would be so informed. Assuming that the caller is still holding, and that the subscriber touches 4, the access control system 1 instructs the switch 4 to connect the incoming facility to the outgoing facility to complete the call.

Methods of Programming

Although various methods of 'remotely programmable call forwarding' have been attempted in the prior art, these have proven to have limited widespread appeal due to the complicated and inflexible methods by which the users were required to program the systems. By contrast, the access control system employs a variety of different methods to allow the subscriber to easily and effectively program the operation of the Telephone Control System. Following are several illustrative examples of the various methods a subscriber may employ to program the Telephone Control System 1.

Command Mode

To use the Command Mode method of programming, the subscriber simply dials his own access number from any telephone, and enters his PIN code. The PSTN 2 delivers the call to the Telephone Control System 1 via facilities 3. The Telephone Control System 1 then informs the caller of the current feature which is selected, and then provides the subscriber with a simple menu of options by which he can choose a new feature. For example, in response to the entry of the PIN code, the subscriber may be prompted: "Hello Mr. Jones. Your calls are currently being VIP code screened to your office. Touch 1 to check messages, 2 to change your forwarding number, 3 to select a memory, 8 for advanced features, 9 to make a call, or touch 0 for help." The subscriber may then make his desired selection. Please note that although the preferred embodiment herein discusses the use of touch tone as the signalling method by which the subscriber controls the Command Mode of the access control system, the inventors anticipate that other signalling methods may also be employed, including, but not limited to, rotary dial pulse detection and voice recognition.

Another feature of the Telephone Control System Command Mode allows the subscriber to program 'mode memories' which contain the most often used call handling methods for that subscriber. For example, a subscriber may program memory 10 to be announced forwarding to his office, memory 20 to be voice screened forwarding to his home, memory 30 to be message center mode, and so forth.

Weekly Schedule

Subscribers who have some routine to their weekly activities may soon grow weary of constantly calling the Telephone Control System and selecting the same call handling methods at the same time, day after day. For this reason, the weekly schedule feature provides a very real benefit to the subscriber. As an example, let us assume that a subscriber, Mr. Jones, starts work at 8:00 AM every morning, and leaves for home at 5:00 PM in the evening. Let us further assume that he takes an hour for lunch from 12:00 to 1:00 PM each day. The weekly schedule for this subscriber might be pre-programmed into the Telephone Control System's database to be:

| DAY | TIME | MODE MEMORY | FEATURE |
| --- | --- | --- | --- |
| Mon-Fri | 7:30 am | 30 | Message Center |
| Mon-Fri | 8:00 am | 10 | Announced forwarding to office |
| Mon-Fri | 12:00 noon | 30 | Message center |
| Mon-Fri | 1:00 pm | 10 | Announced forwarding to office |
| Mon-Fri | 5:00 pm | 20 | Voice screen forwarding to home |

As calls are received by the Telephone Control System for this subscriber, the Telephone Control System 1 refers to this database and determines the correct call handling method for the day of week and time of day, and delivers the call accordingly.

Another feature of the weekly schedule allows the subscriber to override the weekly schedule should his schedule deviate from the preprogrammed sequence. In this way the subscriber can move freely about his routine activites, and only he needs to program the access control system should his schedule change from the normal.

Feature Timer

To illustrate the use of the Feature Timer capability of the Telephone Control System, assume that a subscriber is visiting a client's office for a one hour appointment, and wishes to have his calls forwarded to him at this location during that time. He may use the Command Mode as described above to select announced forwarding mode and change the forwarding number to be the telephone number of his client's phone. When he leaves he intends to change the the call handling mode back to his message center. However, if the subscriber forgets to call the Telephone Control System as he is leaving the client's office, then the client may still continue to receive calls intended for the subscriber. To overcome this problem, the subscriber may have instead used the Feature Timer function when he first called the access control system when he got to the client's office. In this example, the subscriber could have called the access control system, and used Command Mode to select announced forwarding to his client's office. However, instead of hanging up at that point, he could have activated the Feature Timer, programming it to maintain the current mode for one hour and then automatically change the call handling mode to message center mode. In this way, the subscriber would not have to remember to call the Telephone Control System as he leaves the client's office, and the client would not be bothered with the subscriber's calls after he left.

Programming a Forwarding Number Using ANI

One difficulty in prior art implementations of remotely programmable call forwarding devices, is that it takes quite a few digits for the user to call the system, enter an access code, and then enter the forwarding number. One means by which the invention described herein overcomes this difficulty is by employing special trunks which provide the called party number, also referred to as ANI. To see how this improves the ease of programming, consider the following example. Assume that the subscriber is visiting factory 21, and that this is a location that he does not visit regularly, and therefore does not have it's telephone number preprogrammed into the Telephone Control System 1. Further assume, as was discussed earlier, that the access control system 1 is connected to the PSTN with Feature Group D trunks 8 which provide ANI, and which can be reached by dialing an 800 number. To cause his calls to get to him at the factory 21, the subscriber in this example would pick up telephone 22 and dial the 800 number which corresponds to the Feature Group D trunk. The PSTN 2 would deliver the call to the Telephone Control System 1 and the Telephone Control System 1 would receive the ANI information digits containing the telephone number of telephone 22. The subscriber then need only enter his PIN code and the call handling feature memory he wishes to use, which might be memory 40, announced forwarding. The subscriber could then hang up and the Telephone Control System 1 would program the database to send all calls for that subscriber to telephone 22 via announced forwarding. As should be obvious, the sequence of digits entered by the subscriber was shorter than if he had to actually enter the phone number. It should also be pointed out that another advantage of this method of programming is that the same sequence of digits is used to program the system each time. In other words, if the subscriber went to another location and wanted his calls to be sent to him via announced forwarding, he could pick up a phone and dial the exact same sequence of digits as was described above. This makes the programming of the Telephone Control System less demanding on the subscriber since he only has to memorize one sequence to accomplish this function. It is also anticipated by the inventors that a subscriber to this service may employ a 'pocket dialer' preprogrammed with this fixed digit sequence, thereby even further simplifying the ease of programming.

Programming the Telephone Control System Using Speed Calling and ANI

A well known service offered by many telephone companies is 'Speed Calling'. This service allows users to preprogram often used telephone numbers into memories which can be recalled by dialing a one, two, or three digit code. To see how subscribers can use this service to improve the ease of programming the Telephone Control System, consider the following example. Assume that an Telephone Control System-subscriber, who lives at home 15, has preprogrammed the access control system with his home phone number 16. Let us further assume, as was discussed earlier, that the Telephone Control System 1 is connected to the PSTN 2 with Feature Group D trunks 8 which provide ANI, and which can be reached by dialing an 800 number, and assume further that an entire 800-NNX has been dedicated to this trunk group, in this example 800-999-XXXX. By this invention, the last four digits of the 800 number will be used to signify the mode memory which is being selected. In this example, also assume that the subscriber has preprogrammed his telco speed dialing feature so that the sequence 2# causes the telephone number 1-800-999-0010 to be dialed, and that the sequence 3# causes the telephone number 1-800-999-0011 to be dialed. In this example, when the subscriber picks up telephone 16 and dials 2#, the speed dialing feature will cause the number 1-800-999-0010 to be dialed. The PSTN 2 will deliver the call to the access control system 1 via Feature Group D trunks 8. The access control system 1 will receive the ANI digits, and referring to it's database recognize the call as originating at the home telephone of one of it's subscribers. It then will invoke the preprogrammed mode memory 10 for that subscriber, which in this example might be voice-screened forwarding to his home phone. As a further example, if the subscriber had dialed 3#, the Telephone Control System 1 would have invoked memory 11 for that subscriber.

Communicator

As described earlier, the Communicator is a portable device carried on the subscriber's person. This example demonstrates some of the ways by which the Communicator can simplify the call handling and programming operations for the Telephone Control System subscriber. Still referring to FIG. 1, assume that the subscriber is carrying a communicator 11 on his belt, and that he has just entered room 13. Also assume that he has selected the 'automatic phone number' mode of operation for the Communicator 11. When he enters the room, the Communicator 11 detects a signal from the fixed ultrasonic transmitter 12 located near the ceiling. This signal is decoded by the Communicator 11 and is determined to contain a phone number, which in this example happens to correspond to the phone instrument 14 located in the same room 13. Upon receipt of the ultrasonic signal, the Communicator 11 transmits a brief packet message via radio frequency. This message contains the subscriber's access number and the phone number just received form the ultrasonic transmitter 12. This radio frequency message is detected by packet radio transceiver 9 and passed on to the access control system 1 via data link 10. The Telephone Control System 1 then changes the forwarding number for this subscriber to be the new number.

Assume now that a caller at phone 26 wishes to speak to this subscriber. The caller dials the access number for the subscriber, and the PSTN delivers the call to the access control system 1 via facilities 3. Upon receiving the DID digits for this subscriber, the Telephone Control System 1 determines that calls for this subscriber are to be handled via 'direct forwarding' mode, and that the call is to be forwarded to the subscriber at telephone 14. The access control system 1 then sends a page message to the packet radio transceiver 9 via data-link 10. The packet radio transceiver 9 in turn transmits a radio frequency packet message to Communicator 11, causing the beeper in the Communicator 11 to alert the subscriber to the incoming call. The Communicator 11 may also then send an acknowledgment message back via radio frequency to the packet radio transceiver 9. Meanwhile, the Telephone Control System 1 has begun to dial the phone number for phone 14 on an outgoing facility 3, and instructs the switch 4 to connect the incoming facility to the outgoing facility to complete the call. The PSTN 2 then delivers the call to phone 14, causing it to ring, and the subscriber may pick up the phone and connect to the caller. Continuing the illustrative example, assume that the subscriber completes the call and leaves the room 13. Communicator 11 detects the loss of signal from ultrasonic transmitter 12, and realizes therefore that the subscriber has left the room and is no longer able to receive calls at this location. The Communicator 11 then transmits a brief packet message via radio frequency. This message contains the subscriber's access number and a special message indicating that no phone number is available and that a default mode memory is to be used for call handling. This radio frequency message is detected by packet radio transceiver 9 and passed on to the Telephone Control System 1 via data link 10. The Telephone Control System 1 then changes the method of call handling for this subscriber to the default mode, which may typically be message center mode. It should be obvious now that if the subscriber were to reenter room 13, or to enter another room with a similar ultrasonic transmitter, that a similar sequence of events would occur causing the calls for this subscriber to be routed to the appropriate room. In this way, without any specific action or effort on the part of the subscriber, his calls will follow him from location to location and be handled automatically and properly.

Another feature of the Communicator allows the subscriber to enter a 'manual phone number' mode whereby the Communicator will ignore the messages received from the ultrasonic transmitters, maintaining the last used mode or forwarding number.

Another feature of the Communicator allows the subscriber to select a new method of call-handling by touching keys on the Communicator's keypad. This will cause the Communicator 11 to transmit a 'new mode memory request' packet message via radio frequency to the packet radio transceiver, which in turn will send the message to Telephone Control System 1 via data-link 10, causing the Telephone Control System 1 to change the call handling method for that subscriber.

DETAILED DESCRIPTION

FIG. 2 is a block diagram of the telephone control system 1. The preferred embodiment of the telephone control system 1 consists of a variety of subsystems, or facilities. A Call Processing Facility (CPF) 100 is shown connected to trunks 3. A Pager Dialing Facility (PDF) 105 is shown connected to telephone lines 5. A Subscriber Access Facility (SAF) 110 is shown connected to trunks 8. A Meet-Me Facility (MMF) 115 is shown connected to lines 120. A Communicator Access Facility (CAF) 125 is shown connected to datalink 10. A Client Services Facility (CSF) 130 is also shown. Each of these facilities is connected to high speed data network 150.

Figure 3:
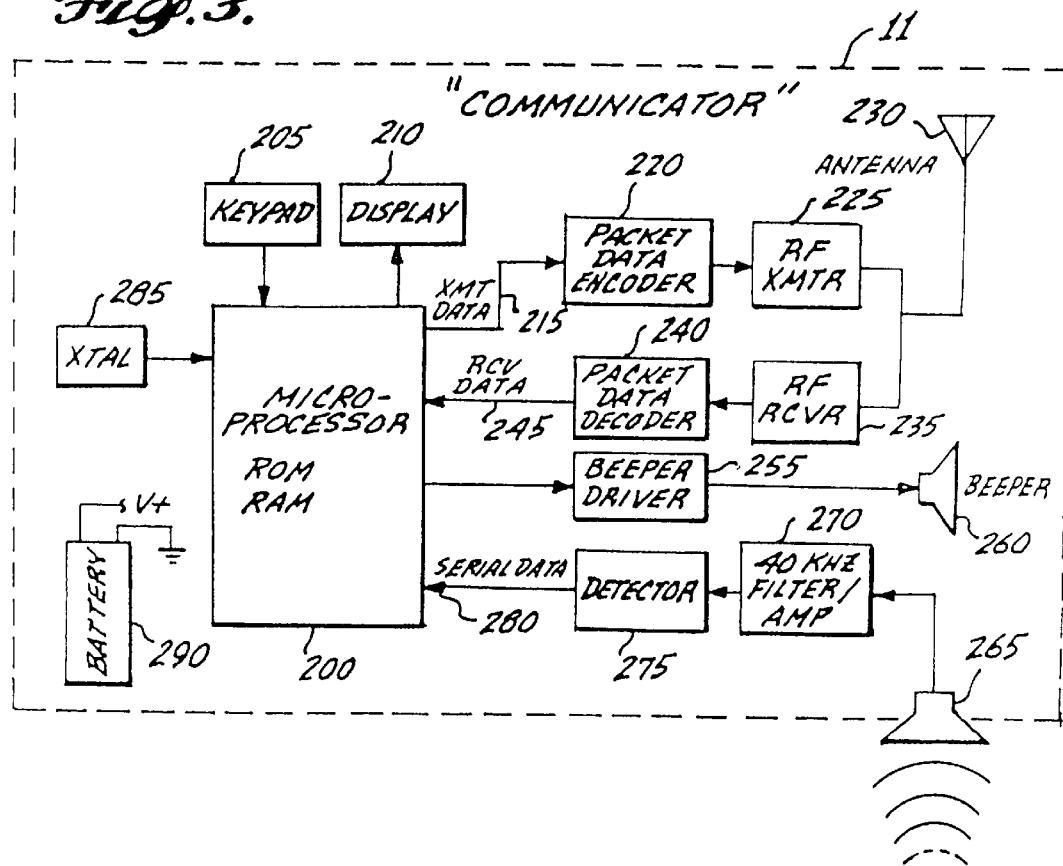
FIG. 3 is a block diagram of the Communicator.

A block diagram of the Communicator 11 is shown in FIG. 3. The operation of the Communicator 11 is controlled by microprocessor 200, which in the preferred embodiment is a single chip microprocessor containing it's own Read-Only-Memory (ROM) and Random-Access-Memory (RAM). A keypad 205, and display 210 are shown connected to microprocessor 10. A transmit data output port 215 is provided by the microprocessor 200. This transmit data is passed to packet data encoder 220 which formats the data into packets before sending the packets to antenna 230 via radio frequency transmitter 225. Radio frequency receiver 235 receives data packets from antenna 230 and passes them to packet data decoder 240, which removes the packet format and passes the raw received data to the receive data input port 245 on microprocessor 200. Output port 250 may be used to apply a tone signal to beeper driver 255 which supplies sufficient current to drive beeper 260 to produce an alerting sound. A transducer 265, capable of receiving signals in the ultrasonic frequency range, passes these signals to a 40 Kilohertz filter and amplifier 270. The resulting signal is applied to detector 275 which removes the 40 Kilohertz component from the signal and passes the resulting serial data to input port 280 of microprocessor 200. Also shown is a crystal oscillator 285 which controls the timing of all operations of the microprocessor 200. Power for the Communicator 11 is supplied by battery 290. Improvements that currently exist in the ART may be made to the ultrasonic transmitter and detector to enhance its ability to communicate the ultrasonic data in the presence of multi-path echoes. These improvements include, but are not limited to: frequency shift keying; the transmission of synchronized data and the use of a clock recovery logic to extract the clock timing over a long integration period resulting in a clock move resistant to echoes; the use of error detecting and correcting codes; and the use of sampling and voting techniques to determine the correct bit value after multiple samples during a bit period, the bit period being determined by the clock recovery logic above. In addition, multiple transmitters may be used as a method of obtaining increased coverage and area transmission diversity.

Figure 4:
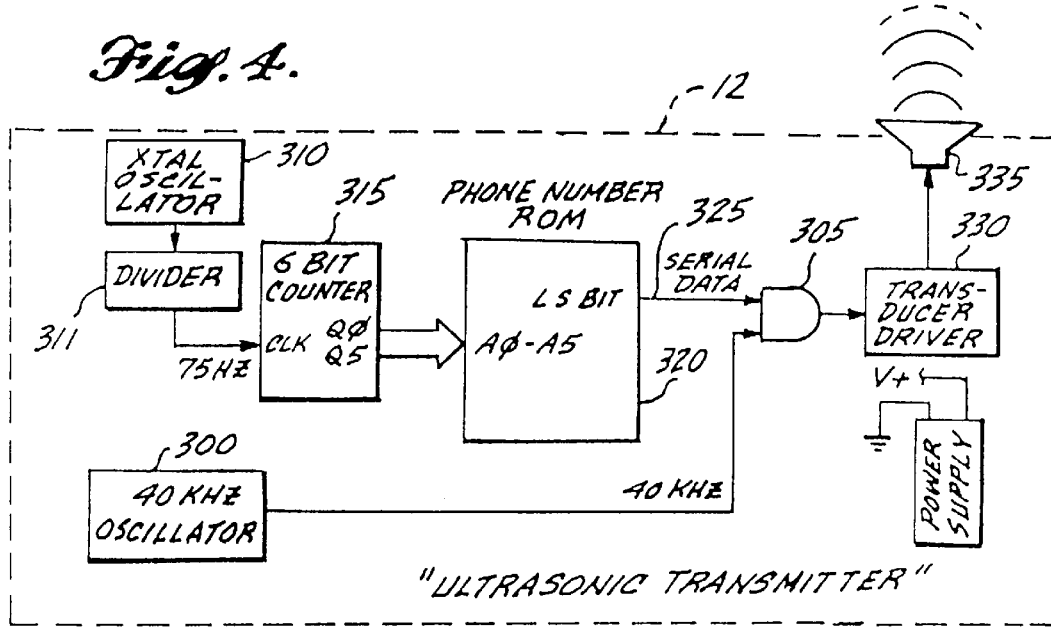
FIG. 4 is a block diagram of the Ultrasonic Transmitter.

A block diagram of the Ultrasonic Transmitter 12 is illustrated in FIG. 4. Oscillator 300 provides a 40 Kilohertz signal to one input of AND gate 305. The output of crystal oscillator 310 is applied to divider 311 which produces a 75 Hertz signal to the clock input of 6-bit counter 315. The 6 outputs of counter 315 are applied to the address inputs of Read-Only-Memory 320. Memory 320 is pre-programmed with data representing the phone number of the nearest telephone. This data may contain the area code plus seven digits and the extension number if appropriate. With each digit represented by 4 bits, 14 digits and 8 bits of checksum may be transmitted. Only the least significant bits in ROM 320 need be programmed, as the LSB output 325 is used to apply this data to a second input of AND gate 305. As can be seen, the serial data at 325 will continuously output the phone number at a rate of 75 bits per second. AND gate 305 combines the serial data 325 and the 40 Kilohertz signal from oscillator 300 producing a resultant signal which is applied to transducer driver 330. The output of driver 330 is then applied to transducer 335. As should be obvious, the transducer will be generating a 40 Kilohertz signal while the serial data output 325 is high, and will be generating no signal while the serial data output 325 is low. The data is therefore modulated on the 40 Kilohertz carrier at a rate of 75 baud. The 64 bits from the ROM 320 are thus transmitted in a period of 0.853 seconds. This is adequate for the transmission of a phone number and extension. Although this baud rate is relatively low; it has the advantage of reducing the effect of multipath (reflections of the ultrasonic signal arriving at the receiver at different times and phases), and thus improves the reliability of transmission as compared with higher baud rates.

Figure 5:
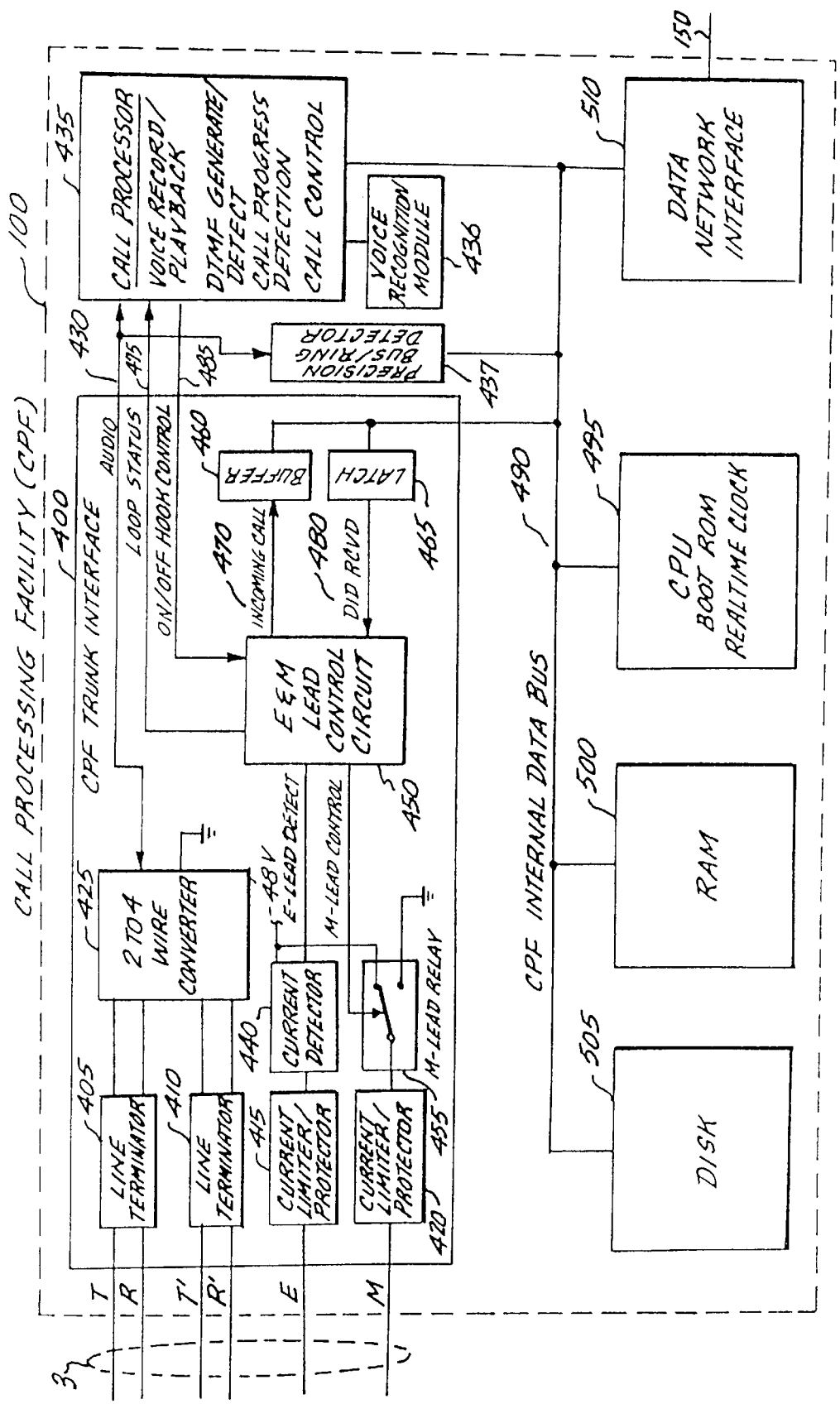
FIG. 5 is a block diagram of the Call Processing facility.

A block diagram of the Call Processing Facility (CPF) 100 is shown in FIG. 5.

Referring to FIG. 5, CPF trunk interface 400 interfaces the CPF 100 with trunk 3. As was discussed earlier, the preferred embodiment of the telephone control system 1 employs a CENTREX DID trunk. In this embodiment trunk 3 is provided via a 4-wire E&M trunk provisioned with TYPE I signalling, which is well known in the art. This type of trunk provides a 2-wire balanced transmit audio connection, shown terminated by line termination 405. This type of trunk also provides a 2-wire balanced receive audio connection, shown terminated by line termination 410. The E-Lead of trunk 3 is shown connected to the current limiting and overvoltage protection at reference 415. In a similar fashion, the M-Lead of trunk 3 is shown connected to the current limiting and overvoltage protection at reference 420. 2-to-4 wire convertor 425 takes the separate balanced transmit and receive signals from line terminators 405 and 410 and combines them into one single-ended signal at reference 430, which is applied to call processor 435. The E-Lead signal from limiter/protector 415 is passed to current detector 440. As is shown, current detector 440 provides a path for the E-Lead signal through to the negative battery reference of −48 volts at 445. Current Detector 440 also provides an "E-Lead Detect" logic signal indicating the presence of current via the E-lead. This signal is applied to E&M lead control circuit 450. The M-Lead signal for limiter/protector 420 is passed to M-Lead relay 455. This relay is controlled by a "M-Lead Control" signal from control circuit 450. By activating or deactivating relay 455, control circuit 450 is able to take the M-Lead on-hook or off-hook, as the M-Lead will be connected either to −48 volts or to ground. The control circuit 450 outputs an "Incoming Call" signal 470 to buffer 460, and outputs a "Loop Status" signal 475 to call processor 435. The control circuit 450 has as additional inputs a "DID Received" signal 480 from latch 465, and an "On/Off-Hook Control" signal 485 from call processor 435. The output of buffer 460, and the input of latch 465 is applied to CPF internal data bus 490.

Still referring to FIG. 5, the CPF internal data bus 490 connects CPF trunk interface 400, call processor 435, precision busy/ring detector 437, Central Processing Unit (CPU) 495, Random Access Memory (RAM) 500, Disk memory 505, and data network interface 510. Call processor 435 performs the functions of voice record and playback, dual-tone-multi-frequency (DTMF) detection and generation, and call control. The functions of call processor 435 are well known in the art and many products, such as the Model D41B manufactured by Dialogic Corporation, exist commercially which can accomplish these functions. A voice recognition module 436 is shown connected to call processor 435. Voice recognition module 436 allows call processor 435 to detect, on a speaker-independent basis, a simple set of spoken commands from callers. The simple set consists of 16 words including the digits '0' through '9'. This capability, in combination with the DTMF detection capability of the call processor 435, allows caller to either speak their commands, or enter them from a DTMF phone. A commercially available product which performs this voice recognition function is the Model VR/10 manufactured by Dialogic Corporation.

A precision busy/ring detector 437 is shown connected to the audio signal 430 from CPF trunk interface 400. This detector may be used to perform a rapid detection of precise busy and precise ringing signals, even in the presence of voice. Unlike the busy and ring detection functions of Call Processor 435 which require a cadence match as well as a frequency match, precision busy/ring detector 437 does not require a cadence match and is therefore capable of rapidly detecting precise busy and ringing signals even if a party is conferenced in and speaking on the line. This capability is useful in providing the 'busy/no-answer option' as will be described later. The functions of precision busy/ring detector 437 are well known in the art, and may be typically implemented as follows. The incoming audio signal is applied to the inputs of several identical circuits, each with center frequencies set to detect a different component of the expected busy or ringing signal. Each of these circuits contains a low Q bandpass filter. This filter prevents out-of-band signals such as voice from interfering with the detection function. The output of the bandpass filter is fed to a zero crossing detector. The output of the zero crossing detector is then fed to a high Q bandpass filter again set at the frequency to be detected. The output of the bandpass filter is then sent to a level detector which provides a positive indication if the incoming signal is above a preset amplitude. The output of the busy/ring detector 437 may be read by CPU 495 via the CPF internal data bus 490.

CPU 495 controls all functions of CPF 100. The software program which the CPU 100 uses is loaded into RAM 500, from disk memory 505. The disk 505 also is used to store a variety of other data including the subscriber database for the telephone control system 1. A data network interface 510 is used to connect the CPF 100 to the other subsystems of the telephone control system 1. Data network interface 510 passes data messages between the CPU 495 and these other subsystems. The functions of data network interface 510 are well known in the art, and many products, such as the Model COM4i from Digiboard Corporation, exist commercially which can accomplish these functions. Although only one trunk interface 400, one trunk 3, and one call processor 435 are shown in FIG. 5, it should be readily evident to one skilled in the art that additional trunk interfaces and call processors may be added to support additional trunks.

Figure 6:
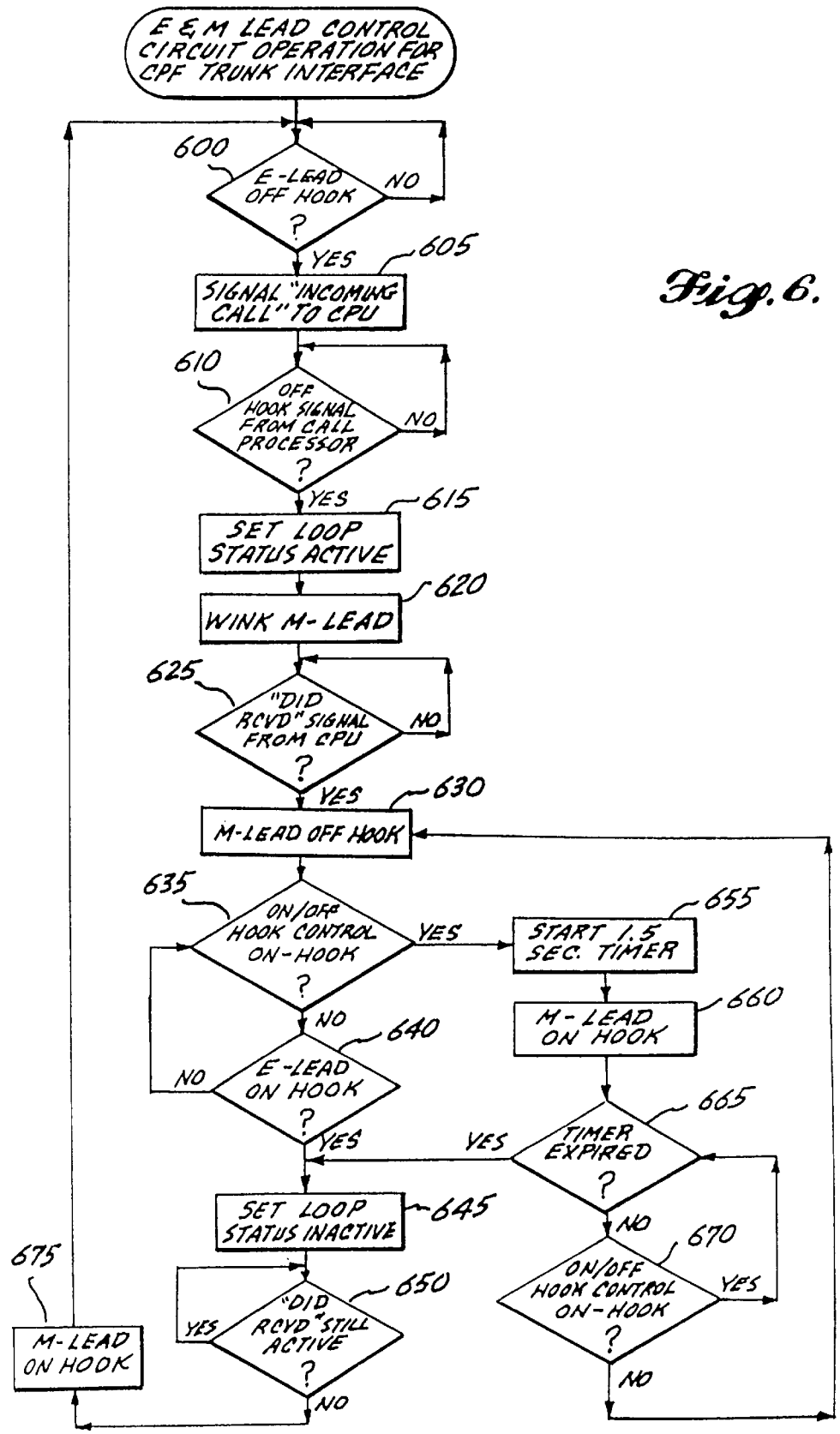
FIG. 6 is a flowchart illustrating operation of the E & M Control Circuit.

A flowchart of the operation of E&M control circuit 450 is shown in FIG. 6. At reference 600, the control circuit 450 idles waiting for an indication from current detector 440 that the E-Lead has gone off-hook. When the E-Lead does go off-hook, as shown at reference 605, an "Incoming Call" signal is sent to CPU 495 via buffer 460. The control circuit 450 then idles at 610, waiting for an off-hook signal from call processor 435, signifying that the CPU 495 is ready to accept the call. When the off-hook signal is received, the "Loop Status" 475 is set active as shown at reference 615. The M-Lead is then winked by taking M-Lead relay 455 momentarily off-hook, as shown at reference 620. The control circuit 450 then idles again at 625, waiting for the receipt of the "DID Received" signal 480 from CPU 495 via latch 465. Call processor 435 detects the incoming DID digits on it's audio line 430 and decodes the digits passing the digit sequence on to CPU 495. This DID digit sequence represents the 'called number' or ACCESS NUMBER of a subscriber to the telephone control system 1. When the CPU 495 receives the DID digits from call processor 435, the CPU 495 sets the "DID Received" signal 480 active, and the control circuit 450 takes the M-Lead off-hook as shown at reference 630. At this point a call has been established, and the control circuit 450 must now wait until either CPU 495 terminates the call, as signified by on/off-hook control signal 485 going on-hook, or by the calling party terminating the call as signified by the E-Lead detect from current detector 440 going on-hook. These functions are accomplished by control circuit 450 as illustrated at references 635 through 670. At 635 a check is made to determine if on/off-hook control signal 485 is on-hook. If it is still off-hook then a check is made at 640 to determine if the E-lead detect signal is on-hook. If it is on-hook, then the calling party has hung up, and the control circuit 450 sets the "Loop Status" 475 inactive at 645, signalling the call processor 435 that the call is terminated. The call processor 435 may in turn signal CPU 495 that the call is terminated. Control circuit 450 then waits as shown at reference 650 for the "DID Received" signal 480 to become inactive, signifying that the CPU 495 is completed with the call and is ready to accept a new call. When the "DID Received" signal 480 goes inactive, control passes to step 675 where the M-Lead is placed on hook. Control then returns to step 600 where the control circuit 450 restarts it's sequence at reference 600. Returning again to reference 635, if the On/off-hook control signal 485 were found to be on-hook, then a 1.5 second timer is started as shown at reference 655. This timer is used to distinguish between a 'hookflash' signal, which is typically less than 1.5 seconds, and an on hook command which should be at least 1.5 seconds. At 660, the control circuit 450 causes the M-Lead relay 455 to place the M-Lead on-hook. At 665 a check is made to determine if the 1.5 second timer has expired. If it has expired, then the signal was a true on-hook command, and control passes to reference 645 for the termination of the call. If at 665 it is determined that the 1.5 second timer has not expired, then a check is made at 670 to determine if the on/off-hook control 485 is still on-hook. If it is still on-hook then the timer is tested again at 665. If the on/off-hook control 485 is off-hook again, then the command was a flash, and control returns to reference 630, where the M-Lead is taken off-hook once more.

A diagram of the Subscriber Master Record, reference 700, is illustrated in FIG. 7. The subscriber master record contains information regarding a given subscriber's chosen method of call handling. This information is used by the Telephone Control System 1 to determine how to process the call. One unique subscriber master record exists for each subscriber to the Telephone Control System 1. All subscriber master records are stored in disk 505 and, upon initialization of the Telephone Control System 1, are copied to a common database in RAM memory 500 by CPU 495. This facilitates fast retrieval of this information, which is necessary for the real-time processing of calls to the access control system 1.

Still referring to FIG. 7, the subscriber master record 700 contains as it's first element an access (DID) number, shown at reference 701. As described earlier, this access number 701 is the unique phone number which is used to reach a given subscriber via the Public Switched Telephone Network 2. A PIN code, which is used by the subscriber to identify himself to the Telephone Control System 1, is shown at 702. At 703, a call handling mode is shown. The call handling mode defines the basic method of call handling which has been chosen by the subscriber. Possible call handling modes include direct forwarding, announced forwarding, message center, voice screen forwarding, urgent screen forwarding, VIP code screen forwarding, and branch-routing. At 704, a standard greeting type is shown. The standard greeting type, 704, defines the courtesy greeting announcement which the subscriber has selected for the Telephone Control System 1 to use when first answering a call. At 705, an options field is shown. This options field is used to contain several miscellaneous option flags which may be used to modify the operation of the basic call handling mode. Options 705 include 'page option' which causes a page to be sent when a call is forwarded, an 'emergency/urgent' option which modifies the operation of the priority or urgent screen forwarding mode, a 'busy/no-answer' option which causes calls to be sent to the message center if a busy or no-answer condition is detected, and a voice screen hold off option which modifies the operation of the voice screen forwarding mode. A transfer message type is shown at reference 706. The transfer message type, 706, defines the courtesy announcement which the subscriber has selected for the access control system 1 to use as a call is being transferred. A transfer number is shown at 707. This is the number which the access control system 1 will use when forwarding, or transferring calls for this subscriber. At 708 an extension number is shown which may be used by the Telephone Control System 1 to announce to a caller the extension number of the phone at which the subscriber is located. The subscriber's message center number is shown stored at 709. The subscriber's pager number is shown stored at 710. The subscriber's office number is shown stored at 711. The subscriber's home number is shown stored at 712. The subscriber's mobile phone number is shown stored at 713. At 714 a VIP screen code is shown. The VIP screen code is a code which may be used by a caller to cause his call to be forwarded to the subscriber, when the subscriber has selected VIP code screened forwarding mode. The number of the current feature memory which is being used is shown stored at 715. At 716 a pager message display number is shown. This is the number which the subscriber wishes to appear in the display of his pager when the access control system 1 has taken a message from a caller. At 717 a pager forwarding display number is shown. This is the number which the subscriber wishes to appear in the display of his pager when the Telephone Control System 1 is in the process of forwarding a call to the subscriber. At 718 a communicator dynamic mode display number is shown. This is the number which the subscriber wishes to appear in the display of his communicator 11 when the Telephone Control System 1 has a call holding, and requires that the subscriber select a method of call handling to dispose of the call. The time and date that the last caller abandoned a meet-me call by hanging up without leaving a message is shown stored at 719. The time and date that the last caller abandoned a meet-me call by leaving a message is shown stored at 720. A count of the number of calls which have been transferred to an external message center by the Telephone Control System 1 is shown stored at 721. Shown generally at 722 are the branch routing numbers 0 through 9. These fields contain the phone numbers to which a call should be transferred if a caller touches one of the digits 0 to 9 when the access control system 1 is processing a call using branch-routing mode. The branch-routing default transfer number is shown stored at 723. This is the number to which the call is transferred should a caller not enter one of the digits 0 to 9. Shown stored at 724 is the feature timer duration. This value determines when the feature timer expires. Shown stored at 725 is the feature timer termination mode. This field contains the mode memory which the subscriber wishes to use upon expiration of the feature timer. The fields necessary to implement the weekly schedule function are shown generally at reference 726. In the preferred embodiment the weekly schedule may contain up to 32 events (steps). For each step, the subscriber master record 700 stores a time and date, and a mode memory number to be used at that time and date. The current step number (1 to 32) is shown stored at 727. A flag which indicates to Telephone Control System 1 that the weekly schedule is on, is shown stored at 728. A flag which informs the Telephone Control System 1 as to whether the subscriber is allowed to make multiple outside calls is shown stored at 729. A flag indicating that the subscriber has selected to use his communicator 11 in the 'dynamic mode assignment' mode is shown stored at 730. A count of the number of calls made to this ACCESS NUMBER is shown stored at 731.

A diagram of a Mode Memory, reference 800, is illustrated in FIG. 8. As described previously, the mode memories are used by subscribers of the Telephone Control System 1 to store their commonly used call handling modes and options. As with the subscriber master records 700, the mode memories 800 are stored in disk 505 and, upon initialization of the Telephone Control System 1, are copied to a common database in RAM memory 500 by CPU 495. Each mode memory is unique to an individual subscriber, and is identified by storing the subscriber's ACCESS NUMBER as part of the mode memory, as shown at reference 801. In the preferred embodiment, the subscriber may have up to 90 mode memories. Each mode memory is identified by a unique mode memory number, 10 through 99. This mode memory number is shown stored as part of the mode memory 800 at reference 802. Shown generally at reference 803, are the various fields which the subscriber has selected to store in the mode memory 800. As can be seen, these are a subset of the fields which are stored in the subscriber master record 700. To invoke a mode memory, the Telephone Control System 1 need only copy the fields from the mode memory 800 to the corresponding fields in the subscriber master record 700. The access control system 1 also copies the mode memory number 802 to the current feature memory field 715 of the subscriber master record 700.

Figure 9:
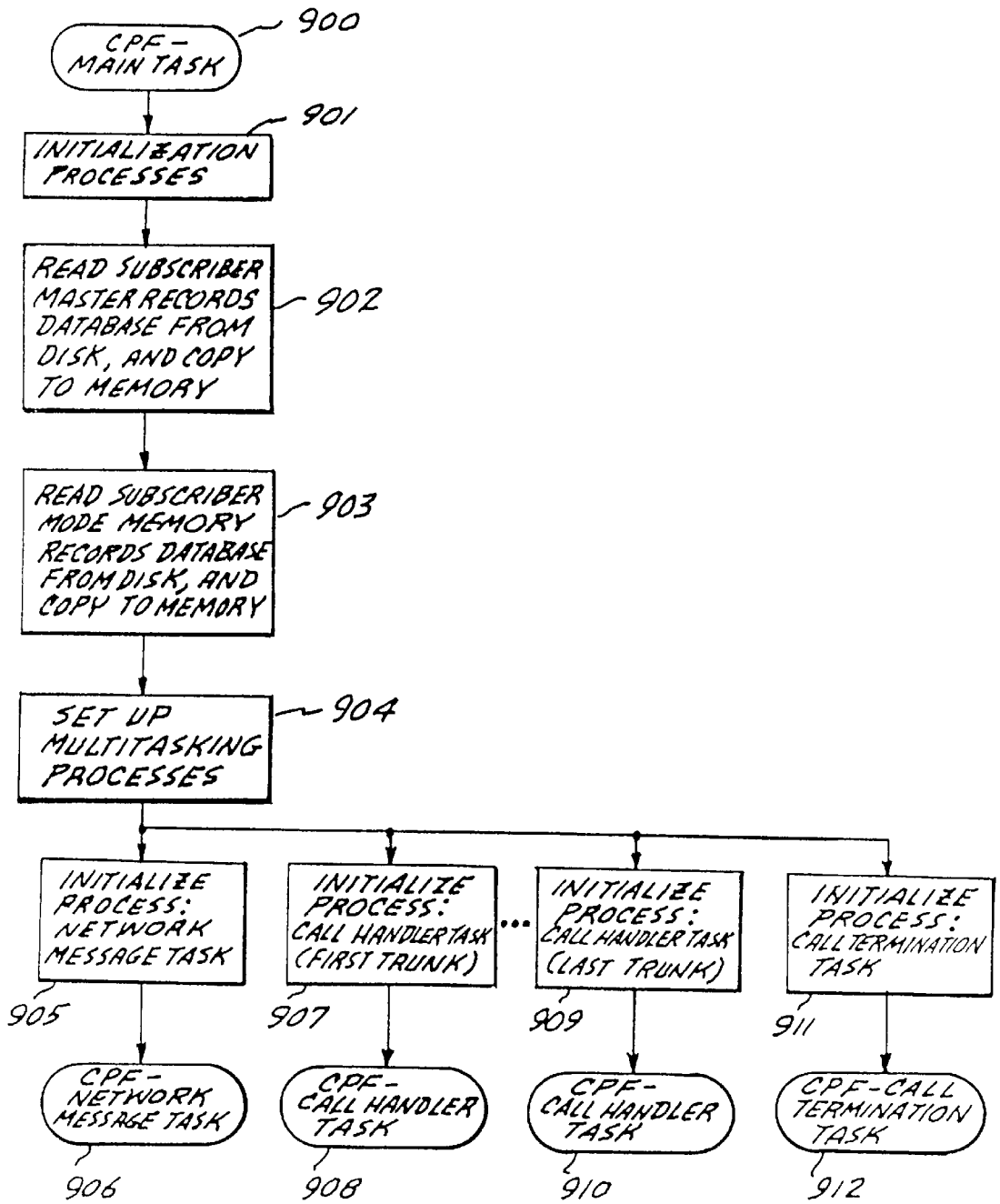
FIG. 9 is a flowchart of the Main Task for the Call Processing facility.

A flowchart of the Main Task for the Call Processing Facility (CPF) 100 is shown in FIG. 9. This flowchart represents the instructions, or steps, followed by CPU 495, as it controls functions of CPF 100. The starting point for the CPF—MAIN TASK is shown at reference 900. At step 901 the CPU 495 performs initialization processes. These processes are well known in the art and include such activities as using a boot PROM to load the operational program from disk, checking for memory errors, performing hardware diagnostics, etc. The subscriber master records 700 are read from disk 505 and copied to a database in memory 500, as shown at step 902. In a similar manner, the mode memories 800 are read from disk and copied to a database in memory, as shown at step 903. At step 904, the multitasking processes are established. The multitasking allows the software to perform more than one process simultaneously. Multitasking techniques are well known in the art. As an example, UNIX is a widely used multitasking operating system. Other well known techniques allow a pseudo-multitasking function to be accomplished on a non-UNIX based operating system by constructing a 'round-robin' scheduler, by which a main process allocates 'time slices' to each of a number of sub-processes. At step 905 a process for the Network Message Task is initialized, and at step 906 control is passed to the CPF—Network Message Task. At step 907 a process for the Call Handler Task for the first trunk 3 is initialized, and at step 908 control is passed to the CPF—Call Handler Task. In a similar fashion, at step 909 a process for the Call Handler Task for the last trunk 3 is initialized, and at step 910 control is passed to the CPF—Call Handler Task. At step 911 a process for the Call Termination Task is initialized, and at step 912 control is passed to the CPF—Call Termination Task.

Figure 10:
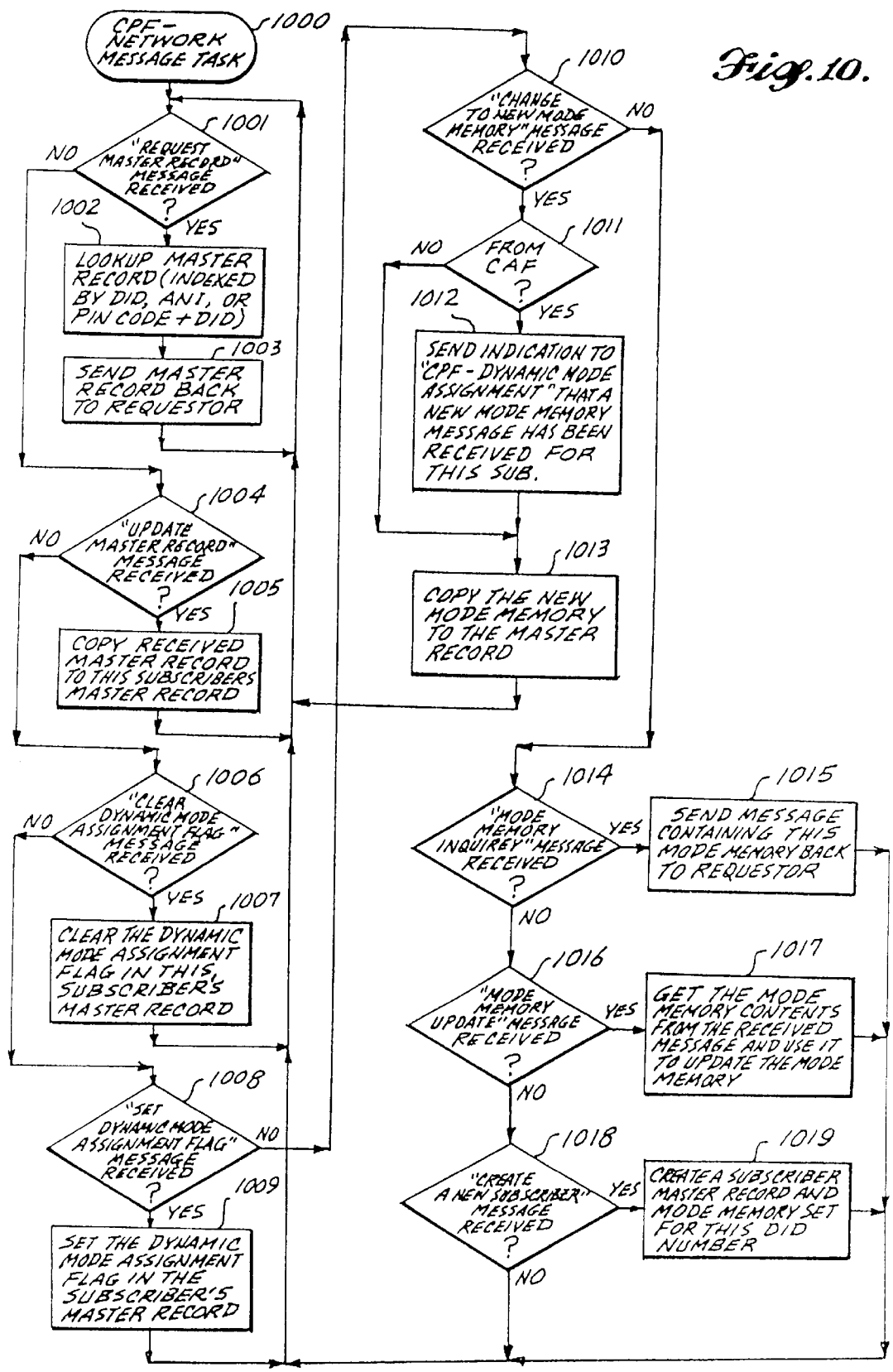
FIG. 10 is flowchart of the Code Processing Facility—Network Message Task.

A flowchart of the CPF—Network Message Task is illustrated in FIG. 10. The function of this task is to receive and process messages received by Data Network Interface 510 from other facilities of the access control system 1. The CPF—Network Message Task is entered at step 1000. At step 1001 a determination is made as to whether a "request master record" message has been received. If this message has been received, then at step 1002 the subscriber master record 700 which corresponds the DID number, ANI number, or PIN code provided in the message is searched for in the database of memory 500. Upon finding this subscriber master record, at step 1003 a message containing a copy of this subscriber master record is sent back to the requesting facility via data network interface 510. Control then returns to step 1000. Should it be determined at step 1001, that no "request master record" message has been received, then at step 1004 a check is made to determine if an "update master record" message has been received. If such a message has been received, then at step 1005 a master record for a subscriber is recovered from the message and copied to the the subscriber's master record 700, at which point control returns to step 1000. If an "update master record" message is not detected at step 1004, then at step 1006 a check is made to determine if a "clear dynamic mode assignment flag" message has been received. If such a message has been received, and the message identifies a specific subscriber DID number, then the dynamic-mode assignment flag 730 in the subscriber master record 700 for this subscriber is cleared at step 1007, and control returns to step 1000. If a "clear dynamic mode assignment flag" message is not detected at step 1006, then at step 1008 a check is made to determine if a "set dynamic mode assignment flag" message has been received. If such a message has been received, and the message identifies a specific subscriber DID number, then the dynamic mode assignment flag 730 in the subscriber master record 700 for this subscriber is set at step 1009, and control passes to step 1000. If a "set dynamic mode assignment flag" message is not detected at step 1008, then at step 1010 a check is made to determine if "change to new mode memory" message has been received. If such a message has not been received, then control passes to step 1014. If such a message has been received, and the message identifies a specific subscriber DID number, then at step 1011 a check is made to determine if the message was sent by the Communicator Access Facility (CAF) 125. If the message was not from the CAF 125, then control passes to step 1013. If the message was from the CAF 125, then at step 1012 an indication is sent to the CPF—Dynamic Mode Assignment routine (shown in FIG. 13), that this message was received, and control passes to step 1013. At step 1013, the mode memory number and the subscriber's DID number are removed from the message, and the corresponding mode memory 800 is copied to the corresponding subscriber's subscriber master record 700. Control then returns to step 1000. If at step 1010 it is determined that a 'change to new mode memory message' is not received, then control passes to step 1014, where a determination is made as to whether a 'mode memory inquiry' message is received, and if this is the case then control passes to step 1015 where the mode memory 800 identified in the message for the subscriber identified in the message is retrieved from the database of memory 500 and a message is constructed and sent back to the requesting facility via data network interface 510. Control then returns to step 1001. If at step 1014 it is determined that a 'mode memory inquiry message is not received, then control passes to step 1016, where a determination is made as to whether a 'mode memory update' message is received, and if this is the case, then control passes to step 1017 where the new mode memory contents are retrieved from the message, and the mode memory is copied to the appropriate mode memory 800 in the database of memory 500. Control then returns to step 1001. If at step 1016, it is determined that a 'mode memory update' message is not received, then control passes to step 1018 where a determination is made as to whether a 'create new subscriber' message is received, and if this is the case then control passes to step 1019 where the DID number is retrieved from the message, a subscriber master record 700 is created for this DID number 701, and a set of mode memories 800 are created for this DID number 701. Control then returns to step 1001. If at step 1018 it is determined that a 'create master record' message is not received, then control returns to step 1001.

Figure 11:
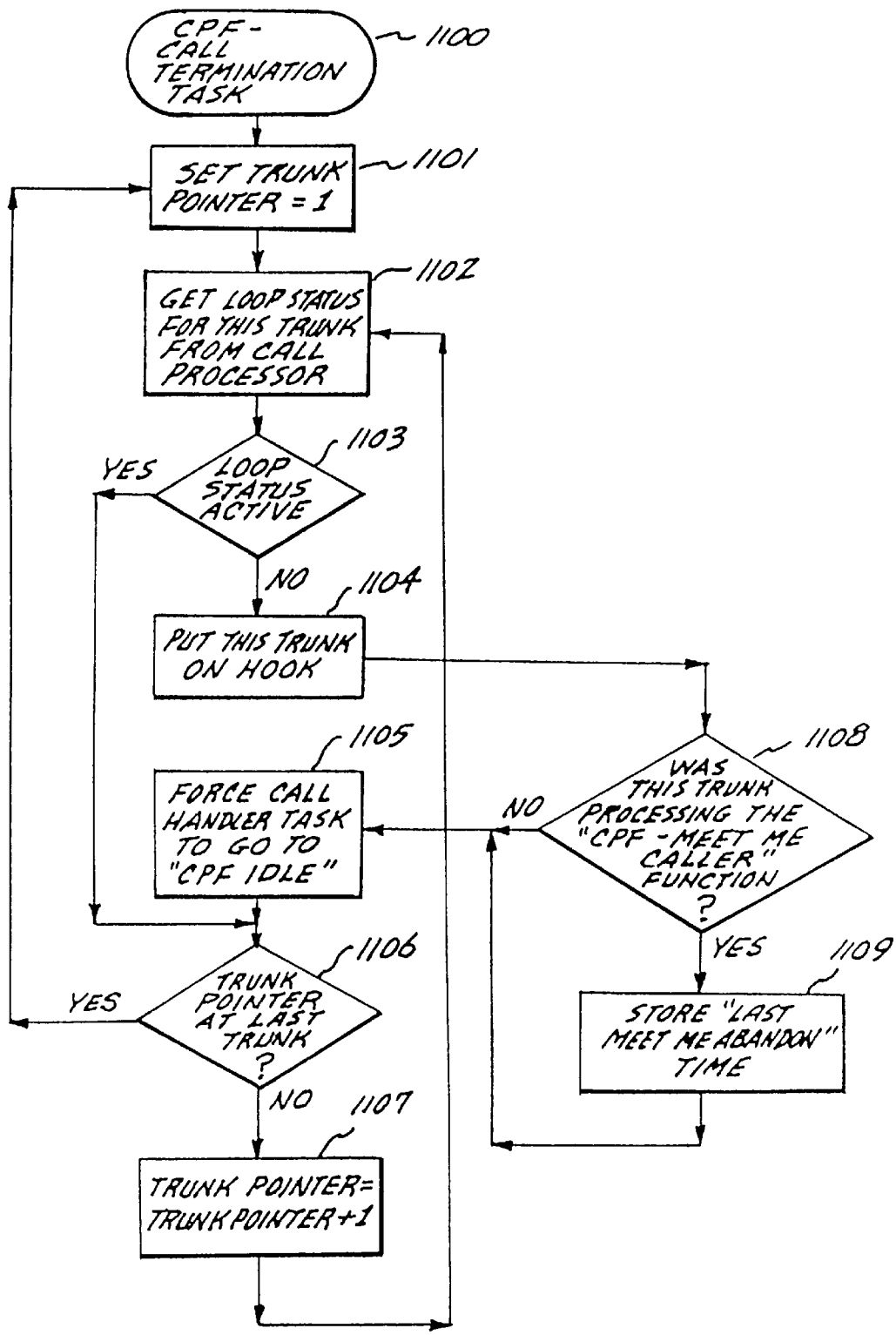
FIG. 11 is a flowchart of the Code Processing Facility—Call Termination Task.

A flowchart of the CPF—Call Termination Task is illustrated in FIG. 11. The purpose of this task is to monitor the loop status signal 475 for each trunk interface 400, and to terminate any call in progress should the loop status become inactive. In this way the system detects if the calling party has hung up. The CPF—Call Termination Task is entered at step 1100. At step 1101 a trunk pointer is set to a value of 1. At step 1102 the loop status signal 475 for the trunk pointed to by the trunk pointer is read via call processor 435. At step 1103, a determination is made as to whether the loop status signal 475 is active. If the signal is active, then control passes to step 1106. If the signal is not active, then the caller must have hung up, and at step 1104 the trunk is placed on hook by call processor 435 via on/off hook control signal 485. Then at step 1108 a determination is made as to whether this trunk was processing the "CPF-Meet Me Caller" function, and if this is the case then control passes to step 1109 where the current time and date is stored in the "last meet-me abandon" field 719 of the subscriber master record 700. Control then passes to step 1105. Control also passes to step 1105 if at step 1108 it is determined that the trunk was not processing the "CPF-Meet Me Caller" function. At step 1105 the CPU 495 signals the multitasking process 907 controlling the call handler task for this trunk to return to it's entry point 908, thereby terminating any activity on that trunk. Control then passes to step 1106, where a check is made to determine if the trunk pointer is pointing to the last trunk. If the trunk pointer is pointing to the last trunk, then control returns to step 1101. If the trunk pointer is not pointing to the last trunk, then at step 1107 the trunk pointer is incremented and control returns to step 1102.

Figure 12A:
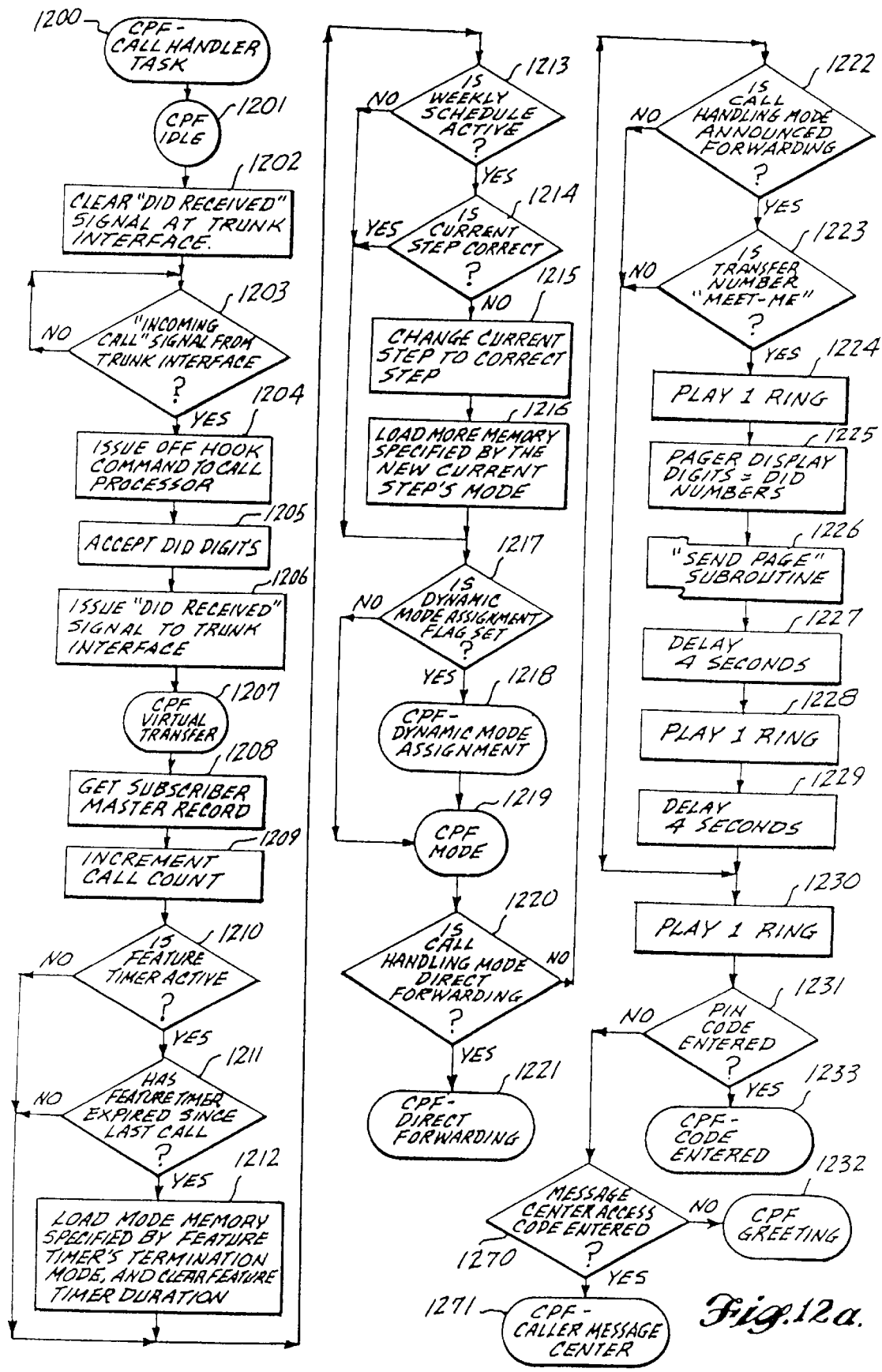
FIGS. 12a and 12b form a flowchart of the Call Processing Facility—Call Handler Task.
Figure 12B:
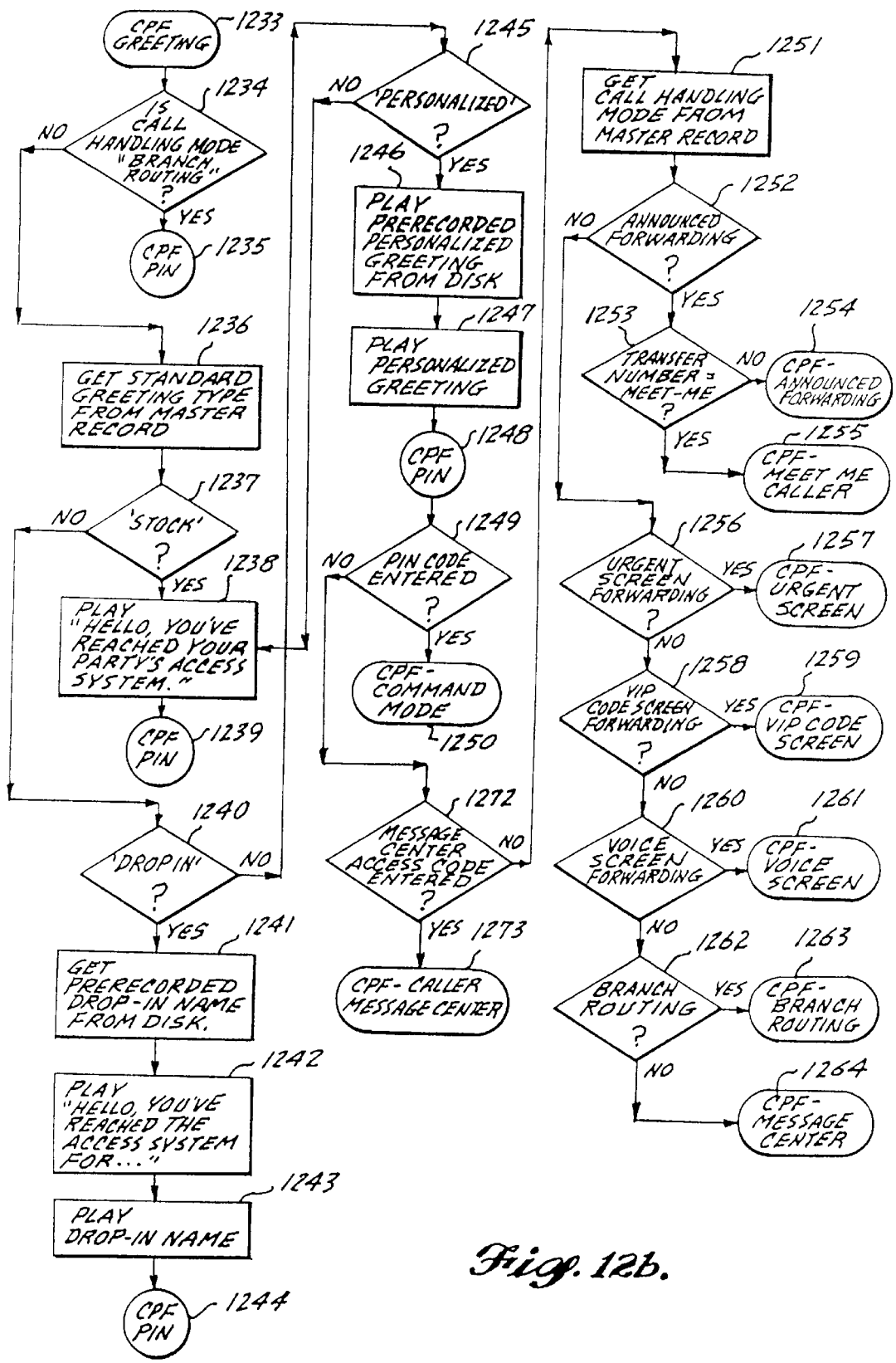

A flowchart of the CPF—Call Handler Task is illustrated in FIGS. 12a and 12b. The function of this task is to respond to an incoming call on a trunk 3, receive the DID digits identifying the subscriber's ACCESS NUMBER being dialed, determine the method of call handling as specified in the database of memory 500 by subscriber master record 700 which corresponds to that ACCESS NUMBER, and then cause the call to be processed accordingly. The CPF—Call Handler Task is entered at step 1200, a connection point labelled "CPF IDLE" is passed at reference 1201, and at step 1202 the DID received signal 480 is cleared, allowing trunk interface 400 to receive a new call. Control then remains at step 1203 until an incoming call signal 470 is received from the trunk interface 400, at which point control passes to step 1204 causing the call processor to issue an off hook signal via it's on/off hook control line 485. Then at step 1205, incoming DID digits are decoded and accepted by the DTMF detector of call processor 435. Then at step 1206, after the DID digits have been received, the DID received signal 480 is set, causing E & M control circuit 450 to force the M-Lead active, thereby seizing the trunk. Control then passes through a connection point labelled "CPF VIRTUAL TRANSFER" at reference 1207. At step 1208 the subscriber master record 700 which corresponds to the received DID number is retrieved from the database of memory 500. At step 1209 the call count 731 is incremented in the subscriber master record 700. At step 1210 a check is made to determine if the feature timer is active. This is accomplished by checking the feature timer duration 724. The feature timer is active if the feature timer duration 724 is non zero. If the feature timer is not active, then control passes to step 1213. If the feature is active, then another check is made at step 1211 to determine if the feature timer has expired since the last call. This is determined by comparing the feature timer duration 724 with the current time and date maintained by CPU 495. The feature timer has expired if the feature timer duration 724 does not extend beyond the current time and date. If the feature timer has not expired, then control passes to step 1213. If the feature timer has expired, then at step 1212 the mode memory 800 specified by the feature timer termination mode 725 is copied to the subscriber master record 800, and the feature timer duration 724 is cleared to zero. Control then passes to step 1213. A determination is made at step 1213 as to whether the weekly schedule is active by checking the status of the weekly schedule active flag 728. If the weekly schedule is not active, then control passes to step 1217. If the weekly schedule is active, then a determination is made a step 1214 as to whether the current step of the weekly schedule is correct. This is accomplished by finding the current step of weekly schedule 726 as pointed to by the weekly schedule current step 727, and comparing the time and date of the next step with the current time and date. If the current time and date fall between the current step and the next step, then the current step is correct. If, by this process, it is determined that the current step is correct, then control passes to step 1217. Otherwise, at step 1215, the weekly schedule current step 727 is incremented to point to the next step. Then at step 1216, the mode memory number corresponding to the new step of the weekly schedule 726 is found, the corresponding mode memory 800 is copied to the subscriber master record 700, and then control passes to step 1217. At step 1217 the status of the dynamic mode assignment flag 730 is checked, and if it is found to be active, control is passed at step 1218 to the CPF—Dynamic Mode Assignment. Otherwise, control passes through a connector labelled "CPF MODE" at reference 1219, and then passes to step 1220. At step 1220 a determination is made as to whether the current call handling mode 703 is set for 'direct forwarding', and if so control is passed via step 1221 to the CPF—Direct Forwarding. Otherwise a determination is made at step 1222 as to whether the current call handling mode 703 is set for 'announced forwarding' and if not control passes to step

1230. If the call handling mode 703 is set for 'announced forwarding', then at step 1223 a further check is made to determine if the transfer number 707 is set for meet-me, and if not control passes to step 1230. If the transfer number 707 is set for meet-me, then at step 1224 one audible ring is played to the caller by call processor 435. Then at step 1225, the 'pager display digits' are set to be equal to the DID number, prior to the "send page" subroutine being called at step 1226. Upon receiving a page with his own DID number in the display, the subscriber may recognize this as a meet-me call. Then a 4 second delay is initiated at step 1227, another ring is generated at step 1228, and another 4 second delay is initiated at step 1229, before passing control to step 1230. As can be seen, the effect of steps 1224 to 1229 is to simulate the typical ringing cadence expected by a caller, and in addition allow some time for the page sent at step 1225 to reach the subscriber's pager. Because the caller must wait for the subscriber to get to a phone when the subscriber is using meet-me, the sequence of steps 1224 to 1229 has the effect of reducing the delay perceived by the caller. At step 1230, an audible ring is generated towards the caller by call processor 435. Then at step 1231 a determination is made as to whether the caller has entered the PIN code 702. If the PIN code has been entered, then the caller must be the subscriber, and therefore control passes to the CPF—Command Mode via step 1233. If the PIN code has not been entered, then the control passes to step 1270 where a determination is made as to whether the 'message center access code' has been entered by the caller. In the preferred embodiment the 'message center access code' consists of the digits "*9" and is the same for all subscribers. This code may be used by callers who simply wish to leave a message and do not need to speak with the subscriber. If the 'message center access code' has been entered by the caller, then control passes to the "CPF—Caller Message Center" function as shown at step 1271. If the 'message center access code' has not been entered, then control passes to connector label "CPF GREETING" as shown at reference 1232.

Still referring to FIGS. 12a and 12b, control passes through the connector labelled "CPF GREETING" at reference 1233 to step 1234, where a determination is made as to whether the call handling mode 703 is set for 'branch-routing', and if so control passes through a connector labelled "CPF PIN" at reference 1235. Otherwise, at step 1236 the standard greeting type 704 is retrieved from the subscriber master record 700. If the standard greeting type is 'stock' as determined at step 1237, then control passes to step 1238 where a stock generic greeting is played to the caller: "Hello, you have reached your party's telephone control system." Control then passes through a connector labelled "CPF PIN" at reference 1239. If the standard greeting type is not determined to be 'stock' at step 1237, then a further check is made at step 1240 to determine if the standard greeting type is 'drop-in', and if not the control is passed to step 1245. If the standard greeting type is 'drop-in' then at step 1241 the subscriber's prerecorded drop-in name is retrieved from disk 505. Then at step 1242 the call processor 435 plays the greeting: "Hello, you have reach the telephone control system for . . . ", and then at step 1243 completes the greeting by playing back the pre-recorded name of the subscriber retrieved form disk in step 1241. Control then passes through a connector labelled "CFP PIN" at 1244. As was described earlier, if the standard greeting type was found not to be 'drop-in' at step 1240 then control passed to step 1245. At step 1245, a check is made to determine if the standard greeting type is 'personalized', and if not control passes to step 1238, described earlier.

Otherwise, control passes to step 1246 where the subscriber's pre-recorded personalized greeting is retrieved from disk 505, and is then played back to the caller at step 1247 by call processor 435. Control then passes through connector labelled "CPF PIN" at reference 1248 and a check is made at step 1249 to determine if the caller has entered a PIN code. If the PIN code has been entered, then the caller must be the subscriber, and therefore control passes to the CPF—Command Mode via step 1250. If the PIN code has not been entered, then the control passes to step 1272 where a determination is made as to whether the 'message center access code' has been entered by the caller. As was described earlier, in the preferred embodiment the 'message center access code' consists of the digits "*9" and is the same for all subscribers. This code may be used by callers who simply wish to leave a message and do not need to speak with the subscriber. If the 'message center access code' has been entered by the caller, then control passes to the "CPF—Caller Message Center" function as shown at step 1273. If the 'message center access code' has not been entered, then control passes to step 1251, where the call handling mode 703 is retrieved from the subscriber master record 700. Then at step 1252 a check is made to determine if the call handling mode 703 is set for 'announced forwarding', and if so a further check is made at step 1253 to determine if the transfer number 707 is set for meet-me. If the transfer number is not set for meet-me then control passes to CPF—Announced Forwarding via step 1254. If the transfer number is set for meet-me, then control passes to CPF—Meet-Me Caller via step 1255. If at step 1252 it was determined that the call handling mode was not set for 'announced forwarding', then control passes to step 1256. At step 1256 a check is made to determine if the call handling mode 703 is set for 'urgent screen forwarding', and if so control passes to CPF—Urgent Screen via step 1257. Otherwise, at step 1258 a check is made to determine if the call handling mode 703 is set for 'VIP code screen forwarding', and if so control passes to CPF—VIP Code Screen via step 1259. Otherwise, at step 1260 a check is made to determine if the call handling mode 703 is set for 'voice screen forwarding', and if so control passes to CPF—Voice Screen via step 1261. Otherwise, at step 1262 a check is made to determine if the call handling mode 703 is set for 'branch-routing', and if so control passes to CPF—Branch-Routing via step 1263. Otherwise control passes to CPF—Message Center via step 1264.

Figure 13:
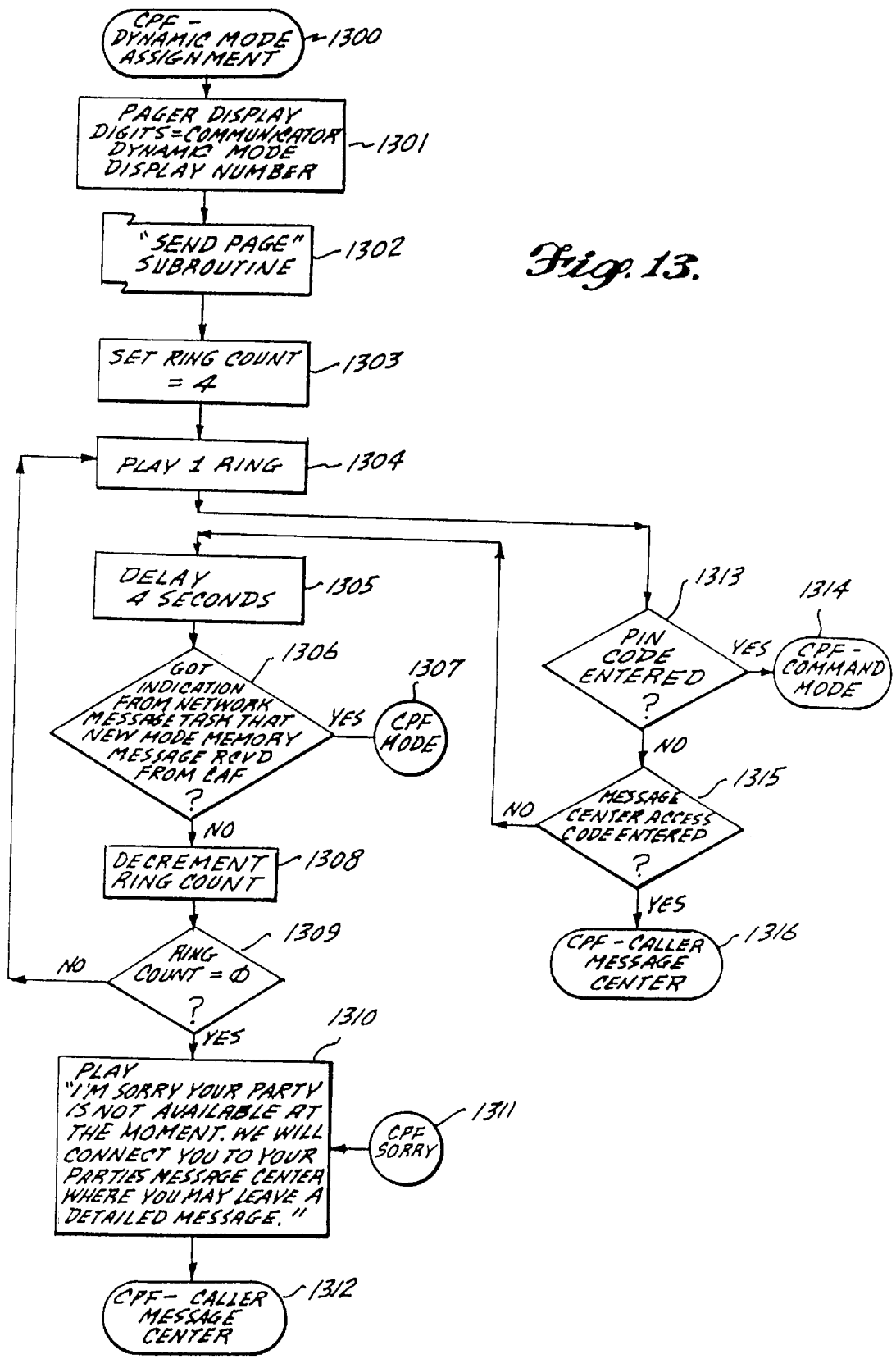
FIG. 13 is a flowchart of the Call Processing Facility—Dynamic Mode Assignment.

A flowchart of the CPF—Dynamic Mode Assignment is illustrated in FIG. 13. The purpose of this function is to process calls for a subscriber who is using a Communicator 11, and who has selected the dynamic mode assignment mode of operation. The dynamic mode assignment mode of operation allows a subscriber to chose dynamically, with each incoming call, the call handling mode to be used for the call. The subscriber is alerted via his Communicator 11 that an incoming call is present, and the subscriber may then transmit a 'new mode memory' message from his Communicator 11 thereby informing the Telephone Control System 1 as to how the call should be handled. The CPF—Dynamic Mode Assignment function is entered at step 1300, and at step 1301 the 'pager display digits' are set equal to the communicator dynamic mode display number 718. At step 1302, the 'send page' subroutine is called, causing a page to be sent to the subscriber's Communicator 11. At step 1303, a ring count is set to a value of 4. At step 1304 an audible ring is played to the caller by call processor 435, and at step 1313 a determination is made as to whether the caller has entered the PIN code 702. If the PIN code has been entered, then the caller must be the subscriber, and therefore control passes to the CPF—Command Mode via step 1314. If the PIN code has not been entered, then the control passes to step 1315 where a determination is made as to whether the 'message center access code' has been entered by the caller. As was described earlier, in the preferred embodiment the 'message center access code' consists of the digits "*9" and is the same for all subscribers. This code may be used by callers who simply wish to leave a message and do not need to speak with the subscriber. If the 'message center access code' has been entered by the caller, then control passes to the "CPF—Caller Message Center" function as shown at step 1316. If the 'message center access code' has not been entered, then at step 1305 a 4 second delay is initiated, thus creating a typical ring cadence. At step 1306 a check is made to determine if the Network Message Task (FIG. 10) has received a 'new mode memory' message from the Communicator 11 belonging to this subscriber. If such a message has been received, then the control passes to connector labelled "CPF MODE" as indicated at reference 1307. If message was not received, then the ring count is decremented at step 1308, and at step 1309 a check is made to determine if the ring count is 0. If the ring count is not '0, then control returns to step 1304 and the ring cycle is repeated. If the ring count is 0, indicating four rings cycles have been generated without the subscriber responding, then control passes to step 1310, labelled "CPF SORRY" by the connector at reference 1311, and the caller is informed, via call processor 435: "I'm sorry, your party is not available at the moment. We will connect you to your party's message center where you may leave a detailed message." Control then passes to CPF—Caller Message Center via step 1312.

Figure 14:
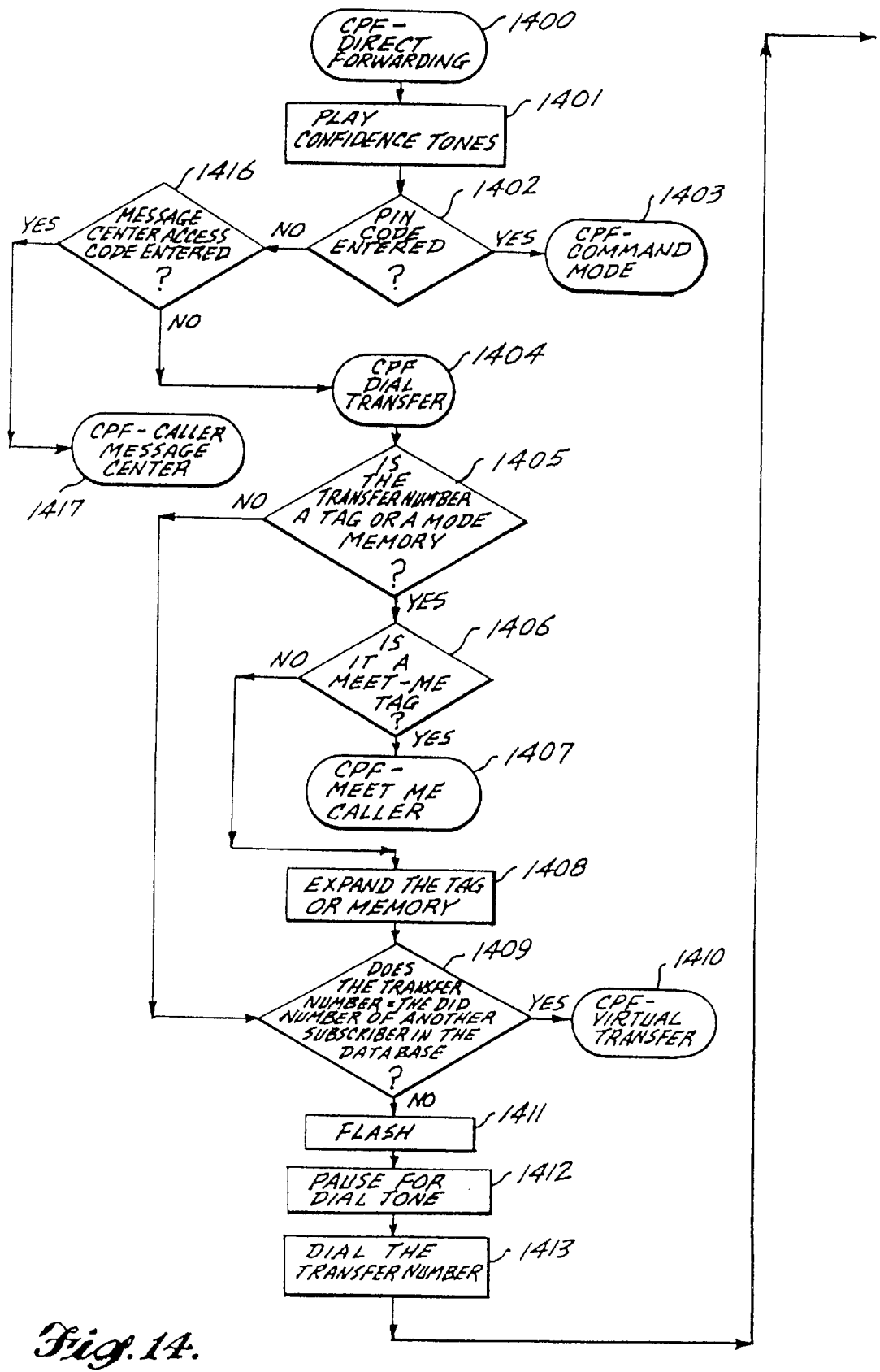
FIGS. 14 and 14a form a flowchart of the Call Processing Facility—Direct Forwarding Function.
Figure 14A:
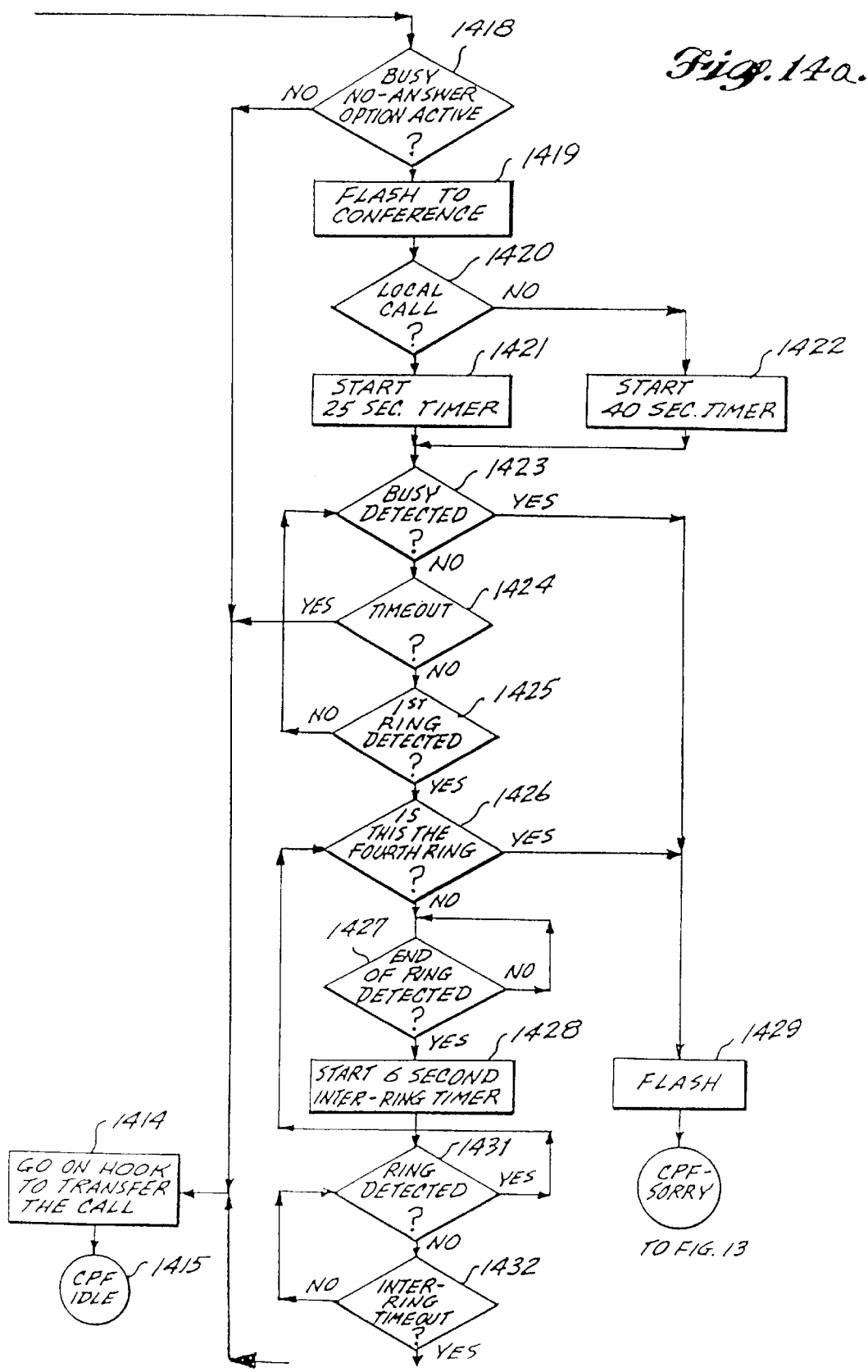

A flowchart of the CPF—Direct Forwarding function is illustrated in FIGS. 14 and 14a. The purpose of this function is to process calls for a subscriber who has selected the 'direct forwarding' call handling mode. In this mode, calls are transferred without any announcement. Low amplitude 'confidence tones' are generated just prior to the transfer so that the subscriber may have an opportunity to enter his PIN Code. The CPF—Direct Forwarding function is entered at step 1400, and 'confidence tones' are generated at step 1401 by call processor 435. The 'confidence tones' are a prerecorded sequence of tones which are designed to sound similar to the interoffice multifrequency signalling tones that callers are familiar with. In this way the caller has no clear indication that the call is being answered and transferred, and yet at the same time the subscriber is given an indication as to when he may enter his PIN Code. At step 1402, a determination is made as to whether the subscriber has entered his PIN code. If the PIN code has been entered, then control passes to CPF—Command Mode via step 1403. Otherwise control passes to step 1416 where a determination is made as to whether the 'message center access code' has been entered by the caller. As was described earlier, in the preferred embodiment the 'message center access code' consists of the digits "*9" and is the same for all subscribers. This code may be used by callers who simply wish to leave a message and do not need to speak with the subscriber. If the 'message center access code' has been entered by the caller, then control passes to the "CPF—Caller Message Center" function as shown at step 1417. If the 'message center access code' has not been entered, then control passes to a connector labelled "CPF DIAL TRANSFER" at reference 1404 to step 1405, where a check is made to determine if the transfer number 707 contains a reference to a reserved phone number (a tag) or a reference to a mode memory. Tags may be used as follows:

| TAG DIGIT | RESERVED PHONE NUMBER |
|---|---|
| 1 | message center number 709 |
| 2 | pager number 710 |
| 3 | office number 711 |
| 4 | home number 712 |
| 5 | mobile phone number 713 |
| 6 | meet-me tag |
| 7 | 'externally entered' number |

As will be described in more detail later in this discussion, if a mode memory 800 has a transfer number 707 that is an 'externally entered' number tag, then when that mode memory is invoked, the transfer number is not changed from the previous value. Also, if a mode memory which contains a transfer number 707 that is an 'externally entered' number tag can be invoked remotely by the subscriber via a Feature Group D trunk, causing the ANI number received by the trunk to be used as the transfer number 707. The reference to the mode memory may be in the form of the two digit mode memory number 10–99. Therefore, at step 1405, if the transfer number 707 contains the digits 1 through 6, or the digits 10 through 99, then control will pass to step 1406. Otherwise, control will pass to step 1409. At step 1406 a determination is made as to whether the transfer number 707 contains the meet-me tag (ie. digit 6). If the meet-me tag is found, then control passes to the CPF—Meet-Me Caller Function via step 1407. If the meet-me tag is not found at step 1406, then control passes to step 1408, where the tag or mode memory is expanded to a real phone number which can be dialed. If the transfer number 707 contains a tag, then the corresponding reserved phone number per the table above is used as the expanded number to be dialed. If the transfer number 707 contained a mode memory number, then the transfer number 707 from the corresponding mode memory 800 is used as the expanded number to be dialed. Control then passes to step 1409, where a determination is made as to whether the transfer number to be dialed can be found as the ACCESS NUMBER 801 in any of the subscriber master records 700. If so, then it is not necessary to do a physical transfer, and the call can be continued on the same trunk by passing control through the connector labelled "CPF VIRTUAL TRANSFER" at reference 1410. Otherwise, at step 1411 a flash is generated by call processor 435 by producing a 700 millisecond on hook signal on the on/off hook control line 485. This flash places the calling party on hold and causes a second dial tone to be returned on trunk 3 by the serving central office of the PSTN 2. At step 1412 a brief pause is introduced to allow time for the dial tone to appear on the trunk, and then at step 1413 the transfer number is dialed via the DTMF generator of call processor 435. Then at step 1418 the 'busy/no-answer' option flag of options 705 of subscriber master record 700 is checked. The function of this option is to handle calls which are being sent to a subscriber even if the subscriber's line is busy or does not answer. If this option is active then at step 1419 a flash is generated by call processor 435 causing the calling party to be taken off hold and connected to the call being placed to the transfer number. The calling party will thus be able to hear the progress of the call and will therefore hear the subscriber answer if the subscriber does indeed answer. At step 1420 a determination is made as to whether the call was local or long distance. If the transfer number was longer than 7 digits, or if the 7 digit number contained a prefix which is long distance in this area, then the call was long distance and a 40 second timer is started at step 1422.

If the transfer number was less than or equal to 7 digits, then the call was local and a 25 second timer is started at step 1421. Then at step 1423 a determination is made as to whether precision busy/ring detector 437 is detecting busy signal, and if not control passes to step 1424. If a busy signal is detected at step 1423, indicating that the subscriber's line is busy, then control passes to step 1429 where a flash is generated by call processor 435 causing the call attempt to be dropped but leaving the calling party connected to the telephone control system 1. Control then passes to a connector labelled "CPF—Sorry" as shown at step 1430, which causes the caller to be sent to the subscriber's message center function. If at step 1423 a busy signal was not detected, then control passes to step 1424 where a determination is made as to whether the timer has expired. If the timer has expired, indicating that neither busy or ringing where detected, then control passes to 1414. If at step 1424 it is determined that the timer has not expired, then control passes to step 1425 where a determination is made as to whether precision busy/ring detector 437 is detecting a first ringing signal, and if not control returns to step 1423. If the first ringing signal is detected at step 1426, then control passes to step 1426, where a determination is made as to whether this is the fourth ring signal, and if so, indicating that the subscriber is not answering the call, then control passes to step 1429 causing the caller to be ultimately routed to the subscriber's message center function as was described earlier. If at step 1426 it is determined that this is not the fourth ring, then control passes to step 1427 where control idles until an end-of-ring is detected by precision busy/ring detector 437. Control then passes to step 1428 where a 6 second 'inter-ring timer' is started. Control then passes to step 1431 where a determination is made as to whether precision busy/ring detector 437 is detecting ringing signal and if so control returns to step 1426. If however at step 1431 it is determined that ringing signal is not being detected, then control passes to step 1432 where the 'inter-ring timer' is checked. If the 'inter-ring timer' has not expired then control returns to step 1431. If the 'inter-ring timer' has expired, indicating the subscriber has answered the call, then control passes to step 1414. At step 1414 an on hook signal is generated on the on/off hook control line 485, causing the call to be transferred to the dialed number, and freing up the trunk 3 to handle another incoming call. Control then passes to the connector labelled "CPF IDLE" at reference 1415.

Figure 15A:
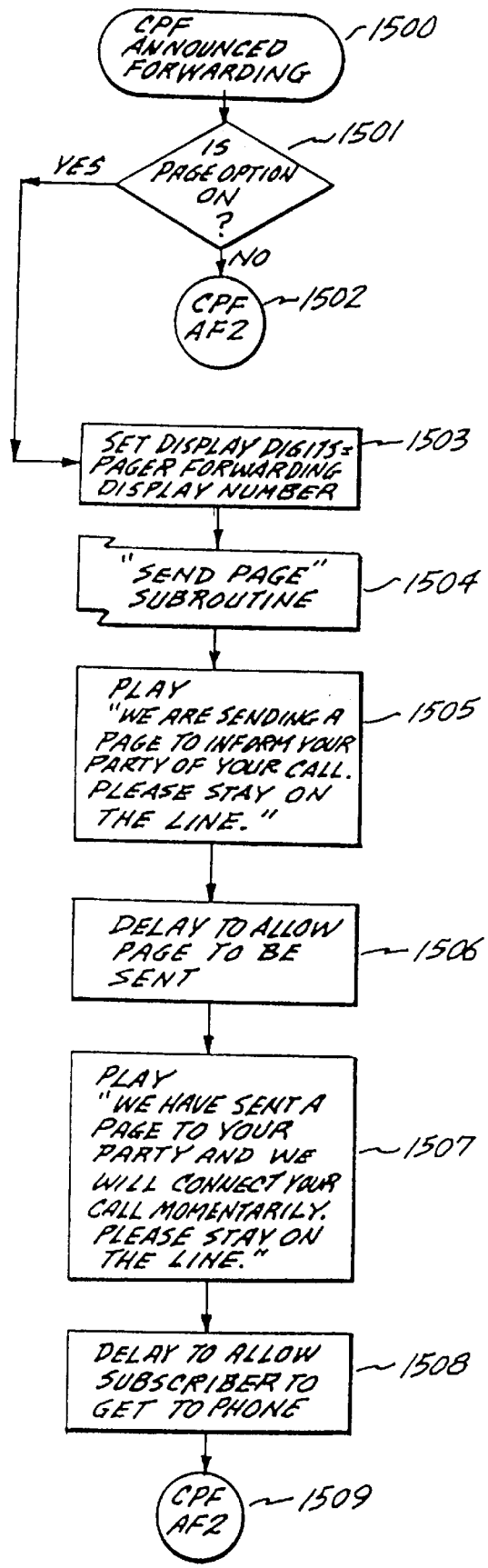
FIGS. 15a and 15b form a flowchart of the Call Processing Facility—Announced Forwarding Function.
Figure 15B:
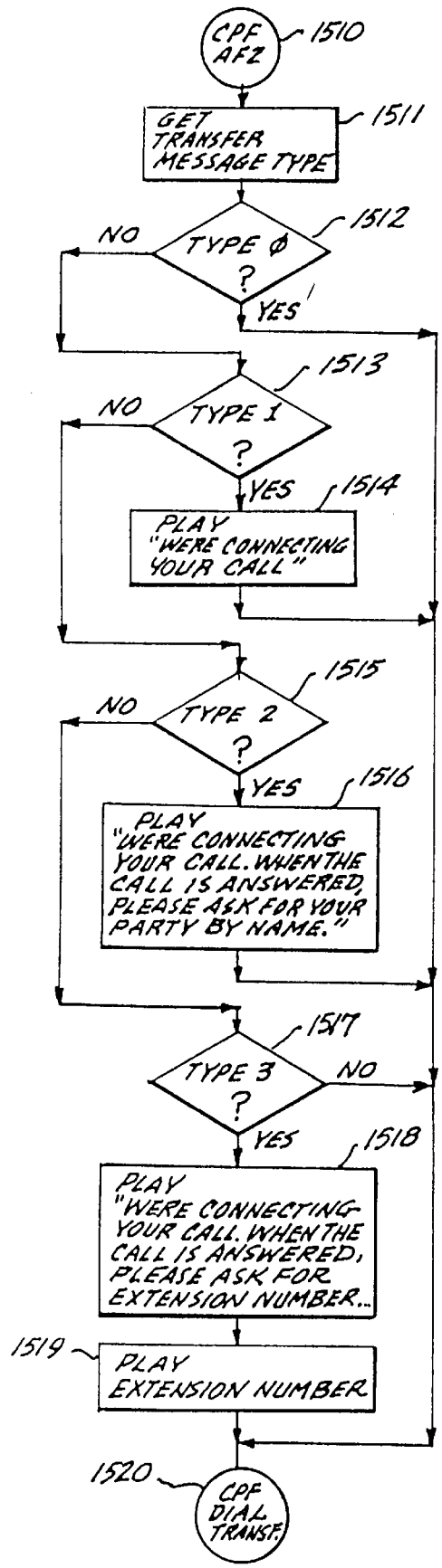

A flowchart of the CPF—Announced Forwarding function is illustrated in FIGS. 15a and 15b. The purpose of this function is to process calls for a subscriber who has selected the 'announced forwarding' call handling mode. In this mode, callers are greeted with a brief courtesy announcement prior to being transferred. In addition, if a 'page option' has been selected, then a page is sent to the subscriber's pager prior to transferring the call. The CPF—Announced Forwarding function is entered at step 1500 and at step 1501, a determination is made as to whether the page flag of options 705 is set, and if it is not set, then control passes to the connector labelled "CPF AF2" at reference 1502. If the page flag is set, the control passes to step 1503 where the display digits are set equal to the pager forwarding display number 717. At step 1504 the 'send page' subroutine is called causing a page to be sent to the subscriber's pager. Then at step 1505, the call processor 435 plays to the caller the message: "We are sending a page to inform your party of your call. Please stay on the line." At step 1506 a delay is initiated to allow the pager sufficient time to receive the page. Then at step 1507, another message is played to the subscriber: "We have sent a page to your party and we will connect your call momentarily. Please stay on the line." At step 1508 an additional delay is initiated to allow the subscriber the opportunity to get to a phone. Control then passes to the connector labelled "CPF AF2" at reference 1509. The connector labelled "CPF AF2" at reference 1510 passes control to step 1511, where the transfer message type 706 is retrieved from subscriber master record 700. Then at step 1512, a check is made as to whether the transfer message type is '0'. If the transfer message type is '0', indicating no transfer message is to be played, then control passes to the connector labelled "CPF DIAL TRANSFER" at reference 1520. If the transfer message type is not '0', then control passes to step 1513 where a check is made to determine if the transfer message type is '1'. If the transfer message type is '1', then at step 1514 the call processor 435 plays to the caller the message: "We're connecting your call", and then control passes to the connector labelled "CPF DIAL TRANSFER" at reference 1520. If the transfer message type is not '1', then control passes to step 1515 where a check is made to determine if the transfer message type is '2'. If the transfer message type is '2', then at step 1516 the call processor 435 plays to the caller the message: "We're connecting your call. When the call is answered, please ask for your party by name", and then control passes to the connector labelled "CPF DIAL TRANSFER" at reference 1520. If the transfer message type is not '2', then control passes to step 1517 where a check is made to determine if the transfer message type is '3'. If the transfer message type is '3', then at step 1518 the call processor 435 plays to the caller the message: "We're connecting your call. When the call is answered, please ask for extension number . . . " Then at step 1519, the extension number 708 is retrieved from the subscriber master record 700 and is voiced to the caller by call processor 435. Control then passes to the connector labelled "CPF DIAL TRANSFER" at reference 1520.

Figure 16:
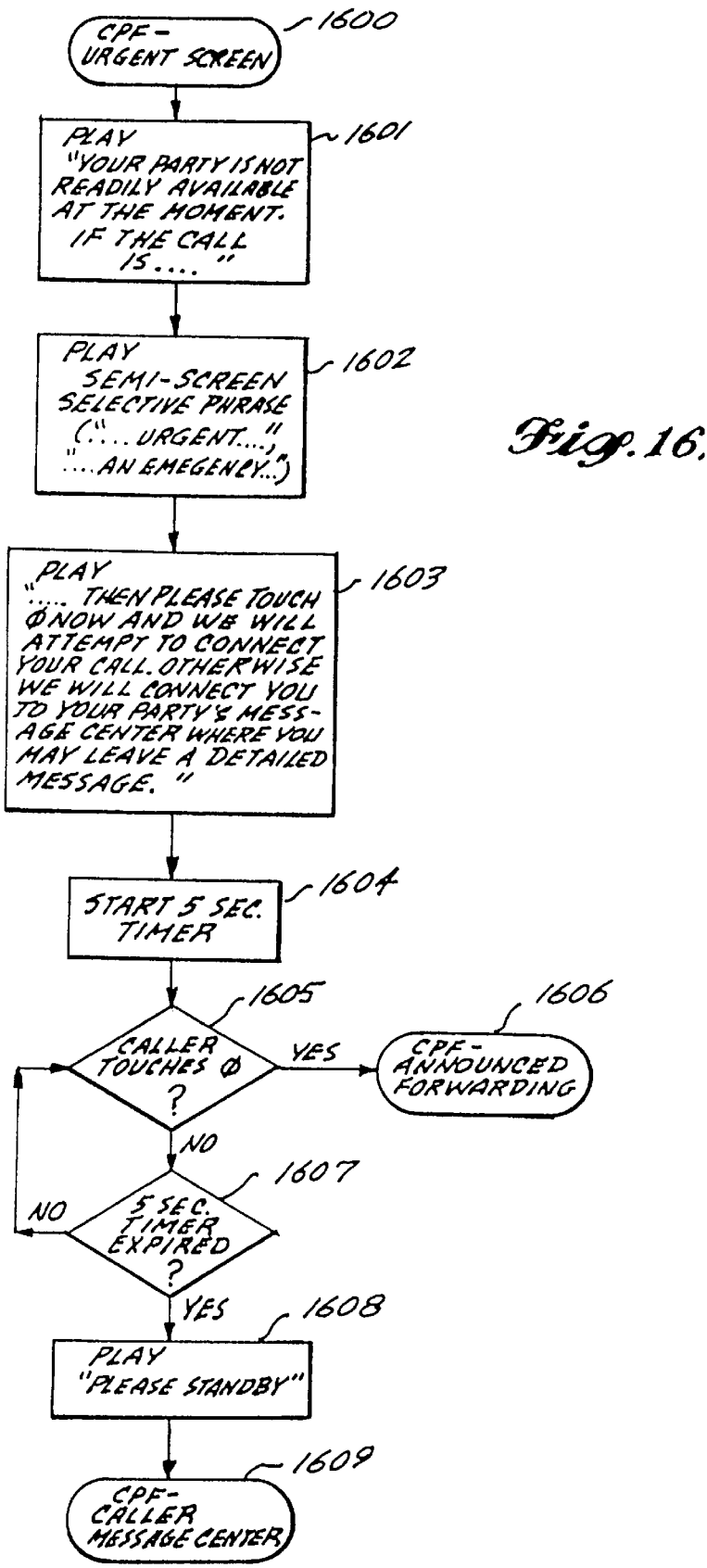
FIG. 16 is a flowchart of the Call Processing Facility—Priority/Urgent Screen Function.

A flowchart of the CPF—Urgent Screen function is illustrated in FIG. 16. The purpose of this function is to process calls for a subscriber who has selected the "priority screen" or 'urgent screen' call handling mode. The CPF—Priority/Urgent Screen function is entered at step 1600, and control passes to step 1601, where call processor 435 plays to the caller the message: "Your party is not readily available at the moment. If this call is . . . " Control then passes to step 1602 where the urgent/emergency flag of the options 705 is checked. If the flag is set for 'urgent', then the call processor 435 plays to the caller ". . . urgent . . . ", and if the flag is set for emergency then call processor 435 plays to the caller ". . . an emergency . . . " Control then passes to step 1603 where the call processor completes the sentence by playing the message ". . . then touch 0 now and we will attempt to connect your call. Otherwise, we will connect you to your party's message center where you may leave a detailed message." Then at step 1604, a 5 second timer is started. At step 1605 a determination is made as to whether the caller has touched 0. If the caller has touched 0, then control passes to the CPF—Announced Forwarding function via step 1606. If the caller has not touched 0, then at step 1607 a determination is made as to whether the 5 second timer has expired. If the 5 second timer has not expired then control returns to step 1605. If the 5 second timer has expired, then at step 1608 the caller is informed: "Please standby". Control then passes to the CPF—Caller Message Center function via step 1609.

Figure 17:
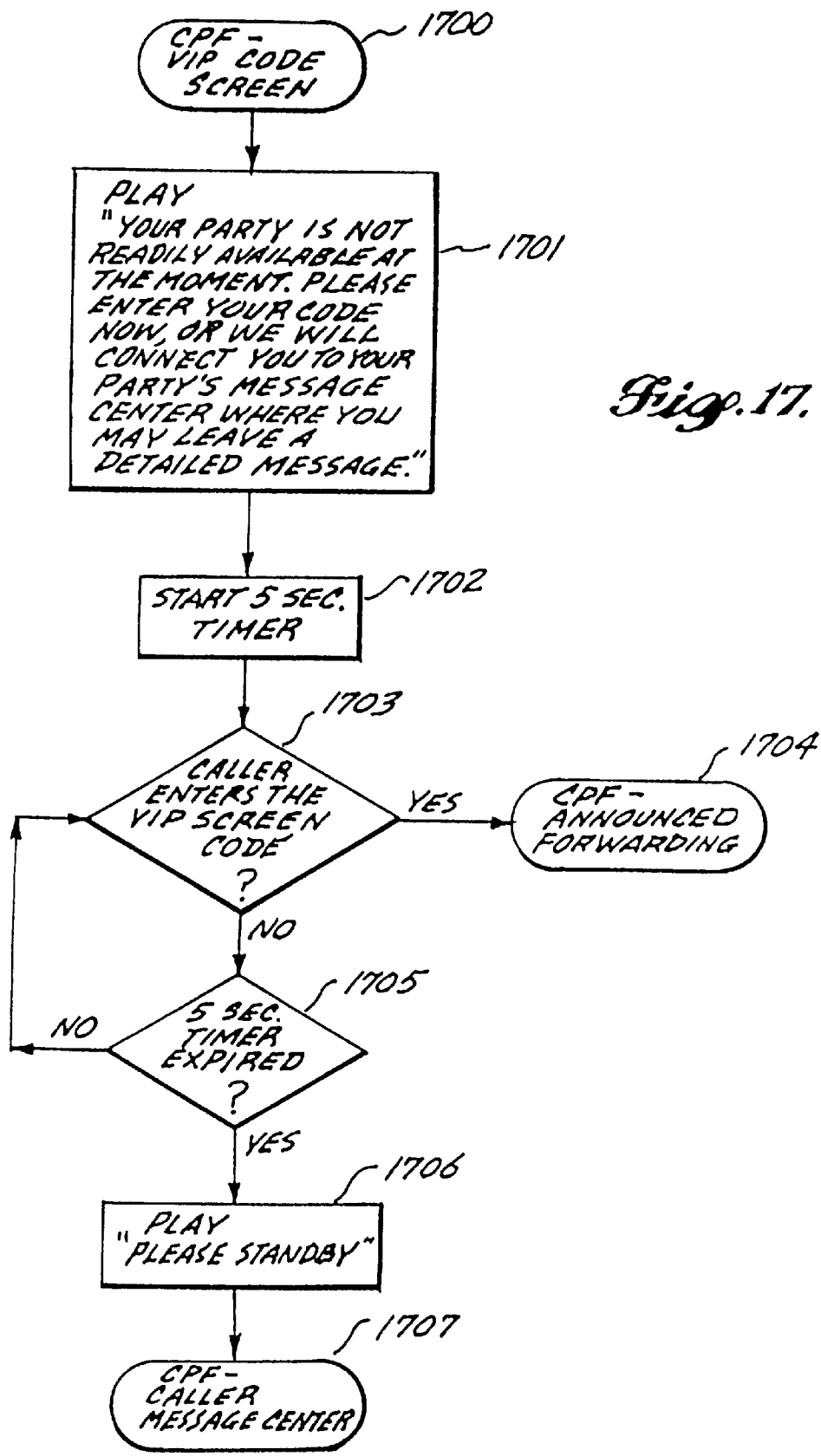
FIG. 17 is a flowchart of the Call Processing Facility—VIP Code Screen Function.

A flowchart of the CPF—VIP Code Screen function is illustrated in FIG. 17. The purpose of this function is to process calls for a subscriber who has selected the 'VIP code screen' call handling mode. The CPF—VIP Code Screen function is entered at step 1700 and control is passed to step 1701 where the call processor 435 plays to the caller the message: "Your party is not readily available at the moment. Please enter your code now, or we will connect you to your party's message center where you may leave a detailed message." Control then passes to step 1702 where a 5 second timer is started. At step 1703 a determination is made as to whether the caller has entered the VIP screen code 714 as stored in the subscriber master record 700. If the caller has entered the correct VIP screen code, then control passes to the CPF—Announced Forwarding function via step 1704. If the caller has not entered the VIP screen code 714, then at step 1705 a determination is made as to whether the 5 second timer has expired. If the 5 second timer has not expired then control returns to step 1703. If the 5 second timer has expired, then at step 1706 the caller is informed: "Please standby". Control then passes to the CPF—Caller Message Center function via step 1707.

Figure 18:
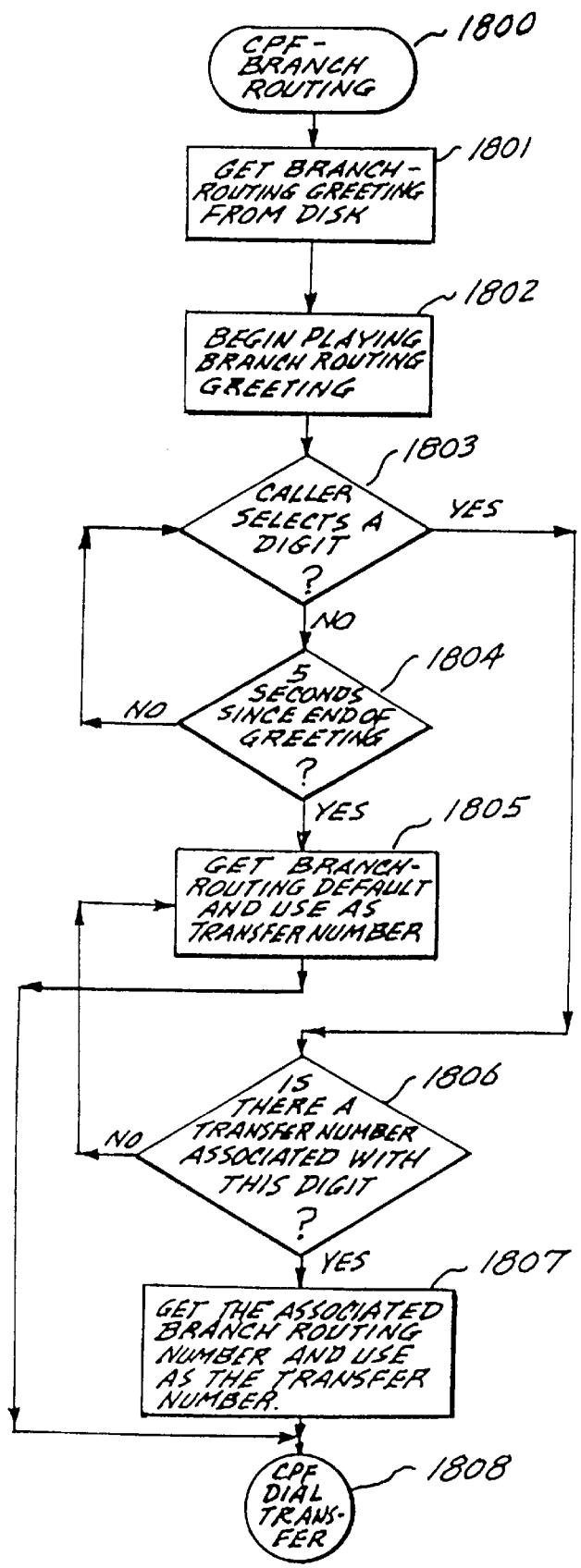
FIG. 18 is a flowchart of the Call Processing Facility—Branch Routing Function.

A flowchart of the CPF—Branch Routing function is illustrated in FIG. 18. The purpose of this function is to process calls for a subscriber who has selected the 'branch-routing' call handling mode. The CPF—Branch Routing function is entered at step 1800, and control passes to step 1801 where the prerecorded branch-routing greeting is retrieved from disk 505. Then at step 1802, the playback to the caller of the branch-routing greeting is begun by call processor 435. At step 1803 a determination is made as to whether the caller has entered a digit. If the caller has not entered a digit then at step 1804 a determination is made as to whether the call processor 435 has completed the playback of the branch-routing greeting, and if an additional 5 seconds have expired. If this is the case then control passes to step 1805. If this is not the case, then control returns to step 1803. If at step 1803 it is determined that the caller has entered a digit, then control passes to step 1806 where a determination is made as to whether there exists a branch-routing number 722 in the subscriber master record 700 which corresponds to the digit entered by the caller. For example, if the subscriber entered digit 4, then a determination is made as to whether the subscriber master record holds a phone number entry in the branch routing number 4 position at 722. If an entry is found in such a manner, then control passes to step 1807. Otherwise, control passes to step 1805 where a the branch routing default number 723 is retrieved for the subscriber master record 700, and is set up to be used as the transfer number for this call. Control then passes to the connector labelled "CPF DIAL TRANSFER" at reference 1808. Should the caller have entered a digit which corresponded to a branch routing number 722, then at step 1807 the corresponding branch routing number 722 is retrieved form the subscriber master record 700, and is setup to be used as the transfer number for this call. Control then passes to the connector labelled "CPF DIAL TRANSFER" at reference 1808.

Figure 19:
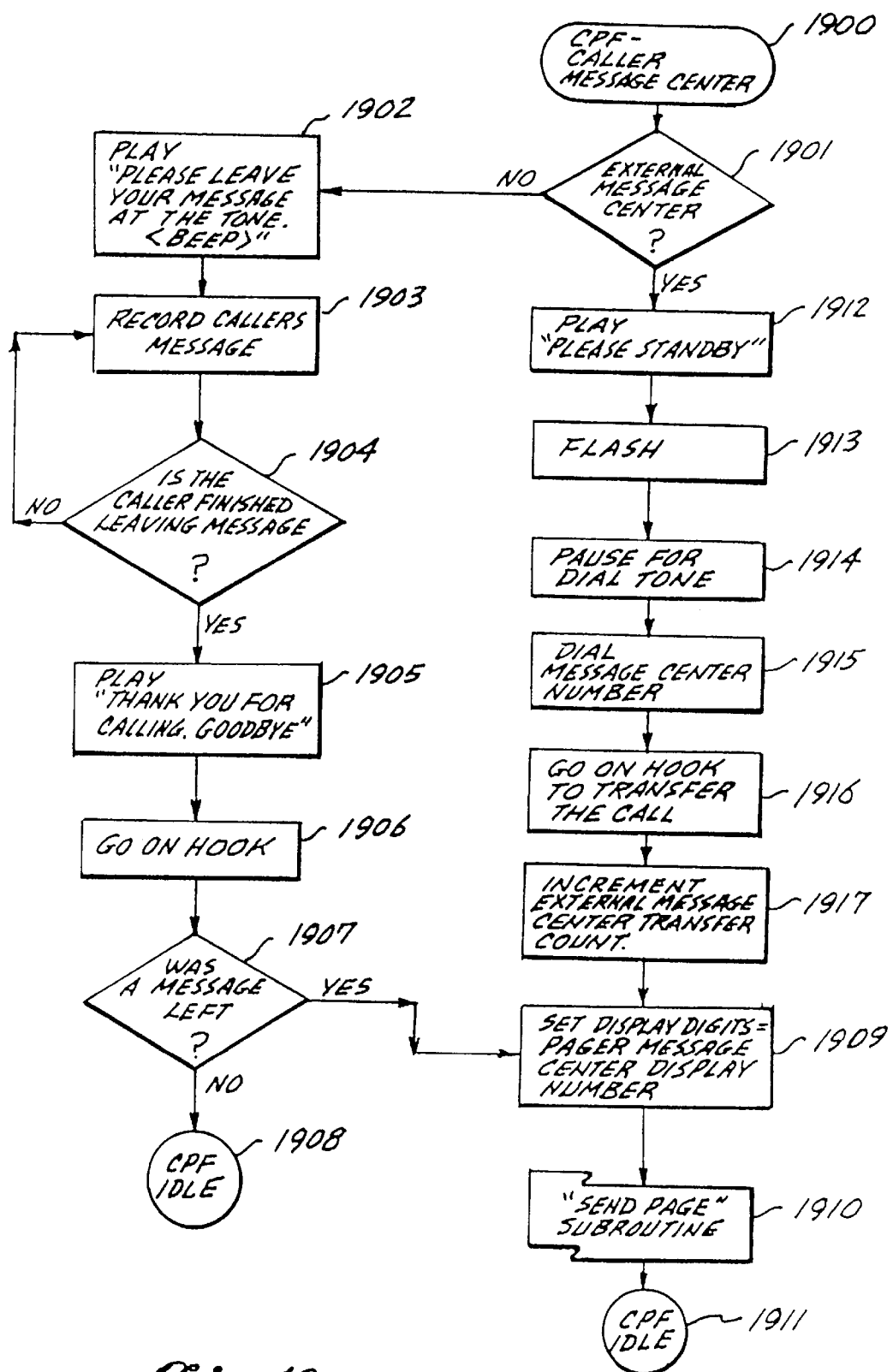
FIG. 19 is a flowchart of the Call Processing Facility—Caller Message Center Function.
Figure 20A:
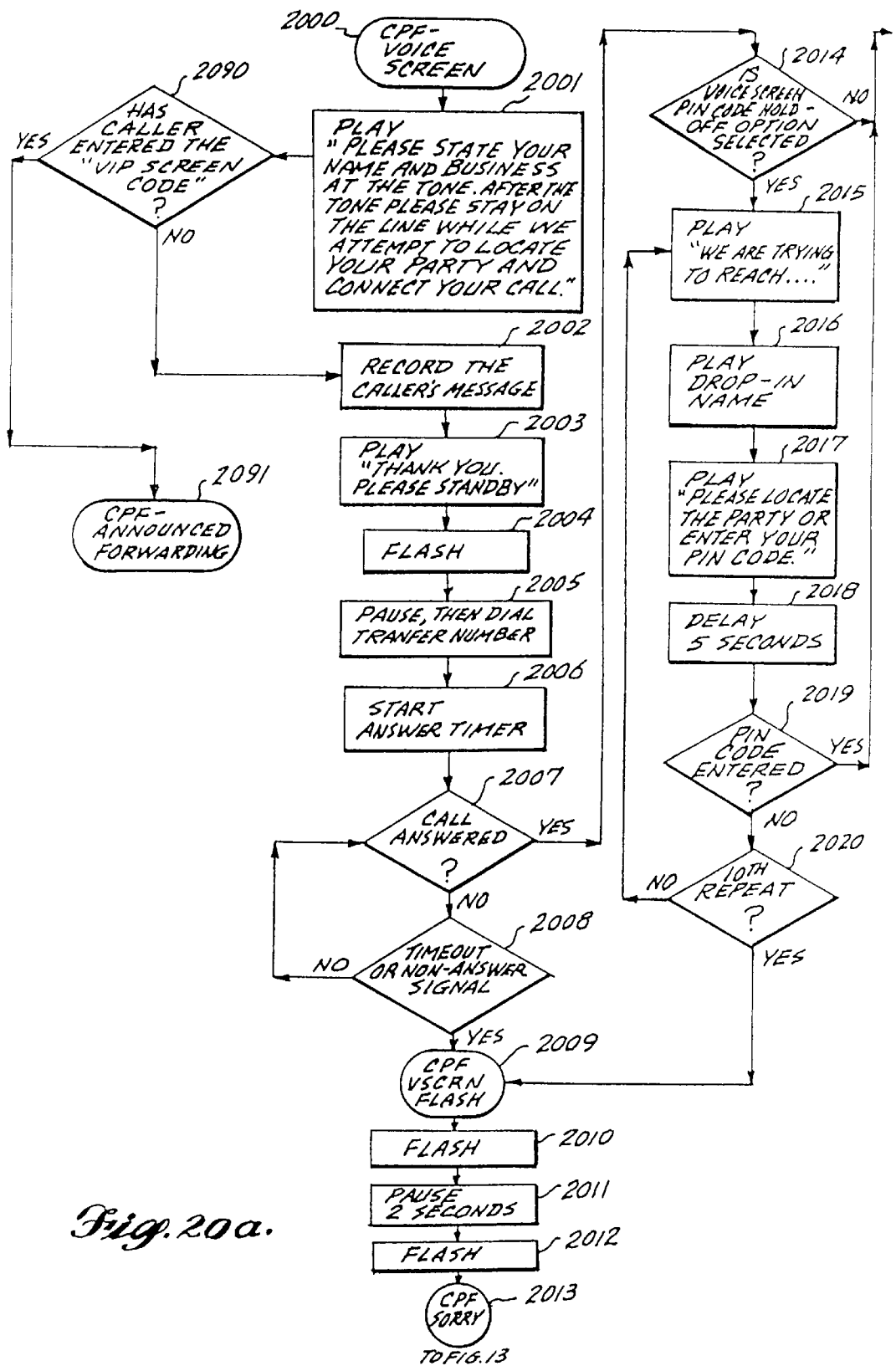
Figure 20B:
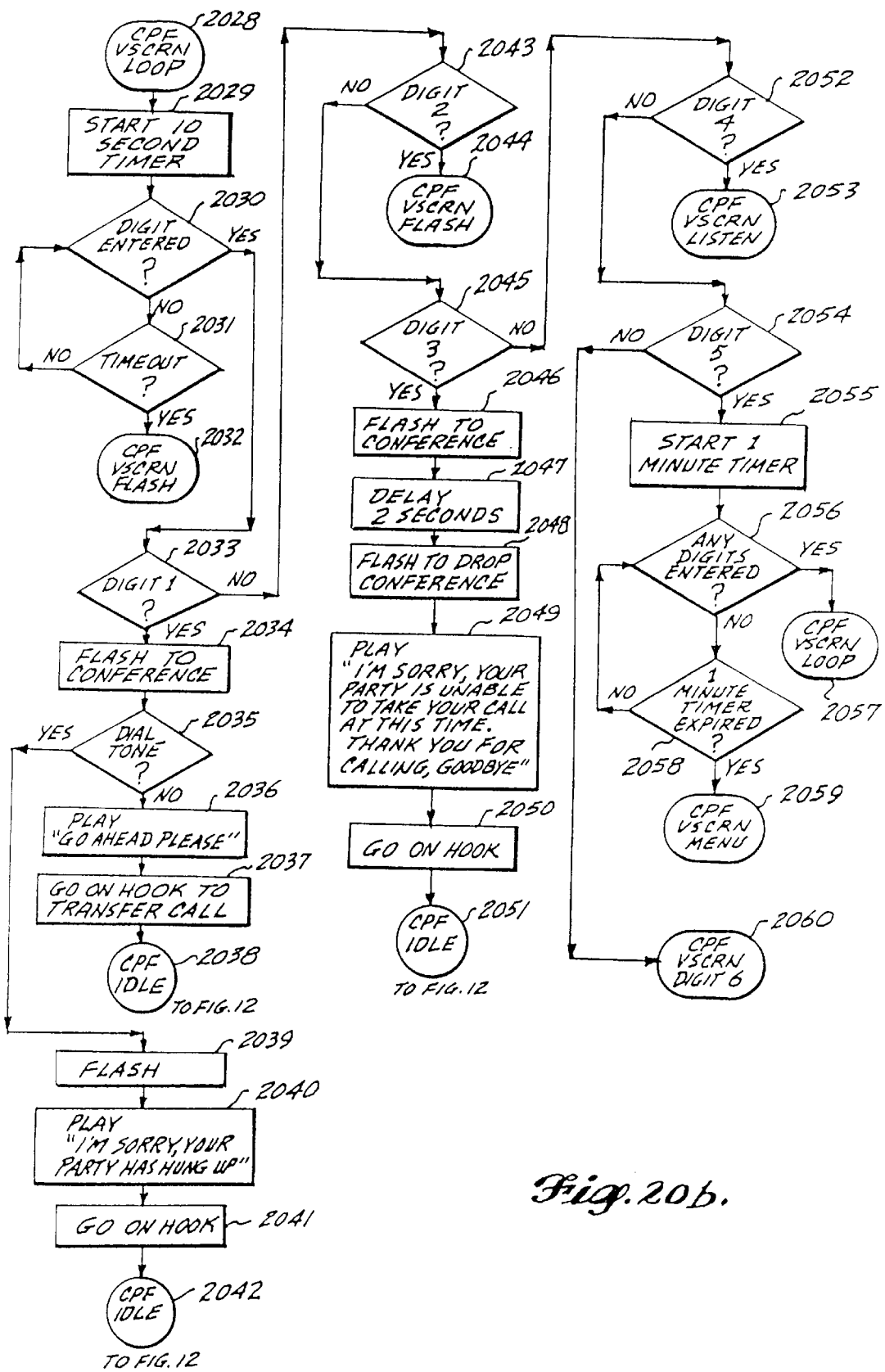
Figure 20C:
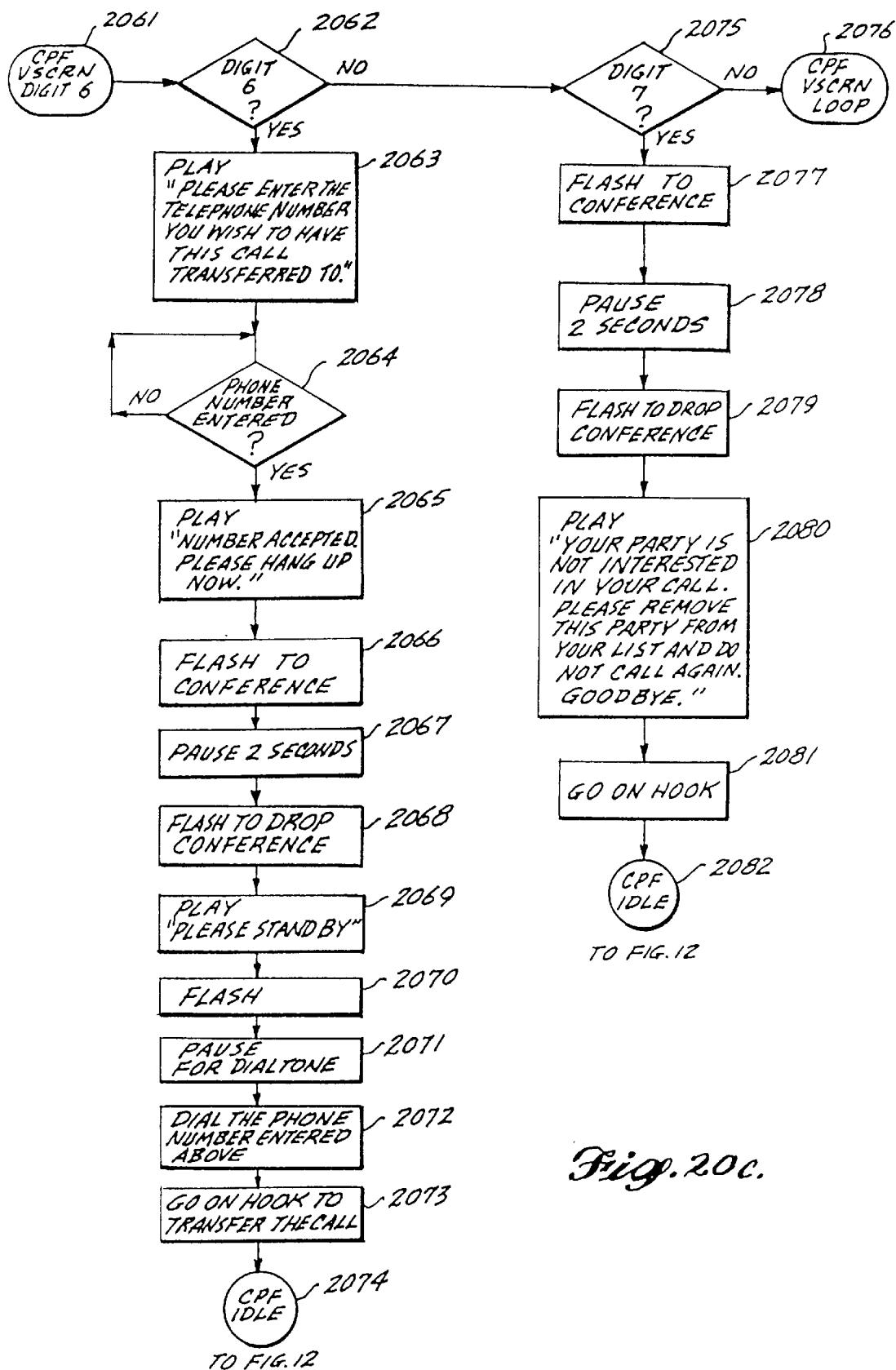

A flowchart of the CPF—caller Message Center function is illustrated in FIG. 19. The purpose of this function is to process calls for a subscriber who has selected the 'message center' call handling mode. The CPF—Caller Message Center function is entered at step 1900 and control passes to step 1901 where a determination is made as to whether an external message center has been selected. This determination is made by examining the message center number 709 in the subscriber master record 700. If the message center number 709 contains a phone number, then external has been selected. If the message center number 709 does not contain a phone number, then internal message center has been selected. The subscriber may chose an external voice mail system, an answering service, his secretary, or any other appropriate phone number for the external message center number 709. If, at step 1901, it is determined that the subscriber has selected the internal message center, then control passes to step 1902, where the caller is prompted: "Please leave your message at the tone . . . BEEP." Then at step 1903 the callers message is recorded by call processor 435 and stored on disk 505. At step 1904 a determination is made as to whether the caller has completed leaving the message. This is accomplished by call processor 435 determining if there has been at least 3 seconds of silence on the line since the last sound. If the caller has not completed leaving a message then the recording continues at step 1903. If the caller has completed leaving a message, then control passes to step 1905, where the caller is prompted: "Thank you for calling. Good-bye." Then at step 1906 the trunk is placed on hook by call processor 435 via on/off hook control signal 485. Control then passes to step 1907, where a decision is made as to whether a message was actually left. A message is determined to be left if at least 3 seconds of non-silence has been recorded, as determined by call processor 435. If a message was not left, then control passes to connector labelled "CPF IDLE" at reference 1908. If a message was left by the caller, then control passes to step 1909, where the 'display digits' are set equal to the pager message center display number. The 'send page' subroutine is then called at step 1910, and control passes to a connector labelled "CPF IDLE" at reference 1911. Returning now to step 1901, if a determination is made, in the manner described above, that an external message center is selected, then control passes to step 1912 where the party is informed by call processor 435: "Please standby," then control passes to step 193 where a flash is generated by call processor 435 by producing a 700 millisecond on hook signal on the on/off hook control line 485. This flash places the calling party on hold and causes a second dial tone to be returned on trunk 3 by the serving central office of the PSTN 2. At step 1914 a brief pause is introduced to allow time for the dial tone to appear on the trunk, and then at step 1915 the message center number 709 is dialed via the DTMF generator of call processor 435. The message center number may contain special dialing characters, including characters for pausing, waiting for tones, and waiting for answer. Thus a sequence of dialing characters may be constructed to allow the Telephone Control System 1 to transfer calls to a voice mail system requiring the entry of a subscriber ID. For example, an external message center dialing sequence for a typical voice mail system may be: 7 digit phone number of voice mail system + Wait for answer +4 digit voice mail subscriber ID. Continuing now, at step 1916 an on hook signal is generated on the on/off hook control line 485, causing the call to be transferred to the dialed number, and freeing up the trunk 3 to handle another incoming call. Control then passes to step 1917 where the 'external message center count' 721 in the subscriber master record 700 is incremented. Control then passes to steps 1909 and 1910 where a page is generated as described above, before returning control to the connector labelled "CPF IDLE" at reference 1911.

A flowchart of the CPF—Voice Screen function is illustrated in FIGS. 20a, 20a-1, 20b and 20c. The purpose of this function is to process calls for a subscriber who has selected the 'voice screen' call handling mode. The CPF—Voice Screen function is entered at step 2000 and control passes to step 2001 where the caller is prompted by call processor 435: "Please state your name and business at the tone. After the tone please stay on the line while we attempt to locate your party and connect your call . . . BEEP." Control then passes to step 2090 where a determination is made as to whether the caller has entered the 'VIP screen code' 714, and if so control passes to the "CPF—Announced Forwarding" function as shown at step 2091. In this way, a caller who knows the 'VIP screen code' is able to be forwarded directly to the subscriber without being voice-screened. If, however, at step 2090 it is determined that the caller has not entered the 'VIP screen code' 714 then control passes to step 2002 where the caller's message is recorded by call processor 435 and stored temporarily on disk 505. At step 2003, the call processor 435 determines that the caller has completed stating his name and business, by detecting the sound of the voice followed by approximately 3 seconds of silence, at which point the call processor 435 prompts the caller: "Thank you, please standby." A flash is generated at step 2004, causing the caller to be placed on hold by the switch 4, and at step 2005 a pause is initiated to allow time for the switch 4 to provide a dial tone, at which point the transfer number 707 is dialed by the DTMF generator of call processor 435. At step 2006, an 'answer timer' is started. At step 2007 a determination is made by call processor 435 as to whether the call has been answered. If the call has not been answered, then at step 2008 a decision is made as to whether a time-out or non-answer signal such as a busy, reorder, or operator intercept has been detected by call processor 435. If so, then control proceeds through a connector labelled "CPF VSCRN FLASH" at reference 2009, to step 2010. Otherwise control returns to step 2207. At step 2010, a flash is generated, causing switch 4 to temporarily conference the caller through to the non-answer signal, and at step 2011 a 2 second pause is invoked. Then at step 2012 another flash is generated causing switch 4 to drop the conference and restore a simple 2-way connection between the caller and the trunk 3. Control then passes to a connector labelled "CPF SORRY" at reference 2013, resulting in the caller being connected to the subscriber's message center as described earlier in FIG. 13. Returning the discussion now to step 2007, if a determination is made that the call is answered, then control passes to step 2014 where the 'voice screen PIN code hold-off flag' of options 705 of the master record 700 is checked. If this flag has been set, it means that the subscriber wishes to require that a PIN code be entered by the answering party before the called party's message is played. This is very useful if the subscriber is having his calls voice-screen forwarded to his office, for example, where the receptionist may answer the call. In this case the receptionist would connect the call to the subscriber and the subscriber would enter his PIN code to hear the calling party's message before determining whether he wishes to be connected to the calling party. If this flag is set, then control passes to step 2015, where call processor 435 prompts the answering party: "We are trying to reach . . . ". Then at step 2016, the subscriber's prerecorded 'drop-in' name is retrieved from disk 505 and played back to the answering party. At step 2017, the answering party is informed: "Please locate the party or enter your PIN code." Then at step 2018, a 5 second delay is introduced, and at step 2019, a determination is made as to whether the answering party has entered the PIN code 702. If the PIN code is entered, then control passes to step 2021. Otherwise, control passes to step 2020, where a determination is made as to-whether the sequence of steps 2015 through 2020 has been repeated ten times. If not, then control returns to step 2015, and the sequence is repeated again. However, if this is the tenth repeat, then control passes to the connector labelled "CPF VSCRN FLASH" at reference 2009, and the calling party is sent to the subscriber's message center as described earlier. If, at step 2014, it is determined that the 'voice screen PIN code hold-off flag' is not set, or if it is set and the PIN code has been entered as determined at step 2019, then control passes to step 2021, where the answering party is informed by call processor 435: "We have a call holding for . . . ", and then to step 2022 where the subscriber's 'drop-in' name is retrieved from disk and played. Then at step 2023, which is identified by the connector labelled "CPF VSCRN LISTEN" at reference 2024, the caller's message which was originally recorded at step 2002 is retrieved from disk 505 and played by call processor 435 to the subscriber. Then at step 2025, which is identified by the connector labelled "CPF VSCRN MENU" at reference 2026, the subscriber is prompted: "Please touch 1 to connect the call, 2 to send the caller to your message center, 3 to politely send the caller away, 4 to listen to the caller's message again. 5 to place the caller on hold for 1 minute, 6 to transfer the call elsewhere, or 7 to ask the caller not to call again." Control then passes through a connector labelled "CPF VSCRN LOOP" at reference 2027. At reference 2028, the connector labelled "CPF VSCRN LOOP" passes control to step 2029 where a 10 second timer is started. Then at step 2030, a determination is made as to whether a digit has been entered by the subscriber, and if so control passes to step 2033. Otherwise, control passes to step 2031 where the 10 second timer is checked, and if it has not expired control returns to step 2030. If the timer has expired, then control is passes to the connector labelled "CPF VSCRN FLASH" at reference 2032, and the caller is connected to the message center as described earlier. If a digit has been entered by the subscriber, then at step 2033, the digit is checked and if it is not '1', control is passes to step 2043. If the digit is '1', then control passes to step 2034, where a flash is generated causing the calling party and the subscriber to be conferenced by switch 4. Then at step 2035 a determination is made as to whether dial tone is present on the line. If so this would indicate that the conference failed, most likely because the calling party had hung up. If this is the case, then control passes to step 2039. Otherwise, if dial tone is not detected, then at step 2036, both the calling party and the subscriber hear call processor 435 play the prompt: "Go ahead please.", and at step 2037, the trunk 3 is placed on hook causing the switch 4 to transfer the call allowing the calling party and the subscriber to continue their conversation, while at the same time freeing up trunk 3 to handle another incoming call by passing control back to the CPF—Call Handler Task via the connector labelled "CPF IDLE" at reference 2038. If the caller had hung up as determined by the detection of dial tone at step 2035, then at step 2039 another flash is generated to cause switch 4 to take the subscriber off of hold. Then at step 2040, the subscriber is informed: "I'm sorry, your party has hung up", and at step 2041 trunk 3 is placed on hook and control is returned to the CPF—Call Handler Task via the connector labelled "CPF IDLE" at reference 2042. If, as described earlier, at step 2033 it is determined that the digit is not '1', then control is passes to step 2043 where it is determined whether the digit is a '2', and if so control is passes to the connector labelled "CPF VSCRN FLASH" at reference 2044 causing the calling party to be connected to the message center as was described earlier. If the digit is not '2', then control passes to step 2045, where it is determined if the digit is a '3', and if not control passes to step 2052. If the digit is a '3', then control passes to step 2046, where a flash is generated causing switch 4 to temporarily conference the calling party and the subscriber. Then after a 2 second pause at step 2047, another flash is generated at step

2048 causing switch 4 to terminate the conference by dropping the subscriber, leaving just the calling party connected to trunk 3. Then at step 2049, the calling party is informed by call processor 435: "I'm sorry, your party is unable to take your call at this time. Thank you for calling. Good-bye." Then at step 2050, the trunk 3 is placed on hook thereby disconnecting the calling party and control is returned to the CPF—Call Handler Task via the connector labelled "CPF IDLE" at reference 2051. If, as described earlier, at step 2045 it is determined that the digit is not '3', then control is passes to step 2052 where it is determined whether the digit is a '4', and if so control is passes to the connector labelled "CPF VSCRN LISTEN" at reference 2053, allowing the subscriber to again hear the calling party's message as described earlier. If at step 2052 it is determined that the digit is not a '4', then control passes to step 2054 where the digit is checked to determine if it is a '5', and if it is not control passes to a connector labelled "CPF VSCRN DIGIT" at reference 2060. If the digit is a '5, then control passes to step 2055 where a one minute timer in started. Then at step 2056 a determination is made whether any further digits have been entered by the subscriber, and if not control passes to step 2058 where the one minute timer is checked. If the timer is found to have expired, then control passes to a connector labelled "CPF VSCRN MENU" at reference 2059, causing the menu of step 2025 to be replayed to the subscriber. If the timer is found to have not expired, then control returns to step 2056 where a determination is again made as to whether any digits have been entered by the subscriber, and if so control passes to a connector labelled "CPF VSCRN LOOP" at reference 2057, thereby allowing the digit to be processed. The connector labelled "CPF VSCRN DIGIT6" at reference 2061 causes control to be passed to step 2062 where a determination is made as to whether the digit pressed by the subscriber is a 6, and if not control passes to step 2075. If the digit is a '6', then control passes to step 2063 where the subscriber is prompted by call processor 435: "Please enter the telephone number you wish to have this call transferred to." Then at step 2064, the control idles, waiting for a telephone number to be entered by the subscriber. If a phone number is entered, then control passes to step 2065, where the subscriber is prompted: "Number accepted. Please hang up now." Then at step 2066 a flash is generated causing switch 4 to temporarily conference the calling party and the subscriber. Then, after a 2 second pause at step 2067, another flash is generated at step 2068 causing switch 4 to terminate the conference by dropping the subscriber, leaving just the calling party connected to trunk 3. Then at step 2069 the calling party is prompted by call processor 435: "Please standby." Then at step 2070 a flash is generated causing switch 4 to place the calling party on hold and providing a dial tone to the trunk 3. Then, after a pause for dial tone at step 2071, the phone number detected in step 2064 is dialed at step 2072, and at step 2073 trunk 3 is placed on hook causing switch 4 to transfer the calling party to the phone number dialed, and control is returned to the CPF—Call Handler Task via the connector labelled "CPF IDLE" at reference 2074. If, as described earlier, at step 2062 it is determined that the digit entered by the subscriber is not a '6', then control passes to step 2075. At step 2075, a determination is made as to whether the digit is a '7', and if not then control passes to a connector labelled "CPF VSCRN LOOP" at reference 2076 thereby allowing the subscriber to enter another digit. If the digit entered is a '7', as determined at step 2075, then control passes to step 2077 where a flash is generated causing switch 4 to temporarily conference the calling party and the subscriber. Then, after a 2 second pause at step 2078, another flash is generated at step 2079 causing switch 4 to terminate the conference by dropping the subscriber, leaving just the calling party connected to trunk 3. Then at step 2080 the calling party is prompted by call processor 435: "Your party is not interested in your call. Please remove this party from your list and do not call again. Good-bye." Then at step 2081 trunk 3 is placed on hook causing switch 4 to disconnect the calling party, and control is returned to the CPF—Call Handler Task via the connector labelled "CPF IDLE" at reference 2082.

Figure 21A:
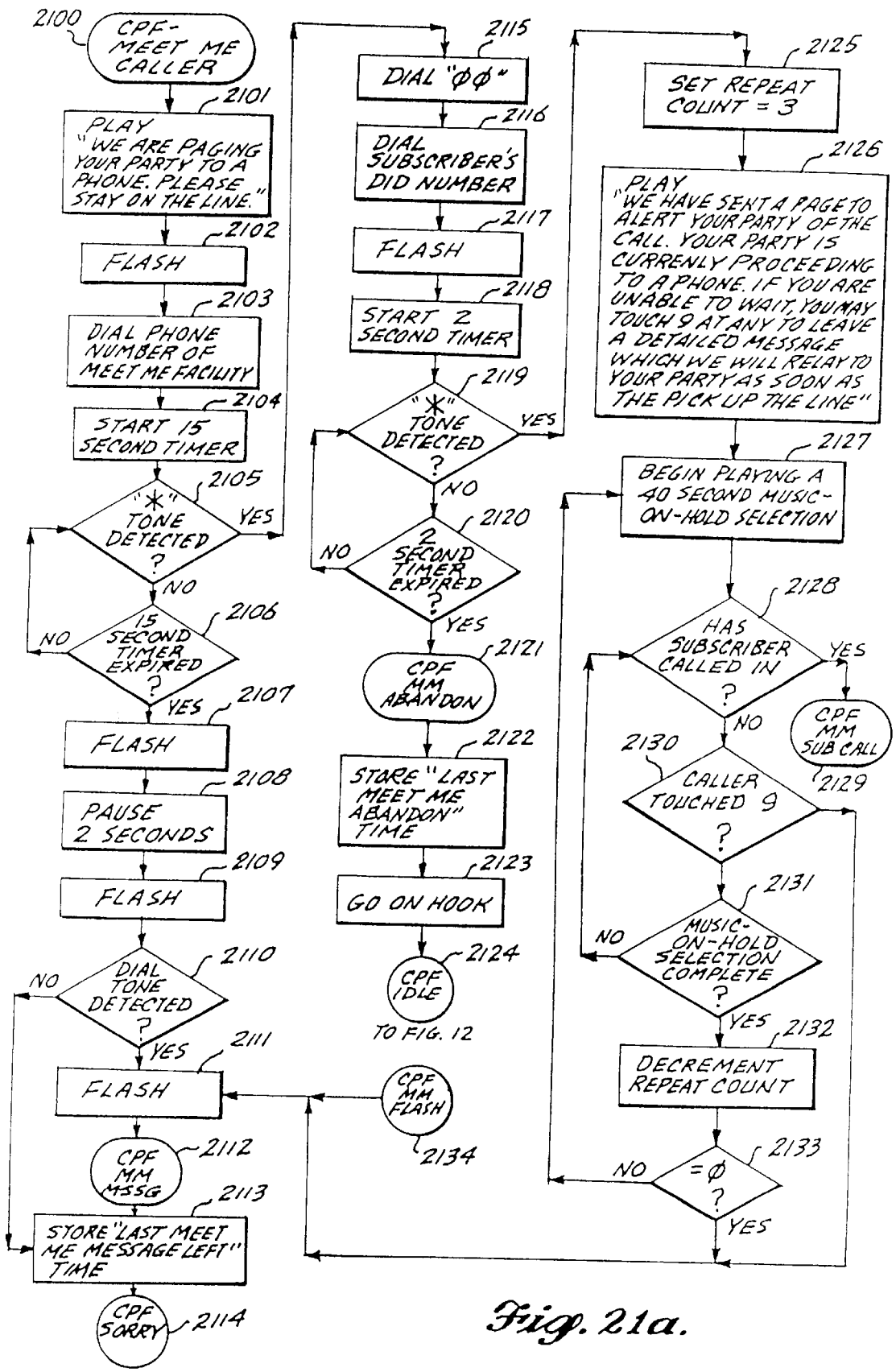
FIGS. 21a and 21b form a flowchart of the Call Processing Facility—Meet Me Caller Function.
Figure 21B:
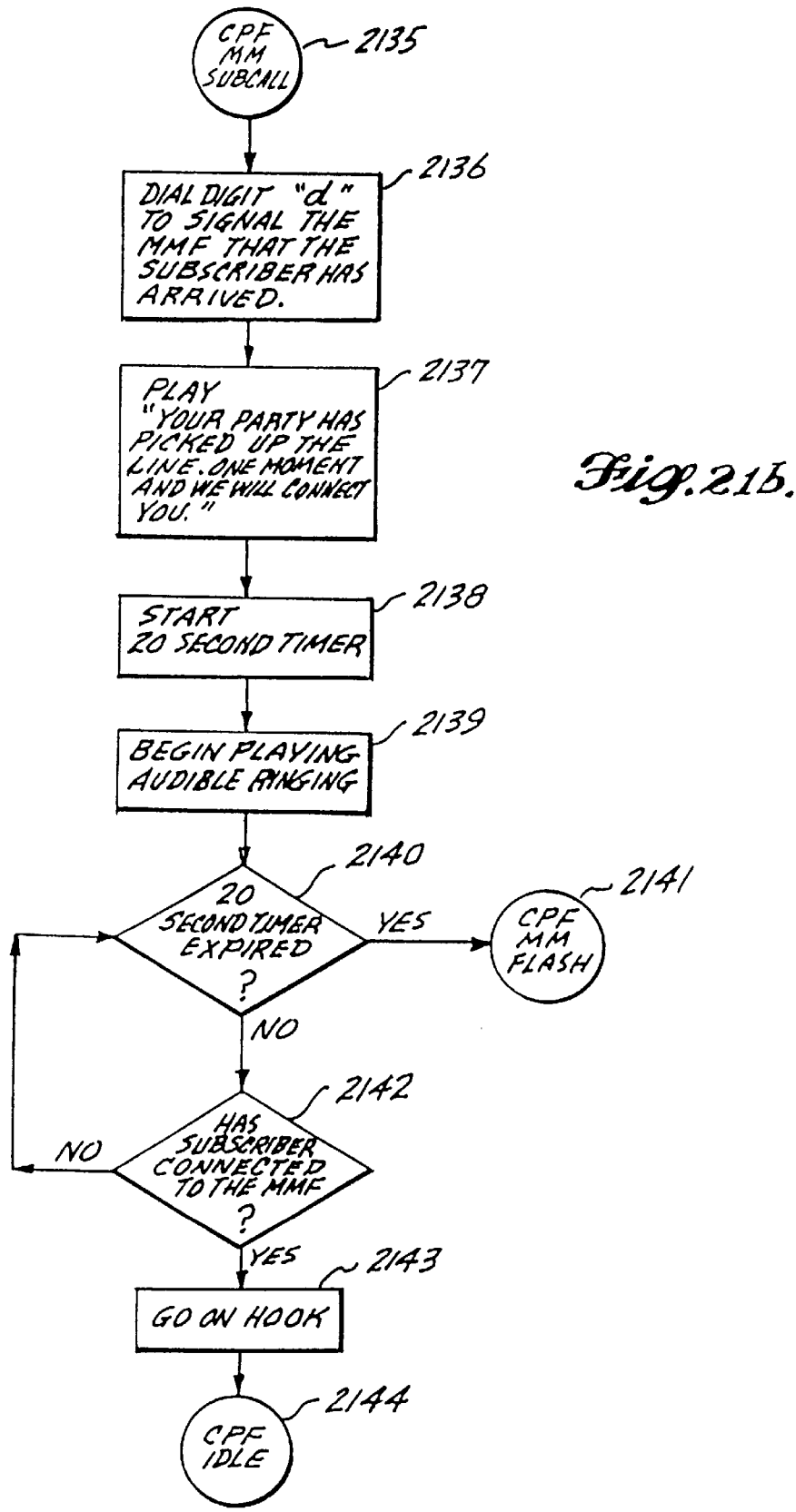

A flowchart of the CPF—Meet Me Caller function is illustrated in FIGS. 21*a* and 21*b*. The purpose of this function is to process calls for a subscriber who has chosen to have his calls handled by the meet-me function. In the preferred embodiment these calls are handled by conferencing the caller on a trunk 3 of the CPF 100 with a line 120 on the Meet-Me Facility (MMF) 115. Then when the subscriber calls in to be connected, he is also conference from a trunk 3 of the CPF 100 with a line 120 on the MMF 115. The CPF may then hang up on both the caller's trunk 3 and then subscriber's trunk 3, thereby transferring the caller and subscriber to the MMF lines 120. The lines 120 are provisioned with the CENTREX features of 'call transfer' and 'barge-in', so that the caller and subscriber may then be connected as follows: The line 120 which is connected to the caller dials the CENTREX barge-in command (*77) followed by the CENTREX 'intercom code' for the line 120 which is connected to the subscriber. The caller and the subscriber are thus connected, and the line 120 which connects to the subscriber may then go on hook, transferring the subscriber to the caller's line 120. The conversation may then take place and only one line of line 120 is used. To fully understand the explanation of the CPF—Meet Me Caller function which follows, it is necessary to also review the explanations which are associated with FIG. 30 (CPF—Command Meet Me), FIG. 33 (MMF block diagram), and FIG. 34 (Meet Me Facility Main Task). Referring now to FIG. 21, the CPF—Meet Me Caller function is entered at step 2100 and control passes to step 2101 where the calling party is informed by call processor 435: "We are paging your party to a phone. Please stay on the line." Then at step 2102 a flash is generated causing switch 4 to place the calling party on hold and generate a dial tone on trunk 3. Then at step 2103 the call processor 435 dials the phone number which is associated with one of the lines 120 which are connected to the Meet-Me Facility (MMF) 115, and at step 2104 a 15 second timer is initiated. Then at step 2105, a determination is made as to whether DTMF '*' tone has been detected by call processor 435, indicating that the MMF 115 has answered. If the '*' tone is not detected, then control passes to step 2106 where the 15 second timer is checked, and if found to have not expired then control returns to step 2105. If the 15 second timer is found to have expired, then control passes to step 2107, where a flash is generated causing switch 4 to temporarily conference the calling party to the number dialed above. Then after a 2 second pause at step 2108, another flash is generated at step 2019, causing switch 4 to drop the dialed number from the conference, leaving just the calling party connected to trunk 3. Then at step 2110, a check is made to determine if dial tone is present on trunk 3. If dial tone is found to be present, indicating that the sequence of steps 2107 through 2109 had failed to restore the calling party possibly because the conference thought to be created at step 2107 was not allowed by switch 4, then another flash is generated at step 2111, which is identified by a connector labelled "CPF MM FLASH" at reference 2134. This flash causes switch 4 to reconnect the calling party to trunk 3, and then control passes via a connector labelled "CPF MM MSSG" at reference 2112 to step 2113. If dial tone is not detected at step 2110, then control passes directly to step 2113. At step 2113, the current time and date is stored in the 'last meet-me message left' field 720 of the subscriber master record 700, and then control passes to the connector labelled "CPF SORRY" at reference 2114, causing the caller to be connected to the message center as was described earlier. If at step 2105, the '*' tone is detected, indicating that the MMF 115 has answered, then control passes to step 2115 where call processor 435 dials the digit '00' signifying that this is a caller, not a subscriber. Then at step 2116, the call processor 435 dials the subscriber's DID number 701, to identify to the MMF who the calling party is waiting for. Then at step 2117, a flash is generated, causing switch 4 to conference the calling party through to this line 120 of the MMF 115, and at step 2118 a 2 second timer is initiated. Then at step 2119, a determination is made as to whether another '*' tone is detected by call processor 435, indicating the conference was successful. If the '*' tone is not detected, this implies that the conference was not successful, most likely because the calling party has hung up. In this case the 2 second timer is checked at step 2120, and if it is found not to have expired control returns to step 2119. If the 2 second timer has expired, then control passes via a connector labelled "CPF MM ABANDON" at reference 2121 to step 2122 where the current time and date are stored in the 'last meet-me abandon' field 719 of the subscriber master record. Then control passes to step 2123 where the trunk 3 is placed on hook and control is returned to the CPF—Call Handler Task via the connector labelled "CPF IDLE" at reference 2124. If at step 2119 the '*' tone is detected, then control passes to step 2125 where a repeat count is set to a value of 3. Then at step 2126, the calling party is informed by call processor 435: "We have sent a page to alert your party of the call. Your party is currently proceeding to a phone and we will connect you momentarily. If you are unable to wait, you may touch 9 at any time to leave a detailed message which we will relay to your party as soon as they pick up the line." Then at step 2127, the call processor 435 plays a 'music on-hold' selection of duration 40 seconds. Then at step 2128 a determination is made as to whether the subscriber has called in, by checking the CPF—Call Handler Tasks controlling the other trunks 3 connected to the CPF 100. If the subscriber is found, and if he has entered his PIN code 702 and touched 4 indicating he wishes to be connected to the caller, then step 2128 will return a positive indication causing control to pass to the connector labelled "CPF MM SUBCALL" at reference 2129. If a negative indication is returned at step 2128, then control passes to step 2130 where a determination is made as to whether the caller has entered '9'. If the caller does enter '9', then control passes to step 2111, causing the caller to be connected to the message center as describer earlier. If the caller has not entered '9', then control passes to step 2131, where a determination is made as to whether the 40 second music-on-hold selection is complete. If it is not complete, then control returns to step 2128. If the selection is complete, then control passes to step 2132 where the repeat count is decremented. Then at step 2133 a determination is made as to whether the value of the repeat count is now zero. If the value is zero, then control passes to step 2111, causing the caller to be connected to the message center as describer earlier. If the value of the repeat count is not yet zero, then control returns to step 2127, where the sequence of steps 2127 through 2133 is repeated once more. The connector labelled "CPF MM SUBCALL" at reference 2135 causes control to be passed to step 2136 where the DTMF fourth column tone digit 'd' is dialed by call processor 435 to inform the MMF 115 that the subscriber has arrived. Then at step 2137, the call processor 435 prompts the calling party: "Your party has picked up the line. One moment and we will connect you." Then at step 2138, a 20 second timer is initiated, and at step 2139 the call processor 435 begins to play audible ringing, with a cadence of 2 seconds on, 4 seconds off, to the caller. Then at step 2140, the 20 second timer is checked, and if it is found to have expired, indicating that the subscriber did not connect to the MMF 115, then control passes to the connector labelled "CPF MM FLASH" at reference 2141, causing the caller to be connected to the message center as was described earlier. If the 20 second timer has not expired, then control passes to step 2142 where a determination is made as to whether the subscriber has connected to the MMF 115, as determined by checking with the CPF—Call Handler Task that was found to be controlling the trunk 3 connected to the subscriber. If the subscriber has not connected to the MMF 115, then control returns to step 2140. If the subscriber has connected to the MMF 115, then the trunk 3 is placed on hook causing switch 4 to transfer the calling party to the line 120 of the MMF 115, and control is returned to the CPF—Call Handler Task via the connector labelled "CPF IDLE" at reference 2144.

Figure 22:
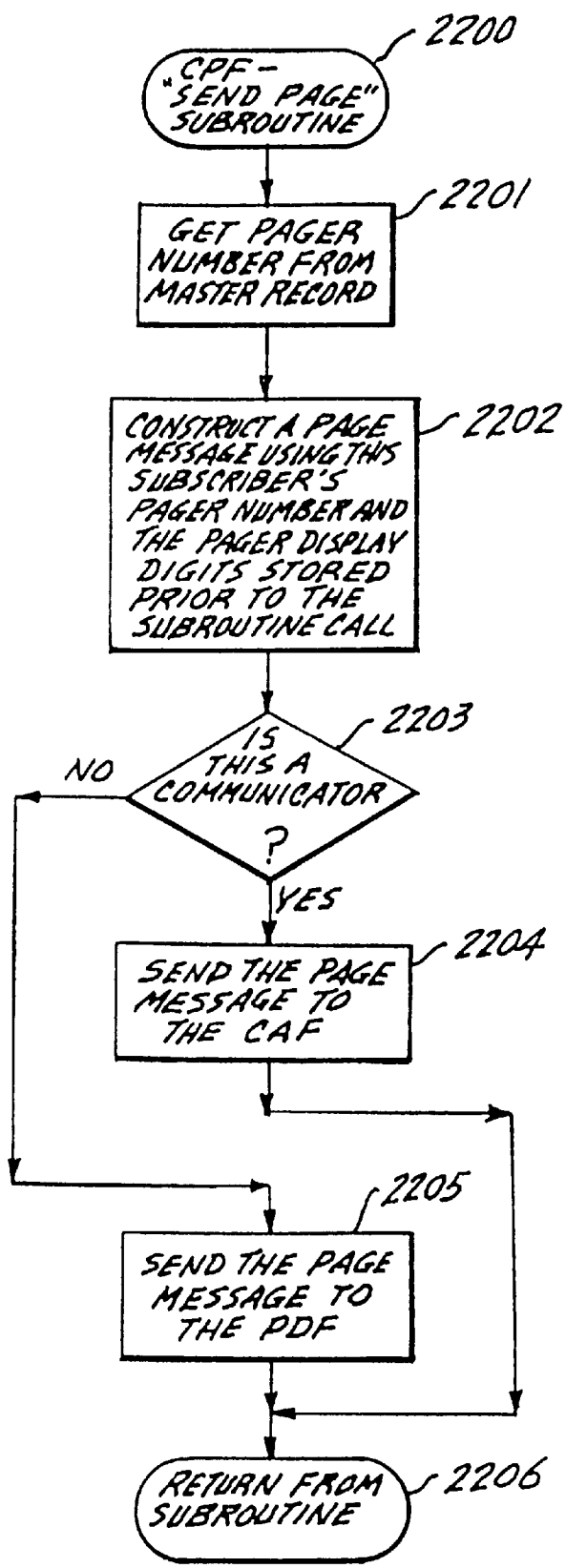
FIG. 22 is a flowchart of the Call Processing Facility—'Send Page' Subroutine.

A flowchart of the CPF—Send Page Subroutine is illustrated in FIG. 22. The purpose of this subroutine is to send page messages via the high speed data network 150 from the CPF 100 to either the PDF 105, or the CAF 125. These messages contain the pager number and any digits which are to be transmitted to the display of the pager. The CPF—Send Page Subroutine is entered at step 2200 and control passes to step 2201 where the pager number 710 for this subscriber is retrieved from the subscriber master record 700. Then at step 2202, a message is constructed consisting of the pager number 710, and the display digits which were identified as this subroutine was called. Then at step 2203 a determination is made as to whether the pager number 710 represents a communicator. In the preferred embodiment, each communicator 11 is identified by a pager number 710 which starts with the digits '000'. If the pager number 710 is found to be that of a communicator 11, then control passes to step 2204, and the data network interface 510 is instructed to send the message via network 150 to the Communicator Access Facility (CAF) 125, and then control is returned from this subroutine to the calling program, as represented at step 2206. If the pager number 710 is not found to be that of a communicator 11, then control passes to step 2205, where the data network interface 510 is instructed to send the message via network 150 to the Pager Dialing Facility (PDF) 105, and then control is returned from this subroutine to the calling program, as represented at step 2206.

Figure 23A:
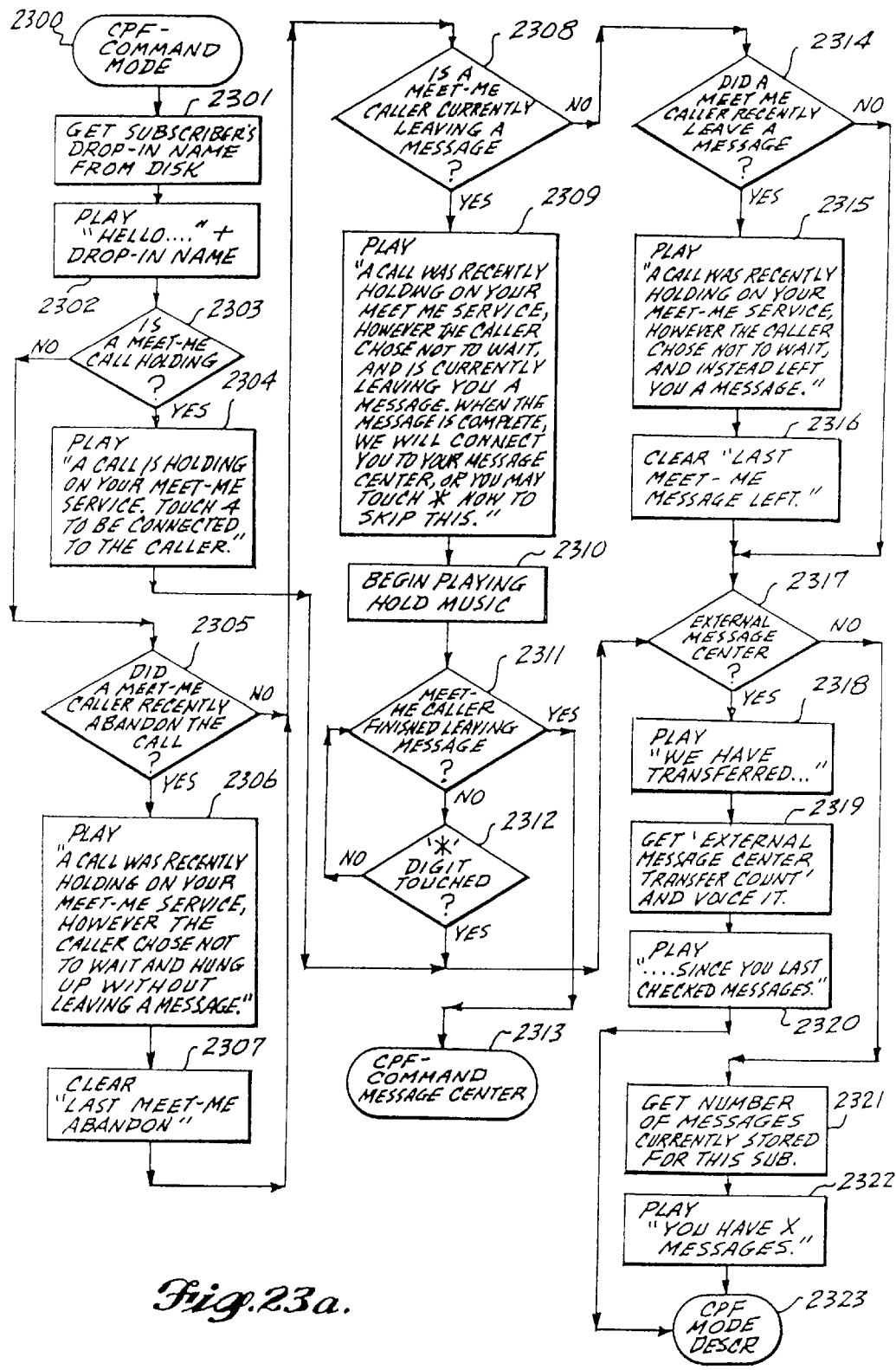
FIGS. 23a and 23b form a flowchart of the Call Processing Facility—Command Mode Function.
Figure 23B:
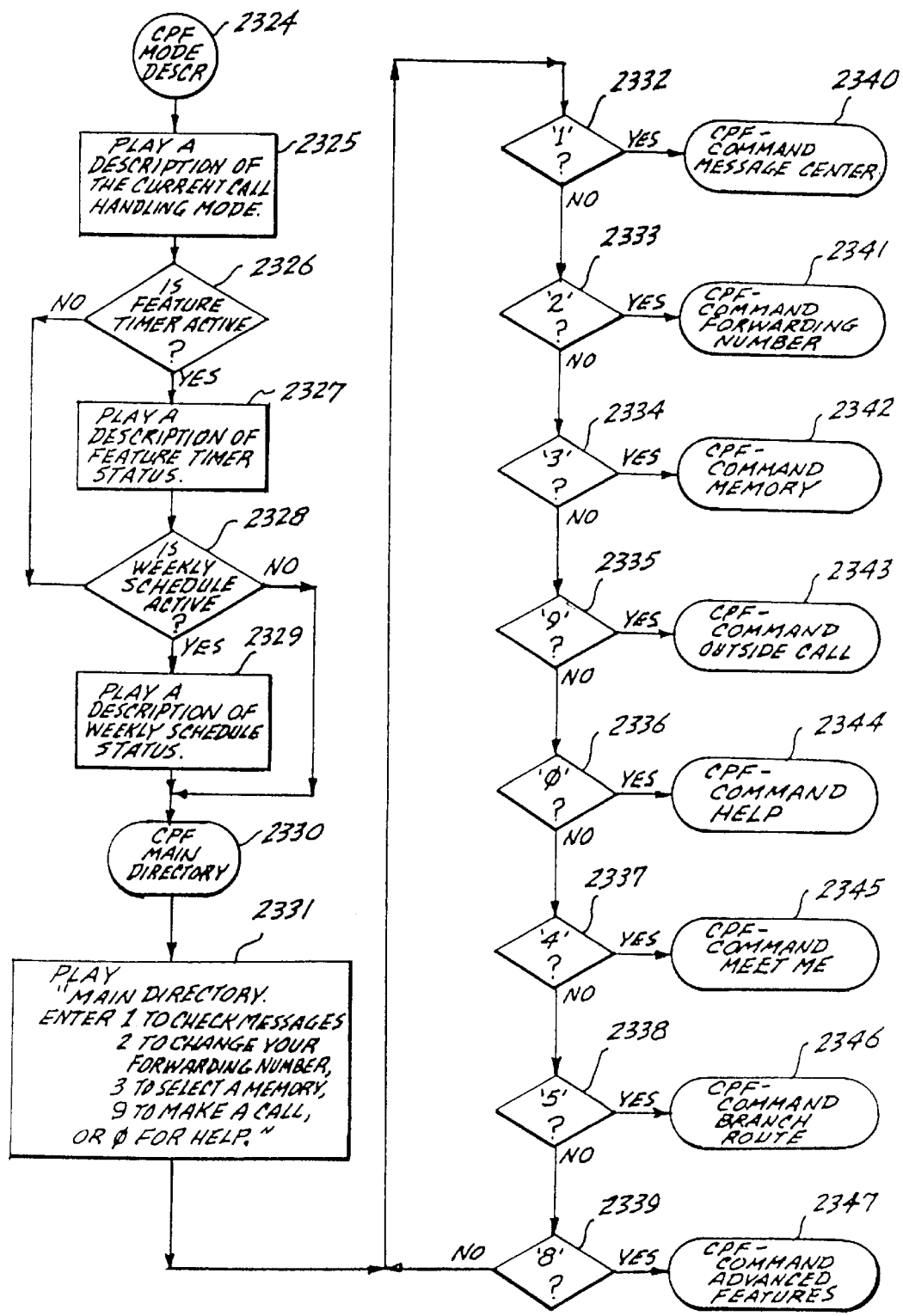

A flowchart of the CPF—Command Mode function is illustrated in FIGS. 23a and 23b. The CPF—Command Mode function is entered at step 2300 and control passes to step 2301 where the subscriber's pre-recorded 'drop-in' name is retrieved from disk 505. Then at step 2302, the call processor 435 prompts the subscriber: "Hello . . . ", and then plays the back the 'drop-in' name. Then at step 2303, a determination is made as to whether a meet-me call is currently holding for this subscriber. This is determined by checking the CPF—Call Handler Tasks which control the other trunks 3 connected to CPF 100. If a meet-me call is found to be holding for this subscriber, then at step 2304, the subscriber is prompted: "A call is holding on your meet-me service. Touch 4 to be connected to the caller." Control then passes to step 2317. If a meet-me call is not holding for this subscriber, then control passes to step 2305 where a determination is made as to whether a meet-me caller was recently holding, but hung up without leaving a message. If the time and date stored in the 'last meet me abandon' field 719 of the subscriber master record 700 is not more than 20 minutes older than the current date and time, then it is determined that a meet-me caller recently abandoned a call, and control passes to step 2306 where the subscriber is prompted: "A call was recently holding on your meet-me service, however the caller chose not to wait and hung up without leaving a message." Control then passes to step 2307 where the 'last meet-me abandon' field 719 of the subscriber master record 700 is cleared. Control then passes to step 2308. Control also passes to step 2308 if, at step 2305, it is determined that a meet-me caller did not recently abandon a call. At step 2308, a determination is made as to whether a meet-me caller is currently leaving a message for the subscriber. This is determined by checking the CPF—Call Handler Tasks which control the other trunks 3 connected to CPF 100. If it is determined that a meet-me caller is currently leaving a message for this subscriber, then control passes to step 2309, where the subscriber is prompted: "A call was recently holding on your meet-me service, however the caller chose not to wait and is currently leaving you a message. When the message is complete we will connect you to your message center, or you may touch * now to skip this." Control then passes to step 2310 where 'music-on-hold' is played to the subscriber by call processor 435. Control then passes to step 2311 where a determination is made as to whether the meet-me caller has finished leaving the message. If the message is complete, then control passes to the CPF—Command Message Center function as shown at reference 2313. If the caller is still leaving the message, then control passes to step 2312 where a determination is made as to whether the subscriber has entered the '*' digit. If the '*' digit is not entered, then control returns to step 2311. If the '*' digit is entered, then control passes to step 2317. If at step 2308, a determination is made that a meet-me caller is not currently leaving a message for this subscriber, then control passes to step 2314, where a determination is made as to whether a meet-me caller recently left a message for this subscriber. If the time and date stored in the 'last meet me message left' field 720 of the subscriber master record 700 is not more than 20 minutes older than the current date and time, then it is determined that a meet-me caller recently left a message, and control passes to step 2315 where the subscriber is prompted: "A call was recently holding on your meet-me service, however the caller chose not to wait and instead left you a message." Control then passes to step 2316 where the 'last meet-me message left' field 720 of the subscriber master record 700 is cleared. Control then passes to step 2317. Control also passes to step 2317 if, at step 2314, it is determined that a meet-me caller did not recently leave a message. At step 2317, a determination is made as to whether the subscriber has selected an external message center. As described earlier, this determination is made by examining the message center number 709 in the subscriber master record 700. If the message center number 709 contains a phone number, then external has been selected. If the message center number 709 does not contain a phone number, then internal message center has been selected. If, at step 2317, it is determined that the subscriber has selected an external message center, then control passes to step 2318, where the caller is prompted: "We have transferred . . . ".

Control then passes to step 2319 where the 'external message center transfer count' 721 is retrieved from the subscriber master record 700, and is voiced to the subscriber by call processor 435. Control then passes to step 2320, where the prompt is completed by playing: ". . . since you last checked messages." Control then passes to the connector labelled "CPF MODE DESCR" at reference 2323. If, at step 2317, it is determined that the subscriber had selected the internal message center, then control passes to step 2321 where the number of messages currently stored for this subscriber on disk 505 is determined. At step 2322 then, the call processor 435 prompts the subscriber: "You have X messages.", where X is the number determined above. Control then passes to the connector labelled "CPF MODE DESCR" at reference 2323. The connector labelled "CPF MODE DESCR" at reference 2324, causes control to be passed to step 2325, where a description is played of the current call handling mode. This description includes the current mode memory number 715, the current call handling mode 703, and the current transfer number 707, if appropriate. For example, the subscriber may hear: "Your calls are currently being handled by mode memory 10, urgent-screened forwarding to 555-1111." If the transfer number 707 is the tag for the subscriber's home, office, pager, mobile-phone, or message center, then this would be voiced in words, ie: ". . . to your home." After playing a description of the current call handling mode, then control passes to step 2326, where a determination is made as to whether the feature timer is currently active. As was described earlier, this determination is made by checking the feature timer duration 724. If the feature timer is found to be active, then it's status is voiced to the subscriber at step 2327. For example, the subscriber may be prompted: "The feature timer is currently active and will cause mode memory 10 to be invoked at 5:30 today." Control then passes to step 2328. Control also passes to step 2308 if the feature timer was found to be inactive at step 2326. At step 2328, a determination is made as to whether the weekly schedule is active. This determination is made by checking the weekly schedule active flag 728 of the subscriber master record 700. If the weekly schedule is found to be active, then the status of the weekly schedule is voiced to the subscriber at step 2329. For example, the subscriber may be prompted: "The weekly schedule is on, and the next step will cause memory 20 to be invoked at 7:30 PM on Tuesday." Control then passes via connector labelled "CPF MAIN DIRECTORY" at reference 2330 to step 2331. Control also passes via connector 2330 to step 2331 if the weekly schedule is found to be inactive at step 2328. At step 2331 the call processor 435 prompts the subscriber: "Main Directory. Enter 1 to check messages, 2 to change your forwarding number, 3 to select a memory, 9 to make a call, or 0 for help." Control then passes to a loop consisting of steps 2332 through 2339. At each of these steps a determination is made as to whether a particular digit has been entered by the subscriber. If the result is positive on any of these steps, then control is passed to another function. If the digit '1' is found at step 2332, then control passes to the CPF—Command Message Center function, as shown at reference 2340. If the digit '2' is found at step 2333, then control passes to the CPF—Command Forwarding Number function, as shown at reference 2341. If the digit '3' is found at step 2334, then control passes to the CPF—Command Memory function, as shown at reference 2342. If the digit '9' is found at step 2335, then control passes to the CPF—Command Outside Call function, as shown at reference 2343. If the digit '0' is found at step 2336, then control passes to the CPF—Command Help function, as shown at reference 2344. If the digit '4' is found at step 2337, then control passes to the CPF—Command Meet Me function, as shown at reference 2345. If the digit '5' is found at step 2338, then control passes to the CPF—Command Branch Route function, as shown at reference 2346. If the digit '8' is found at step 2339, then control passes to the CPF—Command Advanced features function, as shown at reference 2347.

Figure 24:
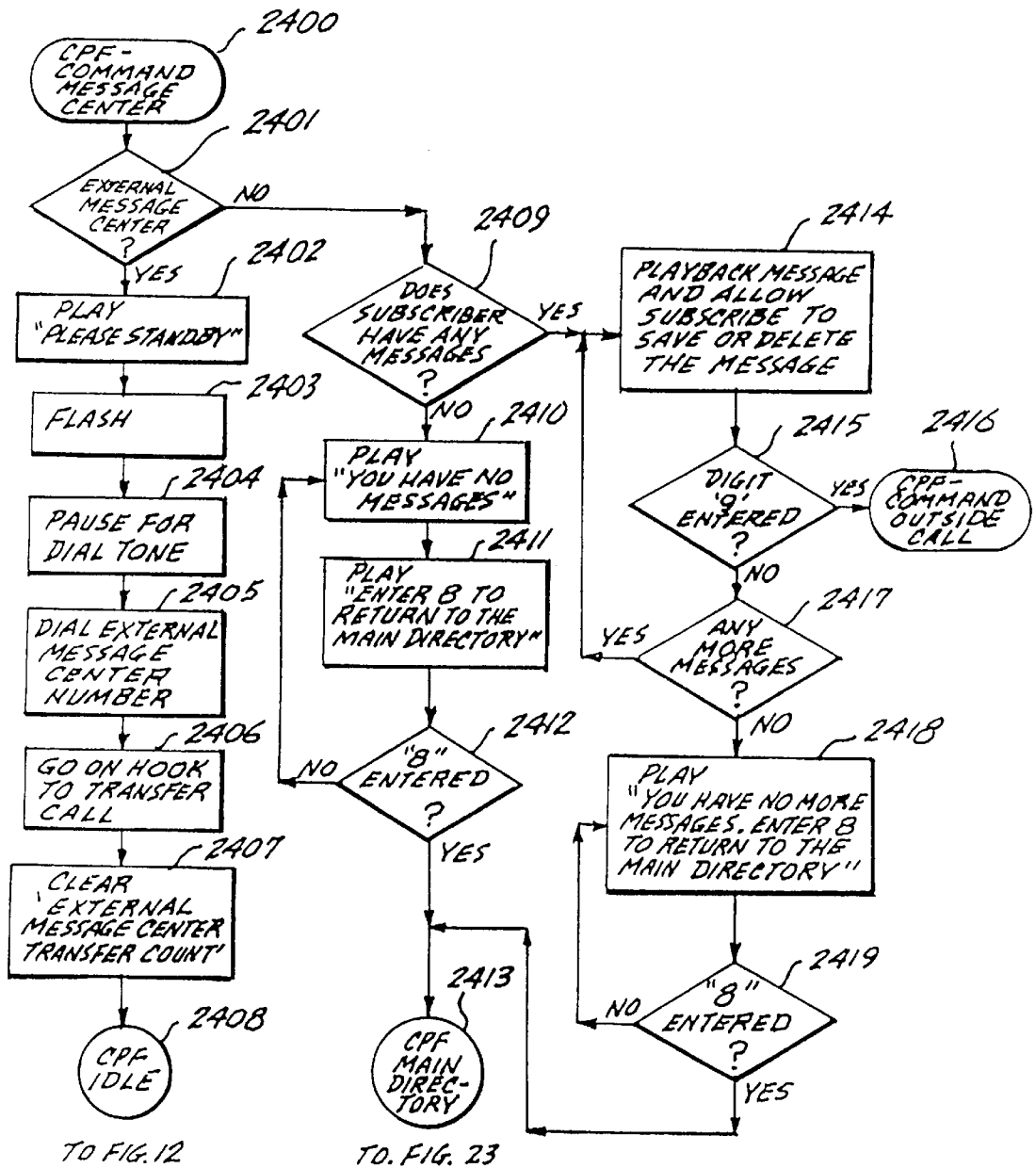
FIG. 24 is a flowchart of the Call Processing Facility—Command Message Center Function.

A flowchart of the CPF—Command Message Center function is illustrated in FIG. 24. The CPF—Command Message Center function is entered at step 2400 and control passes to step 2401 where a determination is made as to whether the subscriber has selected an external message center. As described earlier, this determination is made by examining the message center number 709 in the subscriber master record 700. If the message center number 709 contains a phone number, then external has been selected. If the message center number 709 does not contain a phone number, then internal message center has been selected. If, at step 2401, it is determined that the subscriber has selected an external message center, then control passes to step 2402, where the caller is prompted: "Please standby." Control then passes to step 2403 where a flash is generated causing switch 4 to place the subscriber on hold a apply a dial tone to trunk 3. Then, after pausing for dial tone at step 2404, the message center number 709 is dialed by call processor 435 at step 2405. Then at step 2406, the trunk 3 is placed on hook, causing switch 4 to transfer the subscriber to the message center number. Then at step 2407, the 'external message center transfer count' 721 of the subscriber master record 700 is cleared. Control is then returned to the CPF—Call Handler Task via the connector labelled "CPF IDLE" at reference 2408. If, at step 2401, it is determined that the subscriber has selected internal message center, then control passes to step 2409, where a determination is made as to whether the subscriber has any messages stored on disk 505. If there are no messages stored for this subscriber, then control passes to step 2410, where the subscriber is informed: "You have no messages." Then at step 2411, the subscriber is prompted: "Enter 8 to return to the main directory." Control then passes to step 2412, where a determination is made as to whether the digit '8' has been entered, and if it has not been entered, then control returns to step 2410. If the digit '8' has been entered, then control passes to the connector labelled "CPF MAIN DIRECTORY" at reference 2413, allowing the subscriber to make additional selections from the main directory of the command mode. If at step 2409, the determination is made that the subscriber does have messages stored on disk 505, then control passes to step 2414, where one of the stored messages is played back to the subscriber, and the subscriber is given the opportunity to save or delete the message by entering the digits '1' or '2' respectively. Control then passes to step 2415, where a determination is made as to whether the digit '9' has been entered. If the digit '9' is entered, then control passes to the CPF—Command Outside Call function as shown at reference 2416, where the subscriber is given the opportunity to make a call, perhaps returning a call to the person who left the message. If the digit '9' was not entered, then control passes to step 2417, where a determination is made as to whether any more messages are stored on the disk 505. If more messages exist, then control is returned to step 2414. If no more messages exist, then control passes to step 2418, where the subscriber is prompted: "You have no more messages. Enter 8 to return to the main directory." Control then passes to step 2419, where a determination is made as to whether the digit '8' has been entered, and if it has not been entered, then control returns to step 2418. If the digit '8' has been entered, then control passes to the connector labelled "CPF MAIN DIRECTORY" at reference 2413, allowing the subscriber to make additional selections from the main directory of the command mode.

Figure 25:
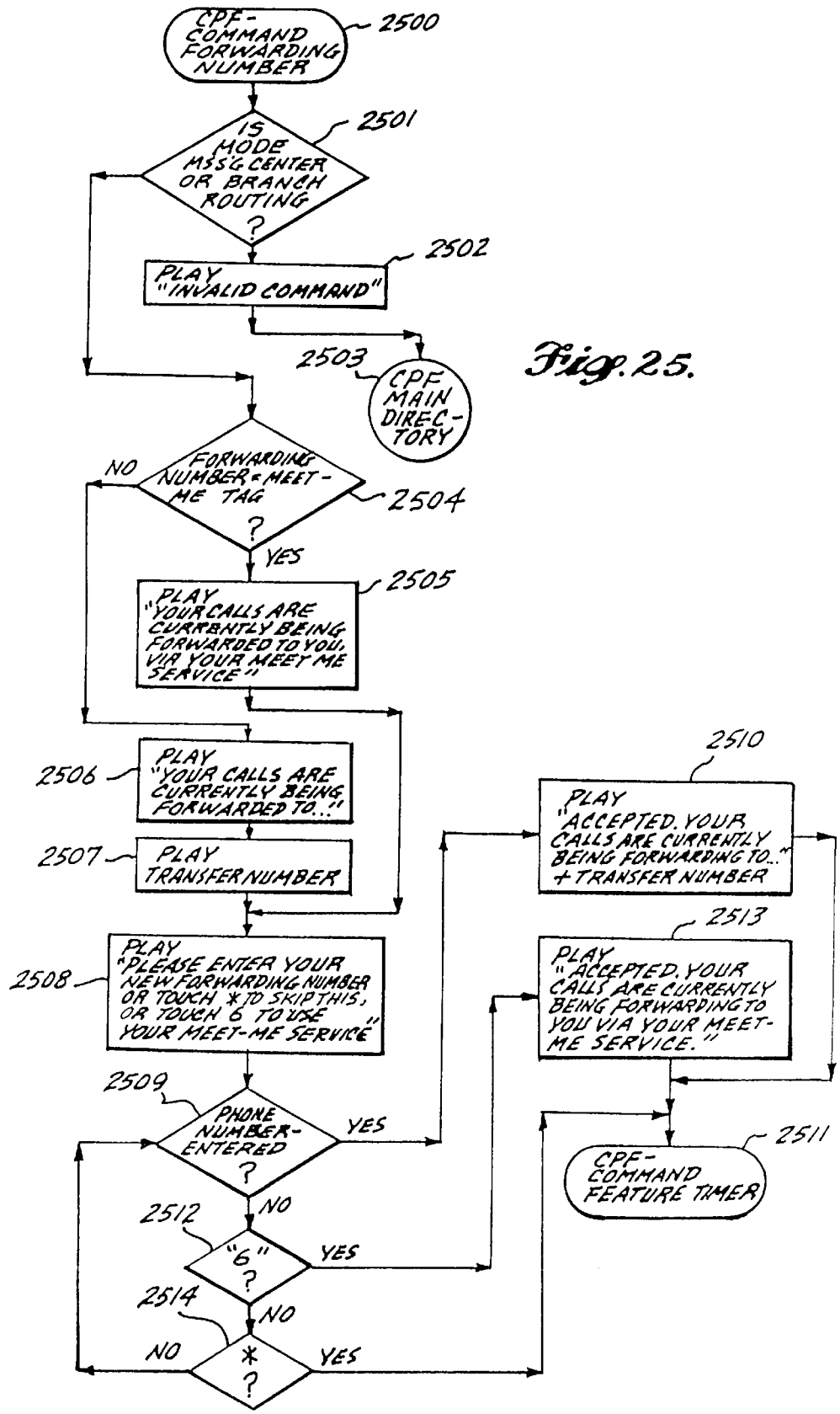
FIG. 25 is a flowchart of the Call Processing Facility—Command Forwarding Number Function.

A flowchart of the CPF—Command Forwarding Number function is illustrated in FIG. 25. The CPF—Command Forwarding Number function is entered at step 2500 and control passes to step 2501 where a determination is made as to whether the current call handling mode 703 for this subscriber is 'message center' or branch routing'. Since it is not logical to change a forwarding number in a mode that does not require a forwarding number, if it is determined that either of these modes are active, then control will pass to step 2502, where the subscriber will be prompted: "Invalid command." Control then passes to the connector labelled "CPF MAIN DIRECTORY" at reference 2503, allowing the subscriber to make additional selections from the main directory of the command mode. If, at step 2501, it is determined that the current call handling mode 703 is not 'message center' or 'branch routing', then control passes to step 2504, where a determination is made as to whether the transfer number 707 is set equal to the 'meet-me tag'. If so, then control passes to step 2505, where the subscriber is prompted: "Your calls are currently being forwarded to you via your meet me service." Control then passes to step 2508. If, at step 2504, it is determined that the forwarding number is not equal to the 'meet-me tag' then control passes to step 2506, where the subscriber is prompted: "Your calls are currently being forwarded to . . . " Control then passes to step 2507, where the transfer number 707 is retrieved from the subscriber master record 700, and voiced to the subscriber. Control then passes to step 2508, where the subscriber is prompted: "Please enter your new forwarding number, or enter * to skip this, or enter 6 to use your meet-me service." Control then passes to step 2509, where a determination is made as to whether the subscriber has entered a valid phone number, or a tag for home, office, or mobile phone. If so, then control passes to step 2510, where the phone number is stored as the new transfer number 707 in the subscriber master record 700, and the subscriber is prompted: "Accepted, your calls are currently being forwarded to . . . " , and the transfer number 707 is voiced. Control then passes to the CPF—Command Feature Timer function as shown at reference 2511. If it is determined at step 2509 that the subscriber has not entered a phone number, then control passes to step 2512, where a determination is made as to whether the subscriber has entered the digit '6', and if so control passes to step 2513 where the 'meet-me tag' is stored as the transfer number 707 in the subscriber master record 700, and the subscriber is prompted: "Accepted, your calls are currently being forwarded to you via your meet-me service." Control then passes to the CPF—Command Feature Timer function as shown at reference 2511. If it is determined at step 2512 that the digit '6' has not been entered, then control passes to step 2514, where a determination is made as to whether the digit '*' has been entered, and if not control returns to step 2509. If the digit '*' has been entered, then the transfer number 707 remains unchanged, and control passes to the CPF—Command Feature Timer function as shown at reference 2511.

Figure 26:
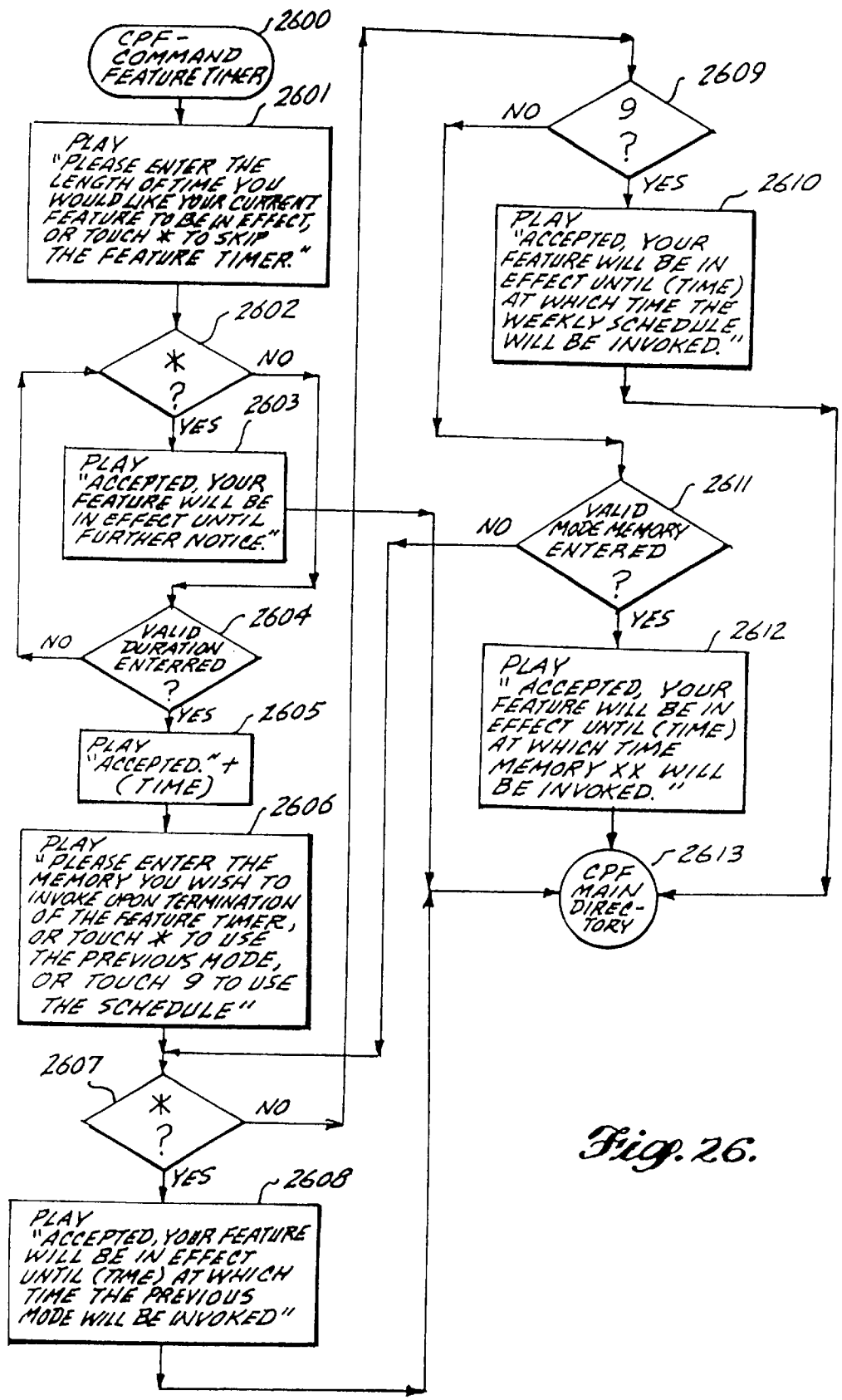
FIG. 26 is a flowchart of the Call Processing Facility—Command Feature Timer Function.

A flowchart of the CPF—Command Feature Timer function is illustrated in FIG. 26. The CPF—Command Feature Timer function is entered at step 2600 and control passes to step 2601 where the subscriber is prompted: "Please enter the length of time you wold like your current feature to be in effect, or enter * to skip the feature timer." Control then passes to step 2602, where a determination is made as to whether the digit '*' has been entered by the subscriber. If the digit '*' has been entered, then control passes to step 2603, where the subscriber is prompted: "Accepted, your feature will be in effect until further notice." Control then passes to the connector labelled "CPF MAIN DIRECTORY" at reference 2613, allowing the subscriber to make additional selections from the main directory of the command mode. If at step 2602, it is determined that the digit '*' has not been entered, then control passes to step 2604 where a determination is made as to whether a valid duration has been entered. This duration must be in the form of hours first followed by minutes. For example, to enter 1 hour and 20 minutes, the subscriber must enter '1 2 0'. If a valid duration is not found to be entered at step 2604 then control returns to step 2602. If a valid duration is entered, then control passes to step 2605, where the duration is stored as the 'feature timer duration' 724 of the subscriber master record 700, and the subscriber is prompted: "Accepted, . . . " and the duration time is voiced. Control then passes to step 2606 where the subscriber is prompted: "Please enter the memory number you wish to invoke upon termination of the feature timer, or enter * to use the previous mode, or touch 9 to use the schedule." Control then passes to step 2607, where a determination is made as to whether the subscriber has entered the digit '*', and if so then at step 2608 the previous mode memory is saved in temporary mode memory 0, mode memory 0 is stored as the feature timer termination mode .725 of the subscriber master record, and the subscriber is prompted: "Accepted, your feature will be in effect until (time) at which time the previous mode will be invoked.", where the value of (time) corresponds to the current time plus the feature timer duration 724. Control then passes to the connector labelled "CPF MAIN DIRECTORY" at reference 2613, allowing the subscriber to make additional selections from the main directory of the command mode. If at step 2607 it is determined that the digit '*' has not been entered, then control passes to step 2609, where a determination is made as to whether the digit '9' is entered, and if so control passes to step 2610 where the weekly schedule is saved in temporary mode memory 0, mode memory 0 is stored as the feature timer termination mode 725 of the subscriber master record, and the subscriber is prompted: "Accepted, your feature will be in effect until (time) at which time the weekly schedule will be invoked.", where the value of (time) corresponds to the current time plus the feature timer duration 724. Control passes to the connector labelled "CPF MAIN DIRECTORY" at reference 2613, allowing the subscriber to make additional selections from the main directory of the command mode. If at step 2609 it is determined that the digit '9' has not been entered, then control passes to step 2611, where a determination is made as to whether a valid mode memory 10 through 99 is entered, and if so control passes to step 2612 where the mode memory is stored as the feature timer termination mode 725 of the subscriber master record, and the subscriber is prompted: "Accepted, your feature will be in effect until (time) at which time mode memory XX will be invoked.", where the value of (time) corresponds to the current time plus the feature timer duration 724. Control passes to the connector labelled "CPF MAIN DIRECTORY" at reference 2613, allowing the subscriber to make additional selections from the main directory of the command mode.

Figure 27:
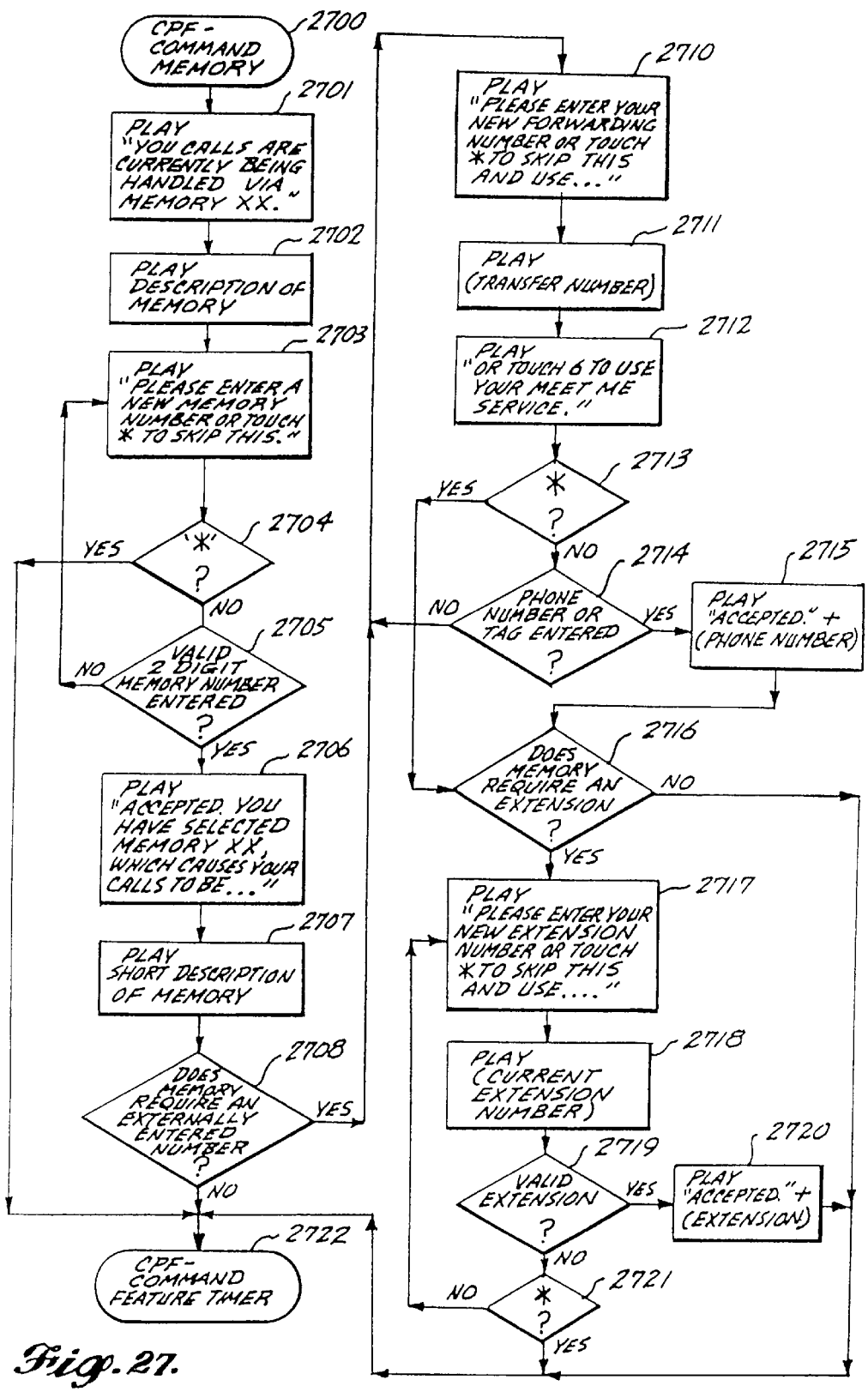
FIG. 27 is a flowchart of the Call Processing Facility—Command Memory Function.

A flowchart of the CPF—Command Memory function is illustrated in FIG. 27. The CPF—Command Memory function is entered at step 2700 and control passes to step 2701 where the subscriber is prompted: "Your calls are currently being handled via mode memory XX.", where XX is the current mode memory number 715 of the subscriber master record. Control then passes to step 2702, where a description of the mode is voiced to the subscriber. This description includes the current call handling mode 703, and the current transfer number 707, if appropriate. For example, the subscriber may hear: "Your calls are currently being urgent-screened forwarded to 555-1111." If the transfer number 707 is the tag for the subscriber's home, office, pager, mobile-phone, or message center, then this would be voiced in words, ie: ". . . to your home." Control then passes to step 2703 where the subscriber is prompted: "Please enter a new mode memory number or enter * to skip this." Control then passes to step 2704 where a determination is made as to whether the digit '*' has been entered. If the digit '*' is entered, then control passes to the CPF—Command Feature Timer function as shown at reference 2722. If at step 2704, it is determined that the '*' digit has not been entered, then control passes to step 2705, where a determination is made as to whether a valid 2 digit mode memory number has been entered, and if such a mode memory number has not been entered, then control returns to step 2703. If a valid mode memory number is entered, then control passes to step 2706, where the mode memory number is stored as the current mode memory number 715 of the subscriber master record 700, the corresponding mode memory 800 is copied to the subscriber master record, the subscriber is prompted: "Accepted, you have selected mode memory XX, which causes your calls to be . . . ", and then control passes to step 2707. At step 2707, the prompt is completed by playing a brief description of the selected mode memory. The description includes the call handling mode 703, and the transfer number 707 if appropriate. For example, at step 2707 the remainder of the prompt may be: ". . . handled by your message center." At step 2708 a determination is made as to whether the selected mode memory requires an 'externally entered number'. This is determined by checking the transfer number field 707 of the selected mode memory, to determine if it contains an 'externally entered number' tag. If this is the case, then the subscriber must enter a transfer number after selecting this memory. If the externally entered number is not required, then control passes to the CPF—Command Feature Timer function as shown at reference 2722. If it is determined at step 2708 that an externally entered number is required, then control passes to step 2710, where the subscriber is prompted: "Please enter your new forwarding number or enter * to skip this and use . . . ". Control then passes to step 2711 where the previous transfer number is voiced to the subscriber. Control then proceeds to step 2712 where the subscriber is further prompted with: ". . . or enter 6 to use your meet-me service." Control then passes to step 2713 where a determination is made as to whether the digit '*' has been entered. If the digit '*' has been entered then control passes to step 2716. Otherwise, control passes to step 2714 where a determination is made as to whether a phone number or tag has been entered by the subscriber. If not, then control returns to step 2710. If a phone number or tag has been entered, then control passes to step 2715 where the phone number is stored as the transfer number 707 of the subscriber master record 700, the subscriber is prompted: "Accepted . . . ", and the phone number or tag is voiced. Control then passes to step 2716, where a determination is made as to whether the memory has an extension number in the extension number field 708 of the subscriber master record 700. If an extension number does not exist in this field, then control passes to the CPF—

Command Feature Timer function as shown at reference 2722. If at step 2716 it is determined that an extension number does exist, then control passes to step 2717 where the subscriber is given an opportunity to modify the extension number. At step 2717 the subscriber is prompted: "Please enter your new extension number or enter * to skip this and use . . . ". Control then passes to step 2718 where the phrase is completed by voicing the current extension number 708. Control then passes to step 2719 where a determination is made as to whether a new extension number has been entered, and if so, then control passes to step 2720 where the extension number is stored in the extension number field 708, the subscriber is prompted: "Accepted, . . .", the new extension number is voiced, and control passes to the CPF—Command Feature Timer function as shown at reference 2722. If at step 2719 it is determined that an extension number has not been entered then control passes to step 2721, where a determination is made as to whether the digit "*" is entered, and if the "*" digit is not entered then control returns to step 2717. If at step 2721 it is determined that the "*" digit is entered then control passes to the CPF—Command Feature Timer function as shown at reference 2722.

Figure 28:
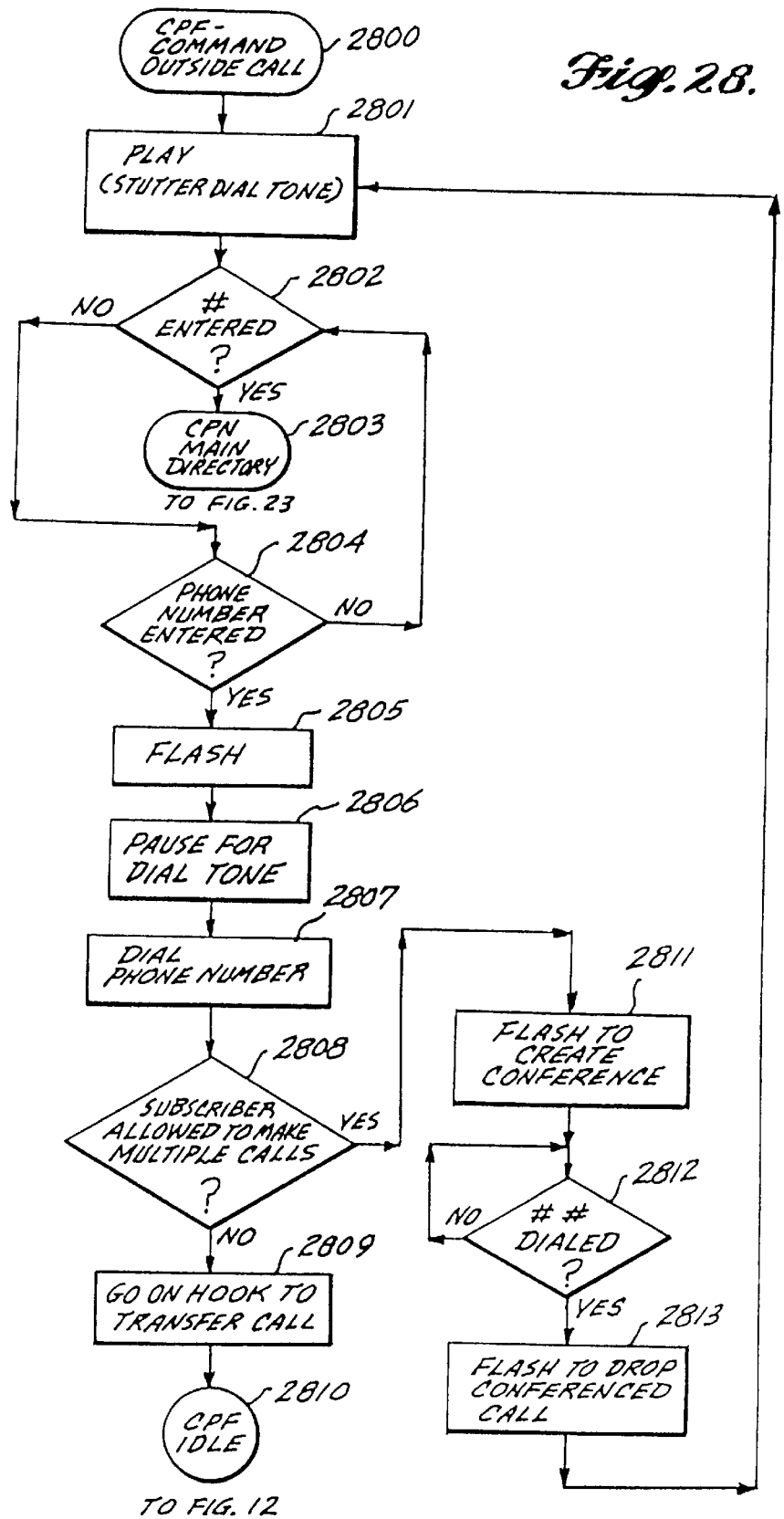
FIG. 28 is a flowchart of the Call Processing Facility—Command Outside Call Function.

A flowchart of the CPF—Command Outside Call function is illustrated in FIG. 28. The CPF—Command Outside Call function is entered at step 2800 and control passes to step 2801 where the call processor 435 plays a 'stutter dial tone' to the subscriber. Control then passes to step 2802 where a determination is made as to whether the subscriber has entered the '#' digit. If the '#' digit has been entered, then control passes to the connector labelled "CPF MAIN DIRECTORY" at reference 2803, allowing the subscriber to make additional selections from the main directory of the command mode. If at step 2802 it is determined that the subscriber has not entered the '#' digit, then control passes to step 2804 where a determination is made as to whether the subscriber has entered a phone number that he wishes to be connected to. If a phone number has not been entered, then control returns to step 2802. If at step 2804 it is determined that a phone number has been entered, then control passes to step 2805, where a flash is generated, causing switch 4 to place the subscriber on hold, and applying a dial tone to the trunk 3. Then, after a oause for dial tone at step 2806, the call processor 435 dials the phone number at step 2807, which had been entered by the subscriber. Control then passes to step 2808, where the 'multiple outside calls allowed' flag 729 of the subscriber master record 700 is checked. If this flag is not active, then control passes to step 2809 where the trunk 3 is placed on hook, causing switch 4 to transfer the subscriber to the dialed number, and control is returned to the CPF—Call Handler Task via the connector labelled "CPF IDLE" at reference 2810. If at step 2808 it is determined that the 'multiple outside calls allowed' flag 729 is set, then control passes to step 2811, where a flash is generated which causes the subscriber to be conferenced to the dialed number while maintaining trunk 3 in the connection. In this way the subscriber may make additional calls, or later return to the main directory without hanging up and calling back. After the flash is generated at step 2811, control passes to step 2812 where a loop is entered waiting for the subscriber to enter the digit sequence '##'. When trying to detect DTMF digits while conversation may be present, as is the case in this situation, requiring the two digits in sequence reduces the likelihood of falsing on voice. If the subscriber enters '##', then control passes to step 2813 where a flash is generated causing switch 4 to disconnect the third party from the conference, leaving only the subscriber connected to trunk 3. Control then returns to step 2801, where the subscriber may make another call, or enter '#' to return to the main directory.

Figure 29:
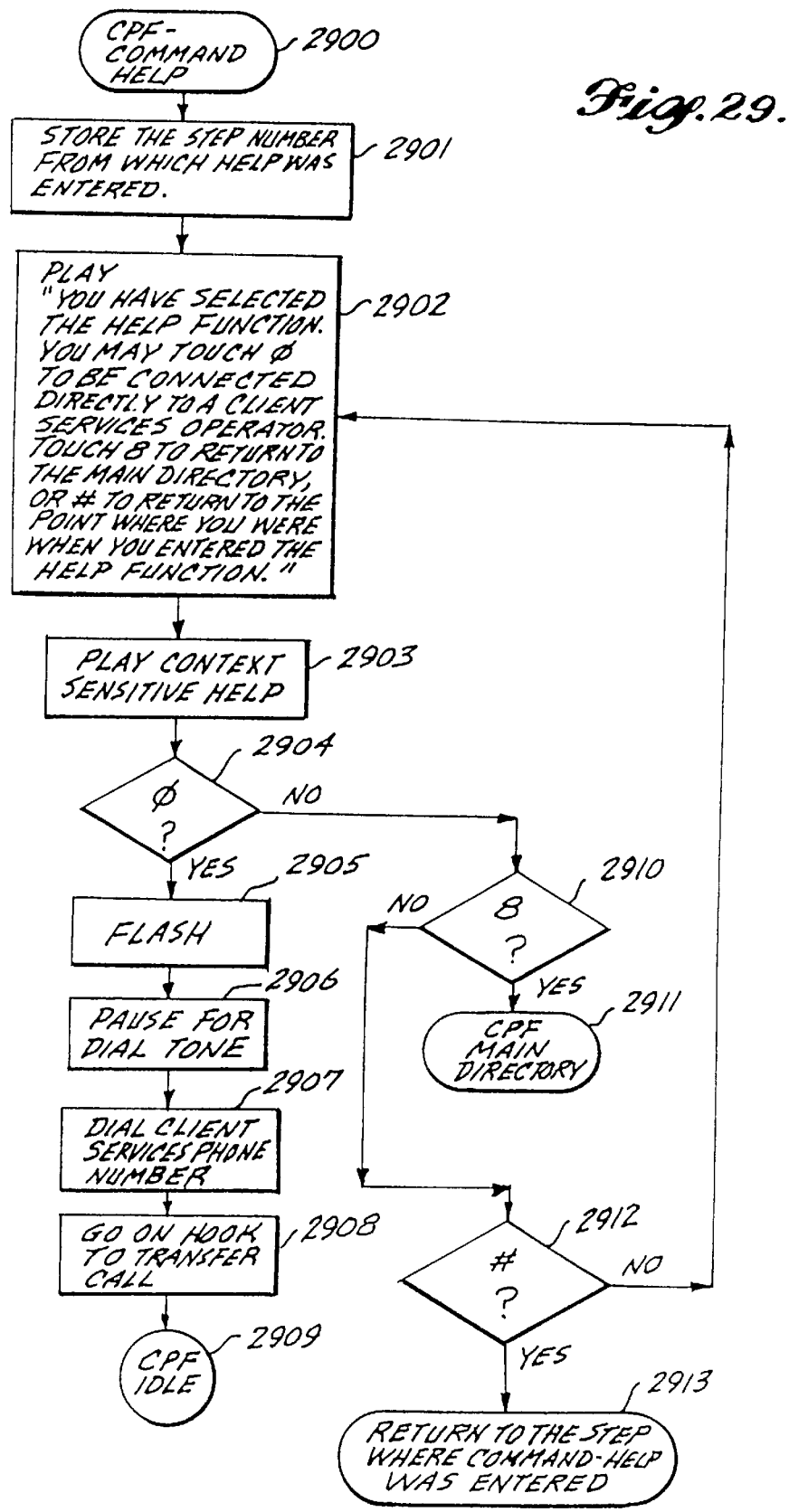
FIG. 29 is a flowchart of the Call Processing Facility—Command Help Function.

A flowchart of the CPF—Command Help function is illustrated in FIG. 29. The purpose of this function is to provide help to the subscriber who is using the Command Mode features of the Telephone Control System. This is accomplished by allowing the subscriber to enter the digit '0' for help from any of the command mode functions. Once the digit '0' is entered, the subscriber is provided with an explanation of the function which was being accessed at that moment. The subscriber may also touch another digit '0' to reach a live client services representative. The CPF—Command Help function is entered at step 2900 and control passes to step 2901 where the step number of the function from which the CPF—Command Help was requested is saved for later use. Then at step 2902, the subscriber is prompted: "You have selected the help function. You may enter 0 to be connected to a client services operator, 8 to return to the main directory, or # to return to the point where you were when you entered the help function." Control then passes to step 2903, where a context sensitive help prompt is played, based on the step number saved in by step 2901. For example, if the saved step number indicated that the help function was accessed while in the CPF—Command Forwarding Number function, then the call processor 435 would play the prestored help prompt associated with that function: "When you selected the help function you were in the process of changing your forwarding number." Control then passes to step 2904 where a determination is made as to whether the digit '0' has been entered, and if so, control then passes to step 2905 where a flash is generated, causing switch 4 to place the subscriber on hold, and applying a dial tone to the trunk 3. Then, after a pause for dial tone at step 2906, the call processor 435 dials the phone number at block 2907, which is associated with a client services representative. Control then passes to step 2908 where the trunk 3 is placed on hook, causing switch 4 to transfer the subscriber to the dialed number, and control is returned to the CPF—Call Handler Task via the connector labelled "CPF IDLE" at reference 2909. If at step 2904 it is determined that the digit '0' is not entered, then control passes to step 2910 where a determination is made as to whether the digit '8' has been entered, and if so, control passes to the connector labelled "CPF MAIN DIRECTORY" at reference 2911, allowing the subscriber to make additional selections from the main directory of the command mode. If at step 2910 it is determined that the digit '8' is not entered, then control passes to step 2912 where a determination is made as to whether the digit '#' is entered, and if not control returns to step 2902. If the digit '#' is entered, then the step number that was saved at step 2901 is retrieved and the control returns to that step.

Figure 30:
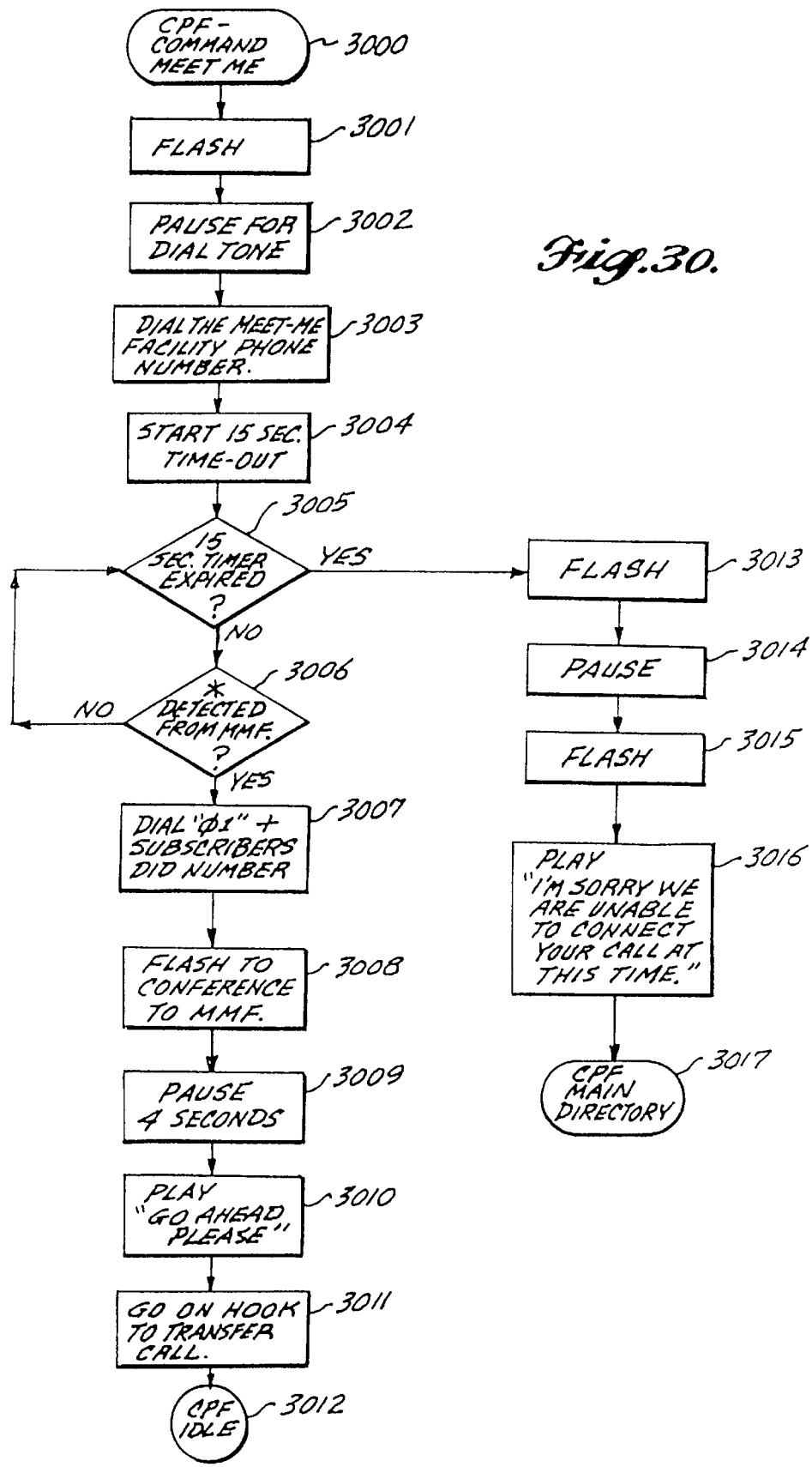
FIG. 30 is a flowchart of the Call Processing Facility—Command Meet Me Function.

A flowchart of the CPF—Command Meet Me function is illustrated in FIG. 30. The purpose of this function is to process the call for a subscriber who has called in, entered his PIN code 702, and wishes to be connected to a meet-me caller who is holding for him. The CPF—Command Meet Me function is entered at step 3000 and control passes to step 3001 where a flash is generated, causing switch 4 to place the subscriber on hold and apply a dial tone to the trunk 3. Then, after pausing for dial tone at step 3002, the call processor 435 dials the phone number of the lines 120 which are connected to the Meet Me Facility (MMF) 115 at step 3003. Control then passes to step 3004 where a 15 second timer is started, and then to step 3005 where the 15 second timer is checked. If the 15 second timer has not expired, then control passes to step 3006 where a determination is made as to whether a '*' digit is detected, indicating that the MMF 115 has answered the call. If the '*' digit is not detected then control returns to step 3005. If at step 3006, the '*' digit is detected, then control passes to step 3007 where the call processor 435 dials '01' indicating this call is from a subscriber, and then dials the subscriber's DID number 701, thereby fully identifying the call to the MMF 115. Control then passes to step 3008 where a flash is generated causing switch 4 to take the subscriber off of hold and create a conference between the subscriber, trunk 3, and the line 120 of the MMF 115. Control then passes to step 3009 where a 4 second pause is initiated to allow the MMF 115 time to connect the caller into the call. Control then passes to step 3010 where the subscriber and caller are prompted by call processor 435: "Go ahead please." Control then passes to step 3011 where the trunk 3 is placed on hook, causing the switch 4 to transfer the subscriber to the line 120 of the MMF 115. Control is then returned to the CPF—Call Handler Task via the connector labelled "CPF IDLE" at reference 3012. If at step 3005 it is determined that the 15 second timer had expired, indicating that the MMF 115 had not answered the call, then control passes to step 3013 where a flash is generated causing switch 4 to create a temporary conference between the subscriber and the dialed number, and then after a 2 second pause at step 3014 another flash is generated at step 3015 causing switch 4 to drop the dialed number from the conference and leave just the subscriber connected to the trunk 3. Control then passes to step 3016 where the subscriber is prompted: "I'm sorry, we are unable to connect your call at this time." Control then passes to the connector labelled "CPF MAIN DIRECTORY" at reference 3017, allowing the subscriber to make additional selections from the main directory of the command mode.

Figure 31:
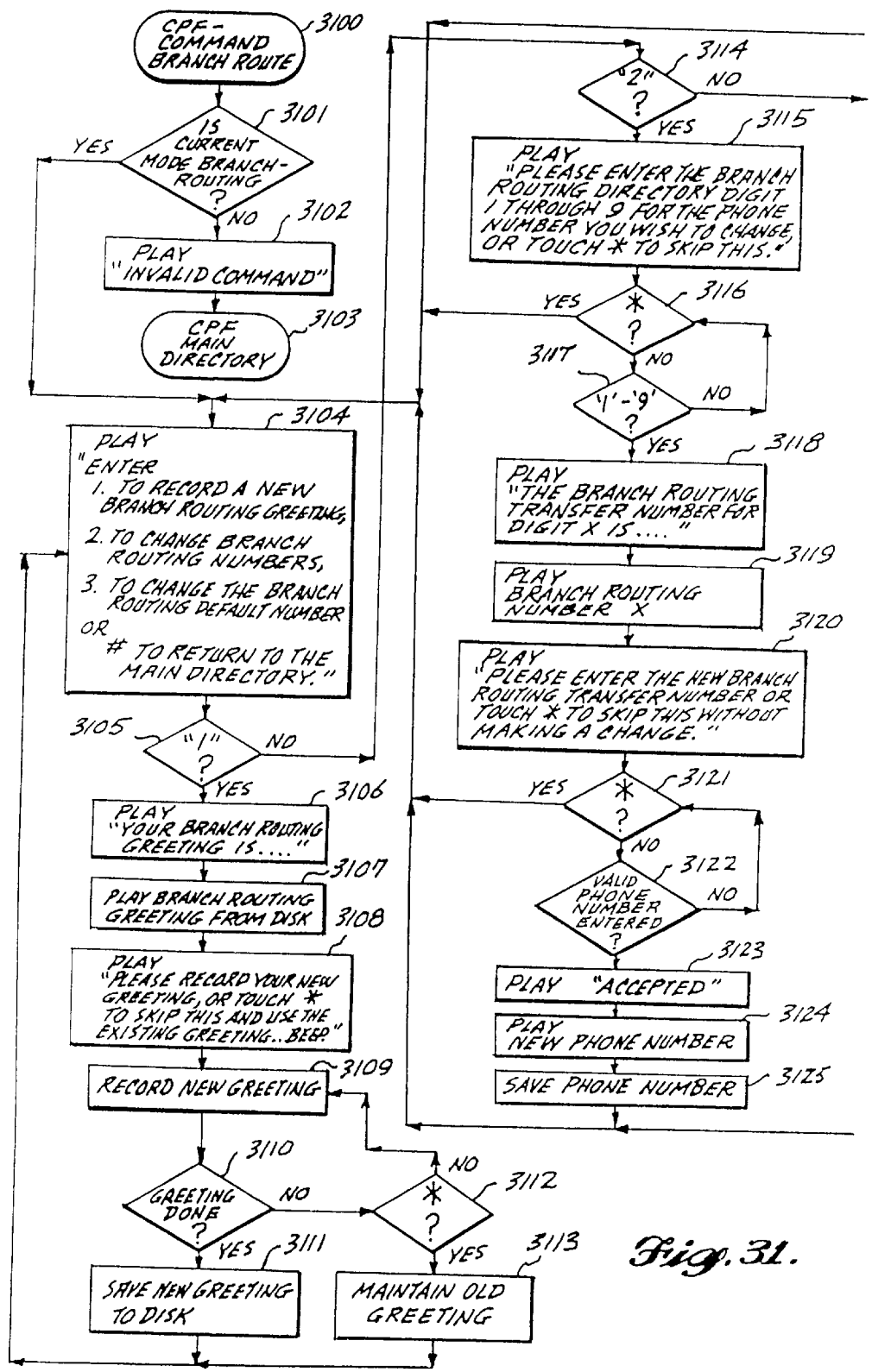
FIGS. 31 and 31a form a flowchart of the Call Processing Facility—Command Branch Route Function.
Figure 31A:
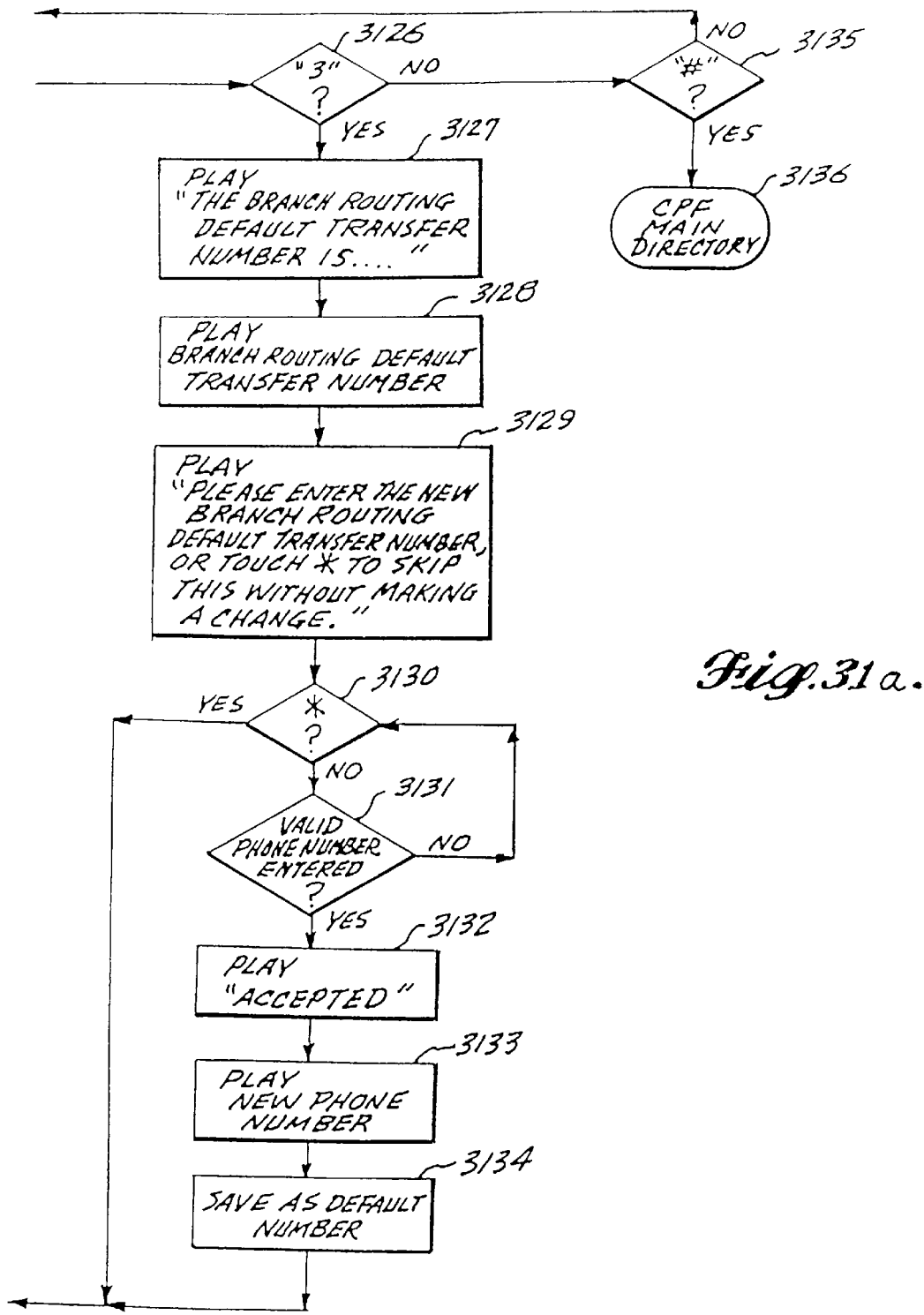

A flowchart of the CPF—Command Branch Route function is illustrated in FIGS. 31 and 31*a*. The CPF—Command Branch Route function is entered at step 3100 and control passes to step 3101 where a determination is made as to whether the current call handling mode 703 is 'branch-routing', and if it is not control is passes to step 3102 where the subscriber is prompted: "Invalid command.", and control passes to the connector labelled "CPF MAIN DIRECTORY" at reference 3103, allowing the subscriber to make additional selections from the main directory of the command mode. If at step 3101 it is determined that the call handling mode 703 is 'branch routing' then control passes to step 3104 where the subscriber is prompted: "Enter 1 to record a new branch routing greeting, 2 to change branch routing numbers, 3 to change the branch routing default number, or '#' to return to the main directory." Control then passes to step 3105 where a determination is made as to whether the digit '1' is entered, and if so, control passes to step 3106 where the subscriber is prompted: "Your branch routing greeting is . . . ". Then at step 3107, the branch routing greeting for this subscriber is retrieved from disk 505 and played back to the subscriber. Control then passes to step 3108 where the subscriber is prompted: "Please record your new branch routing greeting at the tone, or enter * to skip this and use the existing branch routing greeting . . . BEEP." Then at step 3109, the new greeting is recorded and control passes to step 3110 where a determination is made as to whether the greeting is done, and if it is control passes to step 3111 where the new branch routing greeting is saved to disk 505 and then control returns to step 3104. If at step 3110 it is determined that the greeting is not done, then control passes to step 3112 where a determination is made as to whether the digit '*' is entered, and if not control returns to step 3109. If at step 3112 it is determined that the digit '*' is entered, then control passes to step 3113 where the old branch routing greeting on disk 505 is left unchanged, and control then passes to step 3104. If at step 3105 it is determined that the digit '1' is not pressed, then control passes to step 3114 where a determination is made as to whether the digit '2' is entered, and if it is entered then control passes to step 3115 where the subscriber is prompted: "Please enter the branch routing directory digit 1 to 9 for the phone number your wish to change, or touch * to skip this." Control then passes to step 3116 where a determination is made as to whether the digit '*' is entered, and if it is entered control returns to step 3104. If at step 3116 it is determined that the digit '*' is not entered, then control passes to step 3117 where a determination is made as to whether one of the digits '1' to '9' are entered, and if one of those digits is entered control then passes to step 3118. Otherwise control returns to step 3116. At step 3118 the subscriber is prompted: "The branch routing transfer number for digit X is . . . ". Control then passes to step 3119 where the branch routing number 722 that corresponds to the digit entered in step 3117 is retrieved from the subscriber master record 700 and voiced to the subscriber. Then at step 3120 the subscriber is prompted: "Please enter the new branch routing transfer number or touch * to skip this without making a change." Control then passes to step 3121 where a determination is made as to whether the digit '*' is entered, and if it is entered control returns to step 3104. If at step 3121 it is determined that the digit '*' is not entered, then control passes to step 3122 where a determination is made as to whether a phone number has been entered, and if a phone number has not been entered, control returns to step 3121. If at step 3122 a phone number is entered, then control passes to step 3123 where the subscriber is prompted: "Accepted." Then at step 3124 the new phone number is voiced to the subscriber. Control then passes to step 3125 where the new phone number is saved as the branch routing number 722 which corresponds to the digit entered in step 3117. Control then returns to step 3104. If at step 3114 it is determined that the digit '2' is not entered, then control passes to step 3126 where a determination is made as to whether the digit '3' is entered, and if it is entered, then control passes to step 3127 where the subscriber is prompted: "The branch routing default transfer number is . . . " Control then passes to step 3128 where the branch routing default number 723 is retrieved from the subscriber master record 700 and voiced to the subscriber. Then at step 3129 the subscriber is prompted: "Please enter the new branch routing default transfer number, or touch * to skip this without making a change." Control then passes to step 3130 where a determination is made as to whether the digit '*' is entered, and if the digit '*' is entered control returns to step 3104. If at step 3130 it is determined that the digit '*' is not entered, then control passes to step 3131 where a determination is made as to whether a phone number has been entered, and if a phone number has not been entered control returns to step 3130. If it is determined at step 3131 that a phone number has been entered, then control passes to step 3132 where the subscriber is prompted: "Accepted." Control then passes to step 3133 where the new phone number is voiced to the subscriber. Control then passes to step 3134 where the new phone number is saved as the branch routing default number 723 in the subscriber master record. Control then returns to step 3104. If at step 3126 it is determined that the digit '3' is not entered, then control passes to step 3135 where a determination is made as to whether the digit '#' is entered, and if it is not entered control then returns to step 3104. If at step 3135 it is determined that the digit '#' is entered then control passes to the connector labelled "CPF MAIN DIRECTORY" at reference 3136, allowing the subscriber to make additional selections from the main directory of the command mode.

Figure 32:
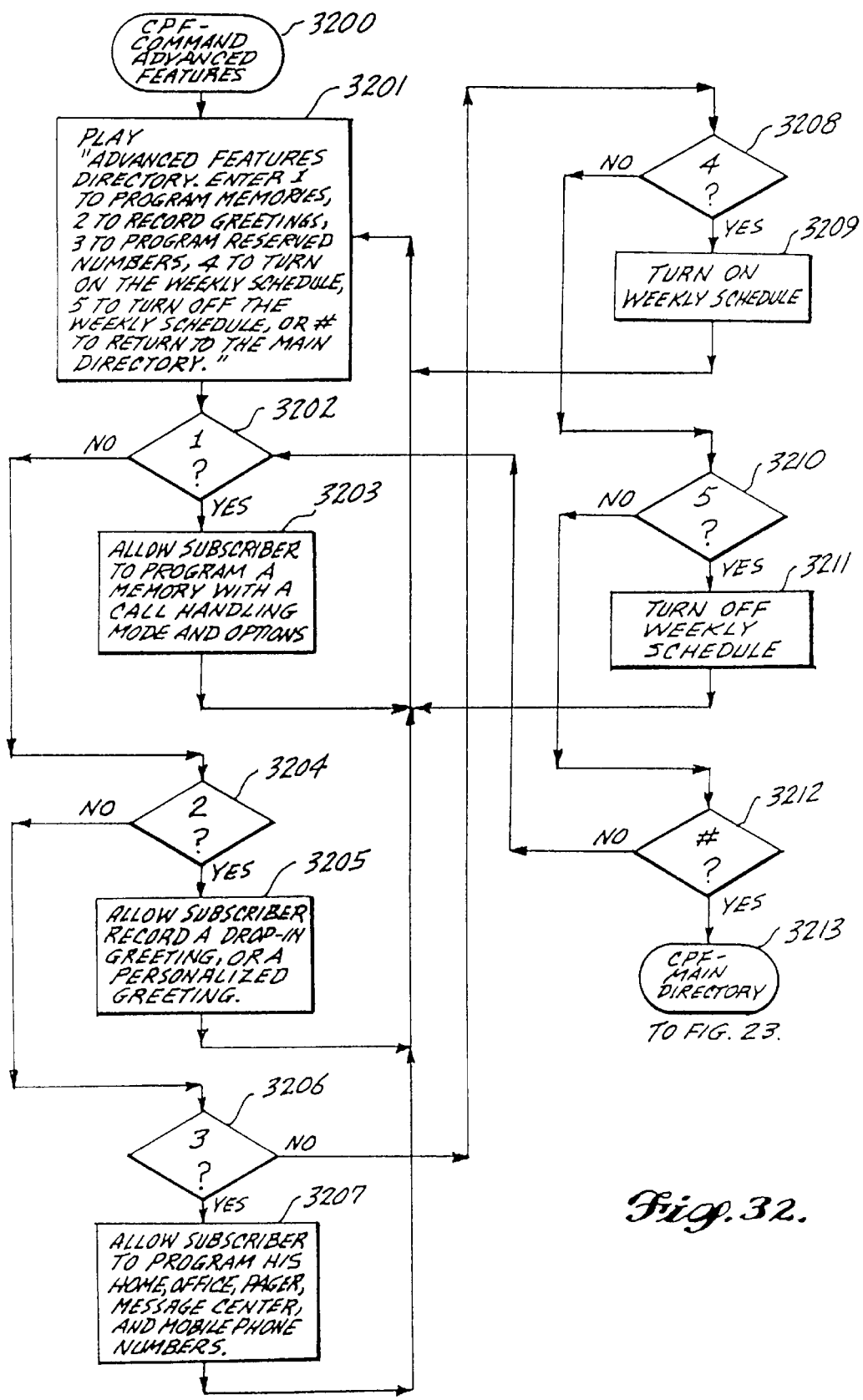
FIG. 32 is a flowchart of the Call Processing Facility—Command Advanced Features Function.

A flowchart of the CPF—Command Advanced Features function is illustrated in FIG. 32. The purpose of this function is provide the subscriber with the opportunity to modify those features of the Telephone Control System 1 which do not need to be modified on a regular basis. These features include allowing the subscriber to program mode memories, allowing the subscriber to record his 'drop-in' name, or his personalized greeting, allowing the subscriber to program his reserved numbers, and allowing the subscriber to activate or deactivate the weekly schedule. The CPF—Command Advanced Features function is entered at step 3200 and control passes to step 3201 where the subscriber is prompted: "Advanced Features Directory. Enter 1 to program mode memories, 2 to record greetings, 3 to program reserved numbers, 4 to activate the weekly schedule, 5 to deactivate the weekly schedule, or # to return to the Main Directory." Control then passes to step 3202 where a determination is made as to whether the digit '1' is entered. If the digit '1' is entered, then control passes to step 3203 where the subscriber is allowed to specify a mode memory number 802 of value '10 to '99'. If the mode memory number 802 specified already exists the call processor voices the status of that memory. The subscriber is then given an opportunity to modify the parameters 803 contained in the mode memory. When the subscriber is finished modifying the contents, the changes are saved in mode memory 800. Control then returns to step 3201. If at step 3202 it is determined that the digit '1' is not entered, then control passes to step 3204 where a determination is made as to whether the digit 2 is entered. If the digit '2' is entered, then control passes to step 3205 where the subscriber is allowed to listen to and re-record the 'drop-in' name and the 'personalized greeting'. If the subscriber does re-record either of these, then the changed name or greeting is saved on disk 505. Control then returns to step 3201. If at step 3204 it is determined that the digit '2' is not entered, then control passes to step 3206 where a determination is made as to whether the digit '3' is entered. If the digit '3' is entered, then control passes to step 3207 where the subscriber is allowed to modify the 'message center number' 709, the 'pager number' 710, the 'office number' 711, the 'home number' 712, or the 'mobile phone number' 713. If the subscriber changes any of these numbers then the new number is saved in the corresponding field of the subscriber master record 700. Control then returns to step 3201. If at step 3206 it is determined that the digit '3' is not entered, then control passes to step 3208 where a determination is made as to whether the digit '4' is entered. If the digit '4' is entered, then control passes to step 3209 where the subscriber is allowed to activate the weekly schedule. If the subscriber chooses to activate the weekly schedule, then the 'weekly schedule active' flag 728 of the subscriber master record 700 is set. Control then returns to step 3201. If at step 3208 it is determined that the digit '4' is not entered, then control passes to step 3210 where a determination is made as to whether the digit '5' is entered. If the digit '5' is entered, then control passes to step 3211 where the subscriber is allowed to deactivate the weekly schedule. If the subscriber chooses to deactivate the weekly schedule, then the 'weekly schedule active' flag 728 of the subscriber master record 700 is cleared. Control then returns to step 3201. If at step 3210 it is determined that the digit '5' is not entered, then control passes to step 3212 where a determination is made as to whether the digit '#' is entered. If the digit '#' is not entered, then control returns to step 3201. If at step 3212 it is determined that the digit '#' is entered then control passes to the connector labelled "CPF MAIN DIRECTORY" at reference 3213, allowing the subscriber to make additional selections from the main directory of the command mode.

Figure 33:
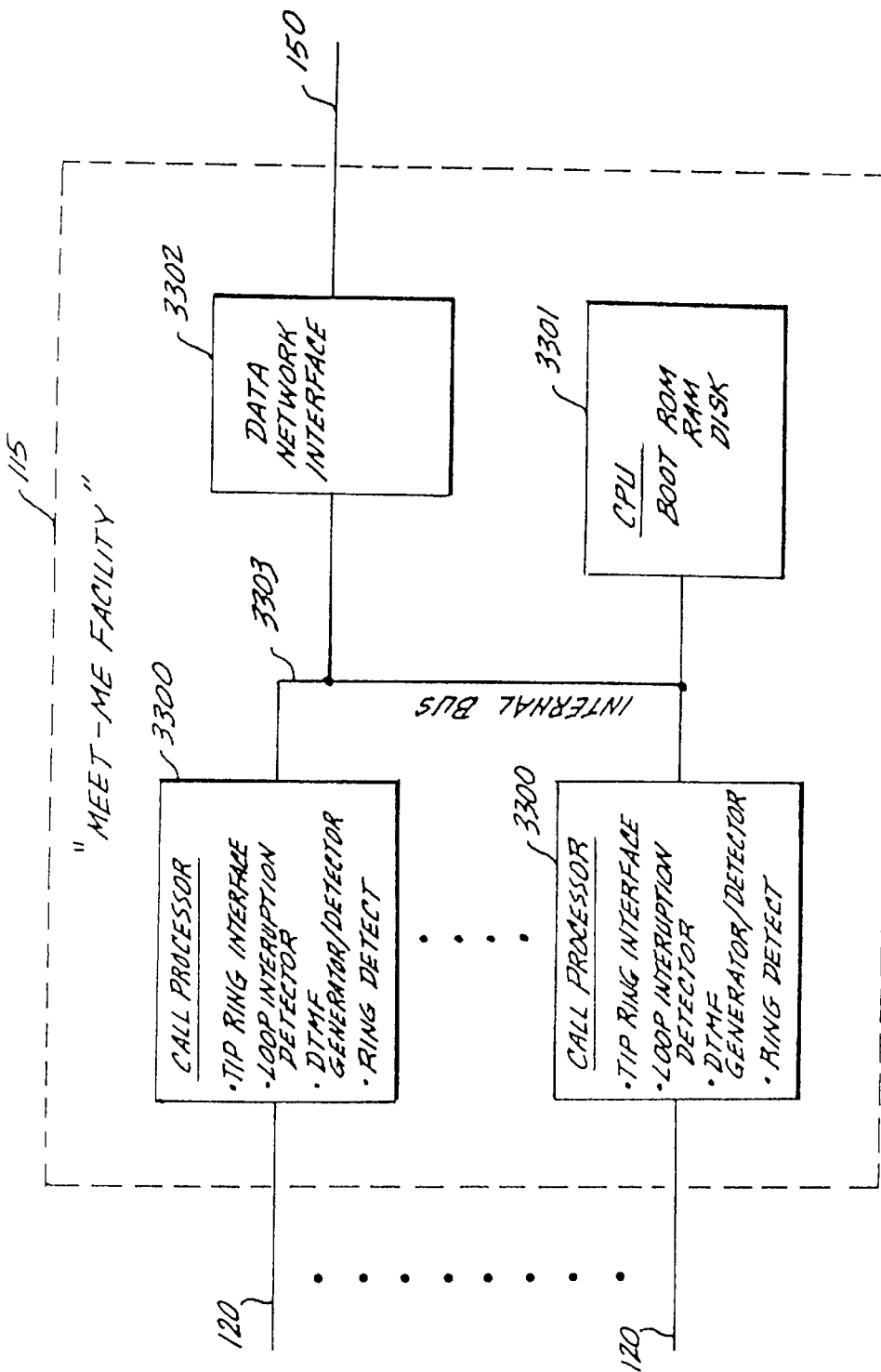
FIG. 33 is a block diagram illustrating the principle components of the Meet Me Facility.

A block diagram of the Meet-Me Facility (MMF) 115 is illustrated in FIG. 33. As was discussed earlier, the MMF 115 interfaces to tip-ring lines 120. These lines are provisioned by switch 4 with the CENTREX feature of 'call transfer', which allows a caller to be transferred to another number by flashing, dialing the number, and then going on hook. These lines are also provisioned by switch 4 with the CENTREX feature of 'barge-in', which allows a party on one of the lines 120 to barge into a conversation in progress on another of the lines 120. This is accomplished by flashing, dialing a barge-in code (*77), and then dialing the intercom code associated with the line 120 of the conversation to be barged-in on. As was mentioned earlier, to fully understand the operation of the meet-me feature it is necessary to also review the explanations which are associated with FIG. 21 (CPF—Meet Me Caller), FIG. 30 (CPF—Command Meet Me), and FIG. 34 (Meet Me Facility Main Task). Referring now to FIG. 33, the lines 120 are shown connected to call processors 3300, which contain a tip-ring interface and DTMF generators and detectors. The functions of call processor 3300 are well known in the art, and many products, such as the Model D41B manufactured by Dialogic Corporation, exist commercially which can accomplish these functions. The MMF 115 also contains a CPU 3301 which contains among other things a microprocessor, a boot ROM, a RAM, and a disk. The MMF 115 also contains a data network interface module 3302 which connects to the high speed data network 150. The functions of data network interface 150 are well known in the art, and many products, such as the Model COM4i from Digiboard Corporation, exist commercially which can accomplish these functions. The call processors 3300, the CPU 3301, and the data network interface 3302 are all shown connected to an internal data bus 3303. The CPU 3301 initializes itself at power-up using the boot ROM and then loads a control program into memory which it then executes. The control program allows for the control of simultaneous activities on the lines 120.

Figure 34:
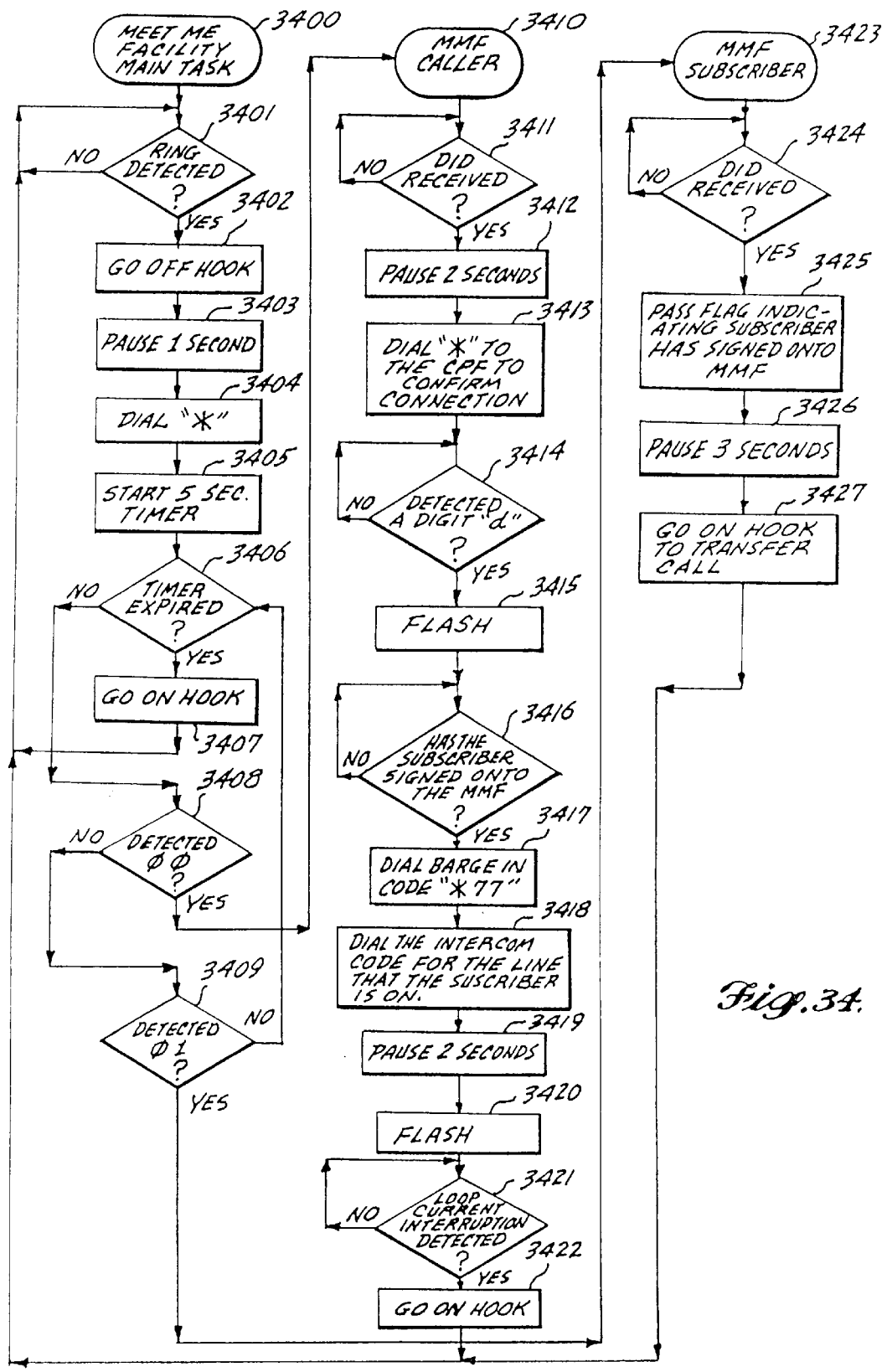
FIG. 34 is a flowchart of the Meet Me Facility Main Task.

A flowchart of the Meet Me Facility Main Task is illustrated in FIG. 34. The Meet Me Facility Main Task is the part of the MMF 115 control program which controls the activities on one of the lines 120. The Meet Me Facility Main Task is entered at step 3400 and control passes to step 3401 where a determination is made as to whether the call processor 3300 has detected a ring signal on the line 120, and if a ring signal is not detected, then control remains at step 3401. If a ring signal is detected, then control passes to step 3402, where the line 120 is taken off hook by call processor 3300, thereby answering the incoming call. At step 3403, a 1 second pause is initiated to allow for the line 120 to settle, and then at step 3404 the call processor 3300 dials the DTMF digit '*' as an answer indication to the CPF 100 which is calling. Then at step 3405 a 5 second timer is started, and control then passes to step 3406 where the 5 second timer is checked. If the 5 second timer has expired, then control passes to step 3407 where the line 120 is placed on-hook by call processor 3300, and then control returns to step 3401. If at step 3406 it is determined that the 5 second timer has not expired, then control passes to step 3408 where a determination is made as to whether the DTMF digit sequence '00' is detected by call processor 3300, indicating the call is a meet-me caller from CPF 100. If the digit sequence '00' is not detected, then control passes to step 3409 where a determination is made as to whether the DTMF digit sequence '01' is detected, indicating the call is a meet-me subscriber from CPF 100. If the digit sequence '01' is not detected, then control returns to step 3406 where the 5 second timer is again checked. If at step 3408 it is determined that the digit sequence '00' is detected, then control passes via a connector labelled "MMF CALLER" at reference 3410 to step 3411, where a determination is made as to whether a DTMF digit sequence representing the Access Number 701 of the subscriber being called is detected by call processor 3300. If a valid phone number is not detected, then control remains at step 3411. If a valid phone number is detected, then control passes to step 3412 where a 2 second pause is initiated. Then at step 3413, the call processor 3300 dials the DTMF digit '*' to inform the CPF 100 that the connection has been successful so far. Control then passes to step 3414 where a determination is made as to whether the DTMF digit 'd' is detected, indicating that the subscriber has called into the CPF 100, and the CPF 100 is about to conference him to the MMF 115. If the digit 'd' is not detected then control remains at step 3414. If the digit 'd' is detected, then control passes to step 3415 where a flash is generated on lines 120 causing the CENTREX system serving lines 120 to place the calling party (in this case the CPF 100) on hold, and a dial tone to be applied to line 120. Control then passes to step 3416 where a determination is made as to whether the subscriber has yet been connected to one of the other of lines 120 on the MMF 115. If the subscriber has not yet been connected, then control remains at step 3416. If it is determined that the subscriber has connected to one of the other of lines 120, then control passes to step 3417, where the CENTREX 'barge-in code' (*77) is dialed by the DTMF generator of call processor 3300. Then at step 3418, the call processor 3300 dials the intercom code for the line 120 which is currently connected to the subscriber. Control then passes to step 3419 where a 2 second pause is generated, and then to step 3420 where a flash is generated. This causes the line 120 which is connected to the subscriber to be connected via the CENTREX system to the line 120 which is connected to the caller. Control then passes to step 3421 where control remains while the subscriber and caller converse, until a loop interruption signal is detected on line 120 indicating at least one of the two parties has disconnected. Control then passes to step 3422 where the line 120 is placed on hook, and control the returns to step 3401. If at step 3409 it is determined that the digit sequence '01' is detected, then control passes via a connector labelled "IMKF SUBSCRIBER" at reference 3423 to step 3424, where a determination is made as to whether a DTMF digit sequence representing the Access Number 701 of the subscriber is detected by call processor 3300. If a valid phone number is not detected, then control remains at step 3424. If a valid phone number is detected, then control passes to step 3425 where an indication is made available that a subscriber is connected to the MMF 115 on this line 120. Control then passes to step 3426 where a 3 second pause is initiated, allowing time for the line 120 connected to the subscriber to perform the barge-in sequence. Control then passes to step 3427 where the line 120 is placed on hook causing the CENTREX system to call transfer the subscriber to the line 120 which has just barged-in. Control then returns to step 3401.

Figure 35:
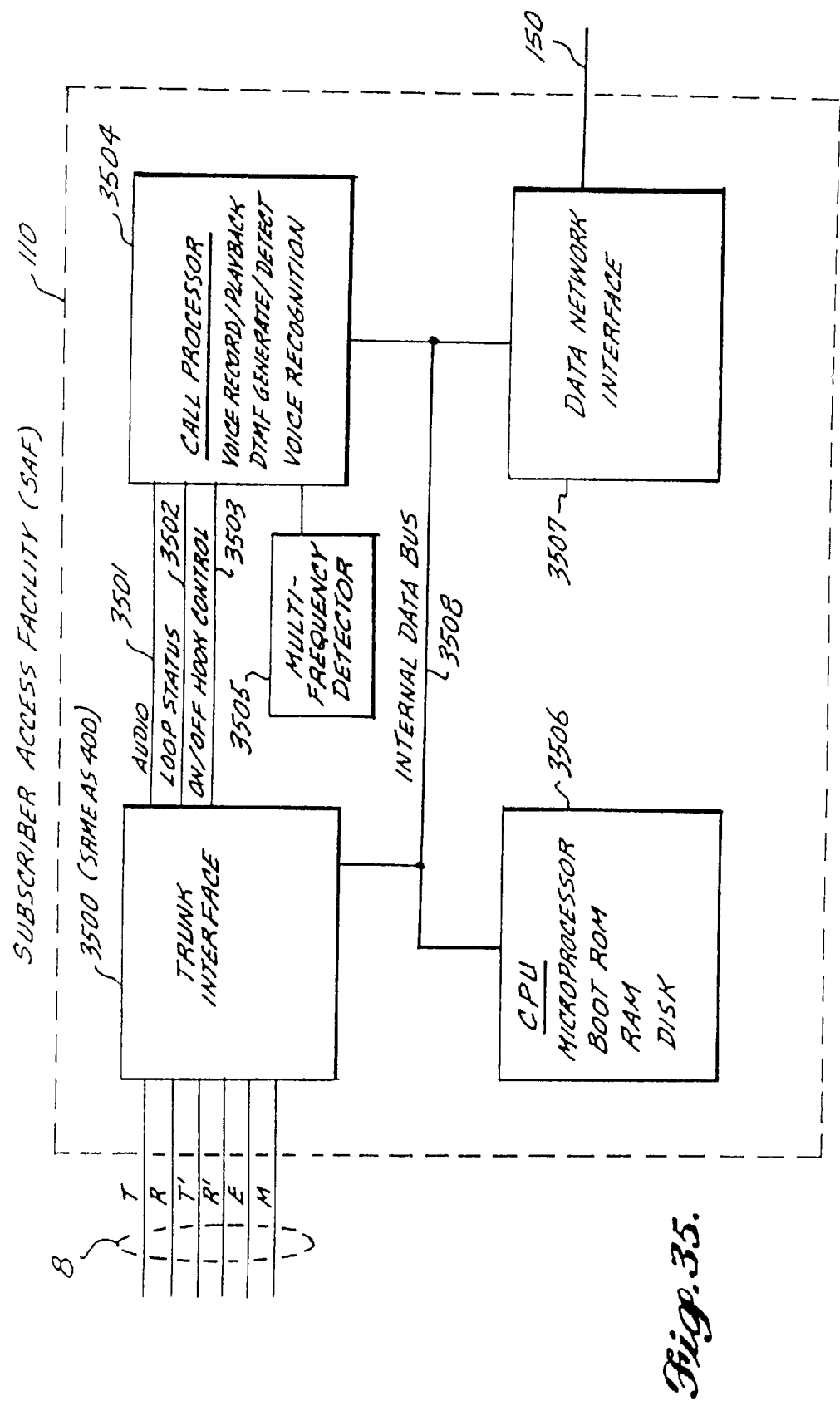
FIG. 35 is a block diagram illustrating the principle components of the Subscriber Access Facility.

A block diagram of the Subscriber Access Facility (SAF) 110 is illustrated in FIG. 35. The SAF 110 provides a means by which subscribers can access the Telephone Control System 1 via trunks which provide automatic number identification (ANI). SAF trunk interface 3500 interfaces the SAF 110 with trunks 8. The trunk interface 3500 is the same trunk interface as was described earlier at reference 400 used in the CPF 100, however the E & M Lead Control Circuit operates under a slightly different set of instructions, as will be described below in the explanation which accompanies FIG. 36. Still referring to FIG. 35, as was discussed earlier, the preferred embodiment of the TELEPHONE CONTROL SYSTEM 1 employs a Feature Group D (FGD) facility for trunks 8. This is provided via a 4-wire E&M trunk provisioned with TYPE I signaling, which is well known in the art. These type of trunks provide a 2-wire balanced transmit audio connection, a 2-wire balanced receive audio connection, an E-Lead, and an M-Lead. Although only one trunk interface 3500, one trunk 8, and one call processor 3504 are shown in FIG. 35, it should be readily evident to one skilled in the art that additional trunk interfaces and call processors may be added to support additional trunks. The trunk interface 3500 provides a two-way audio path shown at reference 3501, a loop status output shown at reference 3502, and a on/off hook control input shown at reference 3503. These lines are shown connected to call processor 3504 which performs the functions of voice storage and playback, DTMF generation and detection, and call control. Devices which perform the functions of call processor 3504 are well known in the art and many products, such as the Model D41B manufactured by Dialogic Corporation, exist commercially which can accomplish these functions. Also shown is a multi frequency detector module 3505 which is shown connected to the call processor 3504. A commercially available multi-frequency module capable of performing this function is the Model MF/40 manufactured by Dialogic Corporation. A data network interface 3507 is used to connect the SAF 110 to the other subsystems of the Telephone Control System 1. Data network interface 3507 passes data messages between the SAF 110 and these other subsystems. The functions of data network interface 3507 are well known in the art, and many products, such as the Model COM4i from Digiboard Corporation, exist commercially which can accomplish these functions. CPU 3506, which contains a microprocessor, a boot ROM, a RAM, and a disk, controls all functions of the SAF 110. The trunk interface 3500, the CPU 3506, the call processor 3504, and the data network interface 3507 are all shown connecter to an internal data bus 3508. The CPU 3506 initializes itself at power-up using the boot ROM and then loads a control program into memory which it then executes. The control program allows for the control of simultaneous activities on the trunks 8. An explanation of the control program for the SAF 110 accompanies FIG. 37.

A flowchart of the operation of E&M control circuit for the trunk interface 3500 of the SAF 115 is shown in FIG. 36. As the construction of the trunk interface 3500 of FIG. 35 is identical to that of the trunk interface 400 of FIG. 5, the explanation which follows will refer to the reference numbers of FIG. 5 when discussing the internal components of the trunk interface 3500. Referring now to FIG. 36, the E&M Lead Control Circuit Operation for the SAF Trunk Interface function is entered at step 3600 and control passes to step 3601 where the control circuit 450 idles waiting for an indication from current detector 440 that the E-Lead has gone off-hook. When the E-Lead does go off-hook, control passes to step 3602 where an "Incoming Call" signal is sent to CPU 3506 via buffer 460. Control then passes to step 3603 where a determination is made as to whether an off-hook signal is received from call processor 3504 signifying that the CPU 3506 is ready to accept the call. If the off hook signal is detected, then control passes to step 3604 where the 'loop status' 3502 is set active. Control then passes to step 3605 where the M-Lead is winked by taking the M-Lead relay 455 momentarily off-hook. Control then passes to step 3606 where a determination is made as to whether a 'DID received' signal 480 is detected. If the signal is not detected then control remains at step 3606. If the signal is received, indicating that the multifrequency detector 3505 has detected the 'ANI' and 'called number' digits from the FGD trunk 8, then control passes to step 3607 where the M-lead relay is once more winked momentarily off hook to acknowledge receipt of the multifrequency data. A 300 millisecond pause is then initiated at step 3608, prior to taking the M-Lead off hook at 3609 to 'answer' the trunk. At this point audio is established by the switch which is providing the FGD service, and the calling party is connected to the SAF 110. Control then passes to a loop consisting of steps 3610 and 3611. This loop persists until either at step 3610 the on/off hook signal 3503 is taken on hook by the call processor 3504, or at 3611 the E-Lead is determined to be on-hook. In either case the call is ended, and control passes to step 3612 where the 'loop status' signal 3502 is set inactive. Then at step 3613 a determination is made as to whether the 'DID received' signal 480 still remains active indicating the CPU 3506 is not yet ready to receive a new call. If this signal is still active, then control remains at step 3613. If it is determined at step 3613 that the 'DID received' signal 480 is now inactive, then control passes to step 3614 where the M-Lead is placed on hook, terminating the call, and control passes to step 3601.

A flowchart of the Subscriber Access Facility Main Task is illustrated in FIGS. 37a, 37b and 37b-1. This program is loaded into memory and executed by SAF CPU 3506. The Subscriber Access Facility Main Task is entered at step 3700 and control passes to step 3701 where a 'clear DID received' signal is sent to the trunk interface 3500. Control then passes to step 3702 where the 'incoming call' signal of the trunk interface 3500 is checked. If this signal is not active then control remains at step 3702. If this signal is active, then control passes to step 3703, where the output of the multi-frequency detector 3505 is checked via call processor 3504. The incoming multifrequency digit sequence 'KP'+'00'+ANI+'ST' is decoded where 'KP' is the start digit, 'ST' is the stop digit, and the ANI is the phone number of the phone from which the subscriber is calling. Control then passes to step 3704 where, in a similar manner, the incoming multi-frequency digit sequence 'KP'+800+NXX+XXXX+'ST' is decoded. Again the 'KP' is the start digit, the 'ST' is the stop digit, and the sequence 800 NXX XXXX is the phone number dialed by the subscriber to reach the trunk 8, the NXX being the prefix which identifies trunk group 8 to the PSTN 2. This phone number represents the programming function which the subscriber wishes to accomplish. Control then passes to step 3705 where a 'set DID received' signal is sent to the trunk interface 3500, indicating that the multifrequency data has been received. Control then passes to step 3706 where a determination is made as to whether the dialed number was of the form 800-NXX-00ab, and if the dialed number was not of this form then control passes to a connector labelled "SAF EXT" at reference 3707. If at step 3706 it is determined that the dialed number is of the form 800-NXX-00ab, then control passes to step 3710 where a 'request master record' message is constructed using the ANI received in step 3703, and the message is sent via data network interface 3507 to the CPF 100. Control then passes to step 3711 where a determination is made as to whether a response has been received to the 'request master record' message, and if such a response is not received control remains at step 3711. If the response message is received by network interface 3507, then control passes to step 3712 where a determination is made as to whether a valid subscriber master record 700 is included in the returned message. If a valid subscriber master record is not included, then control passes to the connector labelled "SAF REORDER" shown at reference 3713. If at step 3712 a valid subscriber master record 700 is found, then control passes to step 3714 where the DID number 701 is removed from the subscriber master record 700. Control then passes to step 3715 where a 'mode memory inquiry' message is constructed using the DID number 701 and the digits 'ab' as detected in step 3706, and the message is sent via data network interface 3507 to the CPF 100. Control then passes to step 3716 where a determination is made as to whether a response has been received to the 'mode memory inquiry' message, and if such a response is not received control remains at step 3716. If the response message is received by network interface 3507, then control passes to step 3717 where a determination is made as to whether a valid mode memory 800 is included in the returned message. If a valid mode memory 800 is not included, then control passes to the connector labelled "SAF REORDER" shown at reference 3718. If at step 3717 a valid mode memory 800 is found, then control passes to step 3720, which is identified by a connector labelled "SAF UPDATE" at reference 3719. At step 3720 a 'change to new mode memory' message is constructed, again using DID number 701 and the digits 'ab' as detected in step 3706, and the message is sent via data network interface 3507 to the CPF 100. Control then passes to step 3721 where the subscriber is prompted by call processor 3504: "Accepted, you have selected mode memory . . . 'ab'", where 'ab' are the digits detected in step 3706. Control then passes to step 3722 where the call processor 3504 causes trunk 8 to be placed on hook, and then control returns to step 3701. If at step 3706 it is determined that the dialed number was not of the form '800-NXX-00ab', then control passes to a connector labelled "SAF EXT" as shown at reference 3707. A connector labelled "SAF EXT" is shown at reference 3724, which causes control to be passed to step 3725 where a determination is made as to whether the dialed number was of the form 800-NXX-cdef, where the digits 'cd' do not equal '00'. If the dialed number is not of this form, then control passes to a connector labelled "SAF REORDER" shown at reference 3745. If at step 3725 it is determined that the dialed number is of this form, then control passes to step 3726 where call processor 3504 prompts the subscriber by playing a 'bong tone'. Control then passes to step 3727 where a determination is made as to whether the subscriber has entered a PIN code, and if the PIN code is not entered control remains at step 3727. If a PIN code is entered, then control passes to step 3728 where a 'request master record' message is constructed using then PIN code entered in step 3727 and the digits 'cdef' detected in step 3706. This message is then sent via data network interface 3507 to the CPF 100. Control then passes to step 3729 where a determination is made as to whether a response has been received to the 'request master record' message, and if such a response is not received control remains at step 3729. If the response message is received by network interface 3507, then control passes to step 3750 where a determination is made as to whether a valid subscriber master record 700 is included in the returned message. If a valid subscriber master record is not included, then control passes to the connector labelled "SAF REORDER" shown at reference 3751. If at step 3750 a valid subscriber master record 700 is found, then this indicates that CPF 100 found a subscriber master record 700 which had a DID number 701 which had the same last four digits as the digits 'cdef' detected in step 3706, and also had the same PIN code 702 as that detected in step 3727. Control passes to step 3730 where the subscriber is prompted: "Please enter your new mode memory number." Control then passes to step 3731 where a determination is made as to whether the subscriber has entered a memory number '10 to '99', and if such a number has not been entered, then control remains at step 3731. If a mode memory number is entered, then control passes to step 3732 where a 'mode memory inquiry' message is constructed 'using the DID number 701 and the and the memory number as detected in step 3731, and the message is sent via data network interface 3507 to the CPF 100. Control then passes to step 3733 where a determination is made as to whether a response has been received to the 'mode memory inquiry' message, and if such a response is not received control remains at step 3733. If the response message is received by network interface 3507, then control passes to step 3734 where a determination is made as to whether a valid mode memory 800 is included in the returned message. If a valid mode memory 800 is not included, then control passes to the connector labelled "SAF REORDER" shown at reference 3745. If at step 3734 a valid mode memory 800 is found, then control passes to step 3735, where a determination is made as to whether the mode memory which was received in the message requires an 'externally entered' memory. This is determined by inspecting the transfer number field of the mode memory 800. If it has an 'externally entered number' tag, then the mode memory does require an 'externally entered number'. If at step 3735 it is determined that an 'externally entered number' is not required, then control passes to a connector labelled "SAF UPDATE" at reference 3736, which as described earlier causes the mode memory requested to be invoked. If at step 3735 it is determined that an 'externally entered number' is required, then control passes to step 3737 where the subscriber master record 700 as acquired at step 3750 is retrieved from memory. Control then passes to step 3738 where the mode memory 800 that was acquired in step 3734 is copied field-by-field to the subscriber master record. Control then passes to step 3740, where the ANI number acquired in step 3703 is copied to the transfer number field 707 of the subscriber master record 700. Control then passes to step 3741 where an 'update master record' message is constructed using this master record, and the message is sent via data network interface 3507 to CPF 100. Control then passes to step 3742 where the subscriber is prompted: "Accepted, you have selected mode memory . . . xx", where the digits 'xx' are the digits entered by the subscriber at step 3731. Control then passes to step 3743 where the trunk 8 is placed on hook, and then control returns to the Subscriber Access Facility Main Task entry point as shown at reference 3748. If at step 3734, it is determined that the mode memory received in the message was not valid, then control passes to a connector labelled "SAF REORDER" at reference 3745, which causes control to pass to step 3746 where the call processor 3504 plays a 'reorder signal' to the subscriber, indicating that the call is being terminated. Control then passes to step 3747 where the trunk 8 is placed on hook. Control then returns to the Subscriber Access Facility Main Task entry point as shown at reference 3748.

Figure 38:
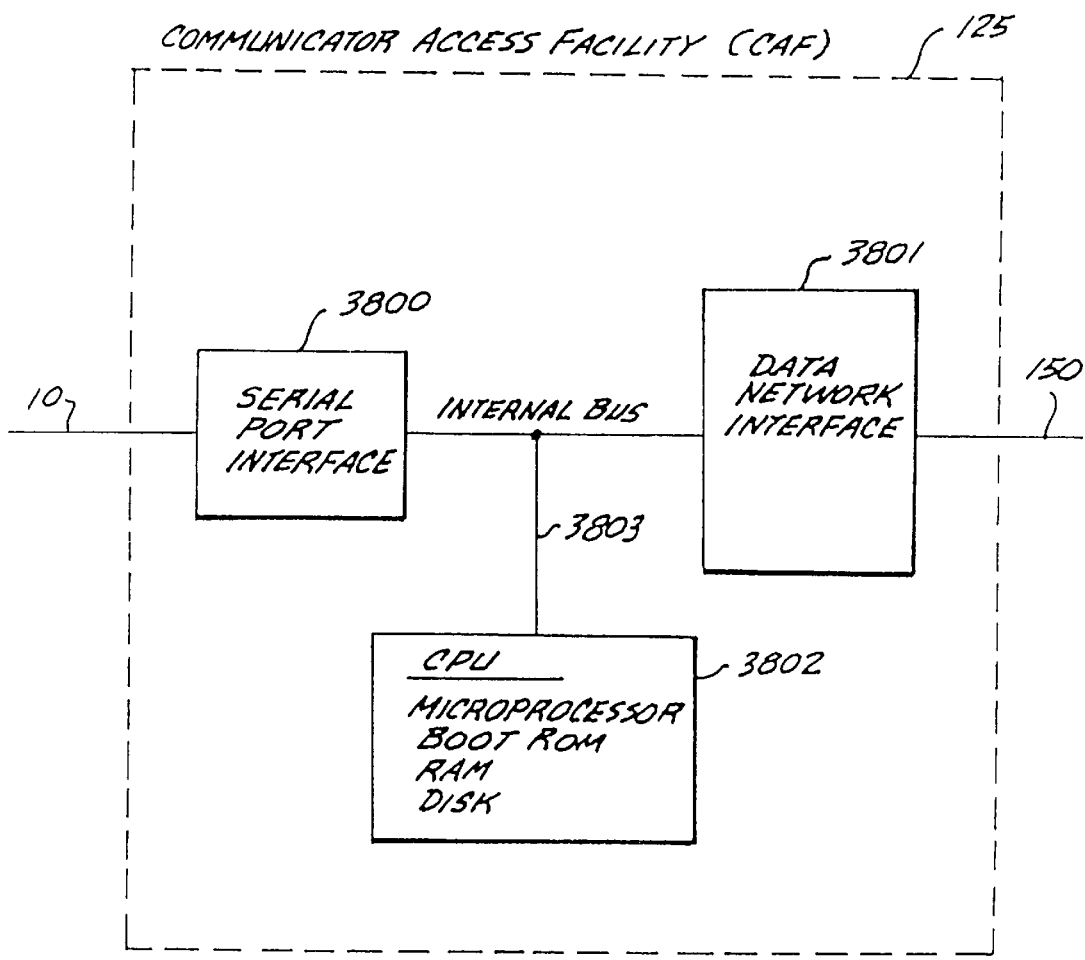
FIG. 38 is a block diagram illustrating the principle components of the Communicator Access Facility.

A block diagram of the Communicator Access Facility (CAF) 125 is illustrated in FIG. 38. As shown, the CAF 125 contains a serial port interface module 3800 which connects to the serial datalink 10, and a data network interface 3801 which connects to the high speed data network 150. The functions of data network interface 3801 are well known in the art, and many products, such as the Model COM4i from Digiboard Corporation, exist commercially which can accomplish these functions. The operation of the CAF 125 is controlled by CPU module 3802, which consists of a microprocessor, a boot ROM, RAM, and disk. The boot ROM is used to initialize the CPU and load the control program into memory from disk. Operation of the CAF 125 is then controlled by the control program. The control program is described in the explanation which accompanies FIG. 39. Still referring to FIG. 38, the serial port 3800, data network interface 3801, and the CPU module 3802 are all shown connected to internal bus 3803.

Figure 39:
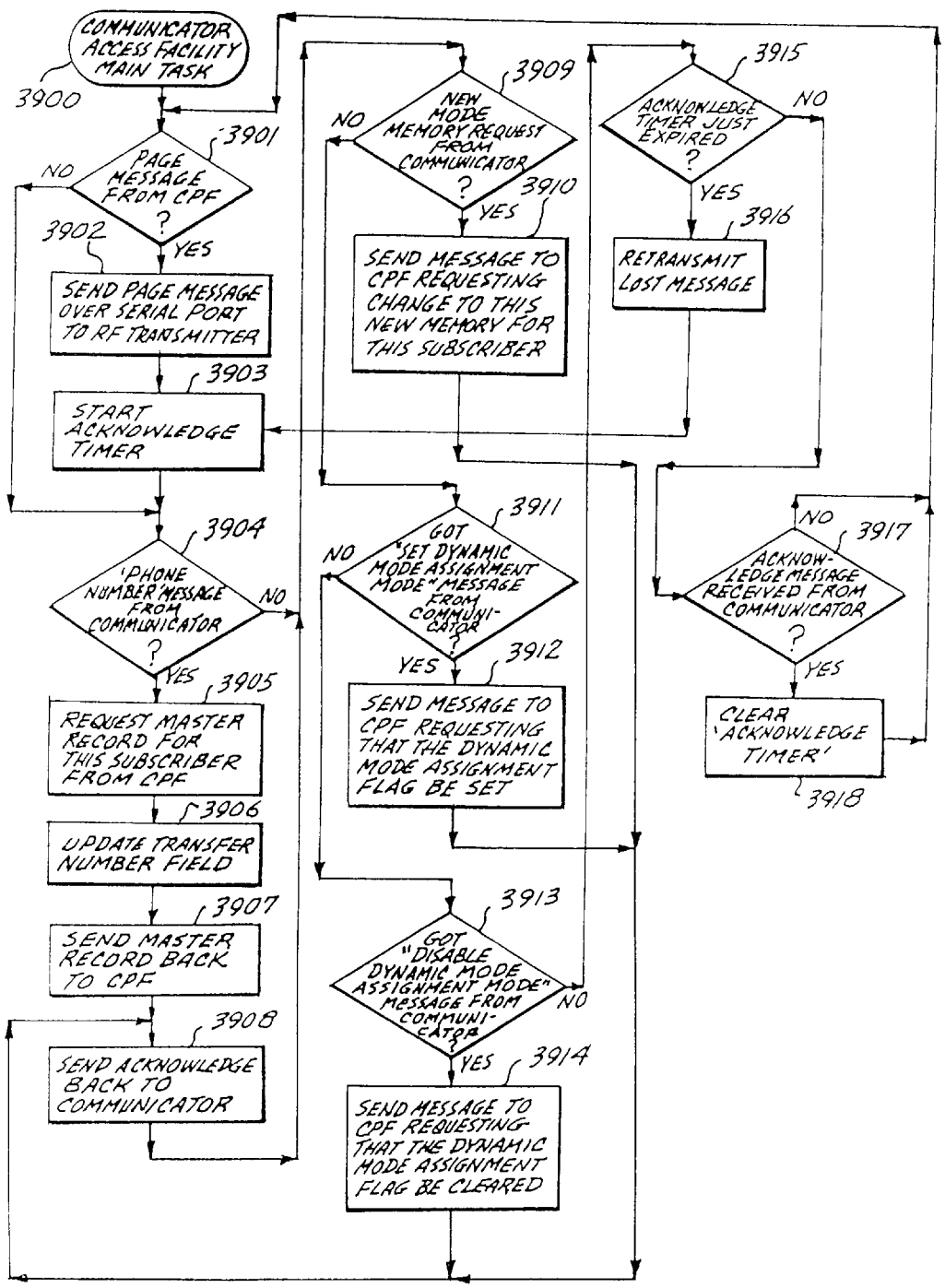
FIG. 39 is a flowchart of the Communicator Access Facility Main Task.

A flowchart of the Communicator Access Facility Main Task is illustrated in FIG. 39. This program is loaded into memory and executed by CPU 3802 of the CAF 125. The Communicator Access Facility Main Task is entered at step 3900 and control passes to step 3901 where a determination is made as to whether a 'page message' is received via data network interface 3801, and if a 'page message' is received then control passes to step 3902 where the page message is sent via serial port 3800 and datalink 10 to packet radio transceiver 9. Control then passes to step 3903 where an 'acknowledge timer' is started, and the 'page message' just sent is saved and associated with this 'acknowledge timer'. Control then passes to step 3904. Control also passes to step 3904 if a 'page message' is not received as determined at step 3901. At step 3904, a determination is made as to whether a 'phone number' message has been received from a communicator 11 via the serial port interface 3800. If such a message has been received, then control passes to step 3905 where the subscriber's DID number 701 is retrieved form the message, and a 'request master record' message is created and sent to the CPF 100 via data network interface 3801. When the response is received from the CPF 100 via the data network interface 3801, the subscriber master record is retrieved from the response message. Control then passes to step 3906 where the transfer number field 707 of the subscriber master record 700 is updated per the phone number received from the communicator 11 at step 3904. Control then passes to step 3907 where an 'update master record' message is then constructed and sent back to the CPF 100 via data network interface 3801. Control then passes to step 3908, where an 'acknowledge message' is sent back to the communicator 11 via serial port 3800. Control then passes to step 3909. Control also passes to step 3909 if a 'phone number' message is not detected at step 3904. At step 3909 a determination is made as to whether a 'new mode memory' message is received from a communicator 11 via serial port 3800. If this message type has been received then control passes to step 3910 where a 'change to new mode memory' message is constructed and sent to CPF 100 via data network interface 3801, and then control passes to step 3908 where an 'acknowledge' message is sent back to the communicator 11 as described earlier. If at step 3909 a 'new mode memory request' message is not detected, then control passes to step 3911 where a determination is made as to whether a 'set dynamic mode assignment mode' message is received from a communicator 11 via serial port 3800. If this message type is received, then control passes to step 3912, where a 'set dynamic mode assignment flag' message is constructed and sent to CPF 100 via data network interface 3801. Control then passes to step 3908 where an 'acknowledge' message is sent back to the communicator 11 as described earlier. If at step 3911 a 'set dynamic mode assignment mode' message is not detected, then control passes to step 3913 where a determination is made as to whether a 'disable dynamic mode assignment mode' message is received from a communicator 11 via serial port 3800. If this message type is received, then control passes to step 3914, where a 'clear dynamic mode assignment flag' message is constructed and sent to CPF 100 via data network interface 3801. Control then passes to step 3908 where an 'acknowledge' message is sent back to the communicator 11 as described earlier. If at step 3913 a 'disable dynamic mode assignment mode' message is not detected, then control passes to step 3915 where a determination is made as to whether the 'acknowledge timer' has just expired. If the 'acknowledge timer' has just expired, as determined at step 3915, then control passes to step 3916 where the message which was associated with this 'acknowledge timer' is again sent to the communicator 11 via serial port interface 3800, and control then passes to step 3903. If at step 3915 it is determined that an 'acknowledge timer' has not just expired, then control passes to step 3917 where a determination is made as to whether an 'acknowledge' message is received from a communicator via serial port interface 3800, and if an 'acknowledge' message is not received, then control returns to step 3901. If an 'acknowledge' message is received, as determined at step 3917, then the 'acknowledge' timer which is associated with the last message sent to the communicator 11 identified in the 'acknowledge' message is cleared. Control then returns to step 3901.

Figure 40:
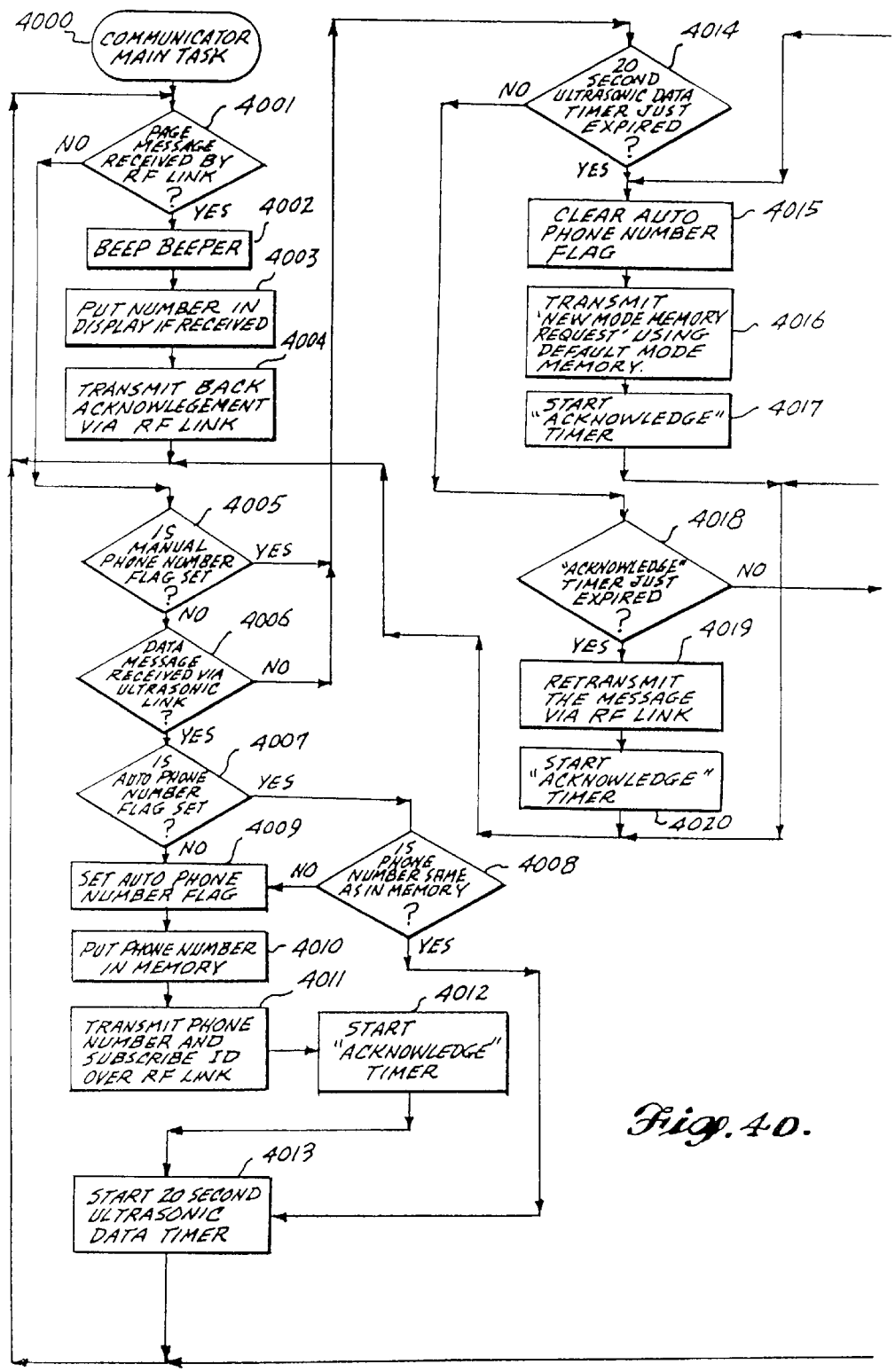
FIGS. 40 and 40a form a flowchart of the Communicator Main Task.
Figure 40A:
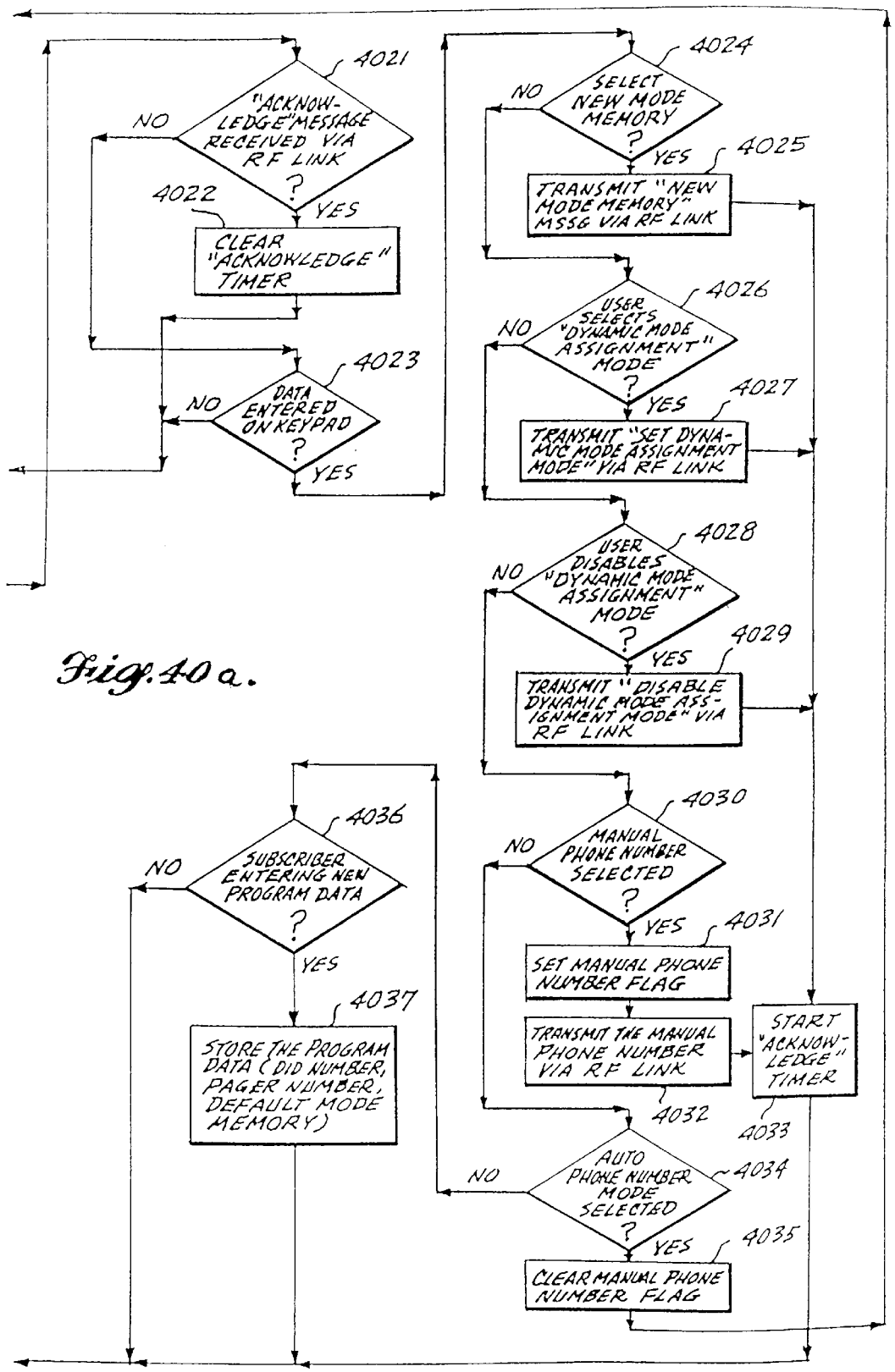

A flowchart of the Communicator Main Task is illustrated in FIG. 40. This task is executed by microprocessor 200, and controls all operations of the communicator 11. The Communicator Main Task is entered at step 4000 and control passes to step 4001 where a determination is made as to whether a 'page' message is detected at the receive data input 245. If a 'page' message is detected, and the message contains the pager number which corresponds to this communicator, then control passes to step 4002, where a signal is sent via output port 250 causing the beeper 260 to generate an alerting sound. Control then passes to step 4003 where a display number is retrieved from the decoded 'page' message, and is output to the display 210. Control then passes to step 4004 where a brief 'acknowledge' message is sent via transmit data port 215 to packet data encoder 220 and then to rf transmitter 225. All RF transmissions from communicator 11 are sent as brief packet. 'bursts', thus maintaining a longer life for battery 290. Control then returns to step 4001. If at step 4001 it is determined that a 'page' message is not received, then control passes to step 4005 where a determination is made as to whether a 'manual phone number flag' is set, and if the flag is not set control passes to step 4006 where a determination is made as to whether a data message is received from the ultrasonic transmitter 12 via the serial data input 280, and if such a message is received then control passes to step 4007. At step 4007 a determination is made as to whether a 'auto phone number flag' is set and if the flag is not set control passes to step 4009 where the 'auto phone number flag' is set. Control then passes to step 4010 where the phone number which was embedded in the message received at step 4006 is stored in the memory of microprocessor 200. Control then passes to step 4011 where a 'phone number' message is constructed using the phone number of step 4006, and the subscriber DID number 701, as prestored in the RAM of microprocessor 200. This message is then sent to transmit data port 215.

Control then passes to step 4012 where an 'acknowledge timer' is started. Control then passes to step 4013 where a '20 second ultrasonic data timer' is started. Control then returns to step 4001. If at step 4007 it is determined that the 'auto phone number flag' is set, then control passes to step 4008, where a determination is made as to whether the phone number received embedded in the message at step 4006 is the same as the phone number currently in memory as stored at step 4010. If the phone numbers match then control passes to step 4013. If at step 4008 it is determined that the phone numbers are different, indicating that the subscriber has moved to a different room, then control passes to step 4009. If at step 4005 it is determined that the 'manual phone number flag' is set, or if at step 4006 it is determined that a data message is not being received via input port 280, then control passes to step 4014 where a determination is made as to whether the '20 second ultrasonic data timer' has just expired, and if it has, indicating that the subscriber is no longer near an ultrasonic transmitter 12, then control passes to step 4015. At step 4015 the 'auto phone number flag' is cleared and control passes to step 4016 where the a 'new mode memory request' message is constructed using the stored subscriber DID number 701, and the stored 'default mode memory'. Control then passes to step 4017 where an 'acknowledge timer' is started, and then control returns to step 4001. If at step 4014 it is determined that the '20 second ultrasonic data timer' has not just expired, then control passes to step 4018 where a determination is made as to whether the 'acknowledge timer' has just expired, and if it has just expired control passes to step 4019 where the message is re-sent via transmit data port 215. Then at step 4020, an 'acknowledge timer' is started, and then control returns to step 4001. If at step 4018 it is determined that the 'acknowledge timer' has not expired, then control passes to step 4021 where a determination is made as to whether an 'acknowledge' message with a pager number that corresponds to this communicator 11 is received via the receive data input 245, and if such a message is received then control passes to step 4022 where the 'acknowledge timer' is cleared. Control the returns to step 4001. If at step 4021 it is determined that an 'acknowledge' message is not received, then control passes to step 4023 where a determination is made as to whether the subscriber is entering data via the keypad 205, and if the subscriber is not entering data, then control returns to step 4001. If the subscriber is entering data via the keypad, as determined at step 4023, then control passes to step 4024 where a determination is made as to whether the subscriber wishes to program the Telephone Control System 1 to operate under control of a new mode memory. If this is the case, then control passes to step 4025 where a 'new mode memory request message' is constructed and sent to transmit data port 215, and then control passes to step 4033 where an 'acknowledge timer' is started, and then control returns to step 4001. If at step 4024 it is determined that the subscriber is not selecting a new mode memory, then control passes to step 4026 where a determination is made as to whether the subscriber is selecting the dynamic mode assignment feature, and if this is the case, then control passes to step 4027 where a 'set dynamic mode assignment mode' message is constructed and sent to transmit data port 215, and then control passes to step 4033. If at step 4026 it is determined that the subscriber is not selecting the dynamic mode assignment feature, then control passes to step 4028 where a determination is made as to whether the subscriber is disabling the dynamic mode assignment feature, and if this is the case, then control passes to step 4029 where a 'disable dynamic mode assignment mode' message is constructed and sent to transmit data port 215, and then control passes to step 4033. If at step 4028 it is determined that the subscriber is not disabling the dynamic mode assignment mode, then control passes to step 4030 where a determination is made as to whether the subscriber is entering a phone number, and if a phone number is being entered then control passes to step 4031 where the 'manual phone number flag' is set. Control then passes to step 4032 where a 'phone number' message is constructed using the phone number entered by the subscriber at step 4030, and this message is transmitted via transmit data port 215. Control then passes to step 4033. If at step 4030 it is determined that the subscriber is not entering a phone number, then control passes to step 4034 where a determination is made as to whether the subscriber is selecting the auto-phone number mode, and if this is the case, then control passes to step 4035 where the 'manual phone number flag' is cleared, and control then passes to step 4015. If at step 4034 it is determined that the subscriber is not selecting the auto-phone number mode, then control passes to step 4036, where a determination is made as to whether the subscriber is entering new program data such a the stored DID number, the stored pager number, and the stored default mode memory. If the subscriber is attempting to modify any of these parameters, then control passes to step 4037 where the new data is stored in the RAM of microprocessor 200. Otherwise, control returns to step 4001. As can be understood from the explanation above, one of the primary functions of the Communicator 11 and the Communicator Access Facility 125 is to take the phone number identifying the location of the subscriber, as transmitted by ultrasonic transmitter 12, and cause that number to be used by the Telephone Control System 1 as the forwarding number for the subscriber. It should also be understood that in a similar fashion the ultrasonic transmitter 12 may transmit a 'mode memory number' which, if sent to the Telephone Control System 1 via the Communicator 11 and the Communicator Access Facility 125, would allow that mode memory to be used by the Telephone Control System 1 to specify the call handling mode for the subscriber. In this case, the Communicator 11 receives a data message from an ultrasonic transmitter 12 and determines that the message contains a mode memory. The Communicator 11 then transmits a 'new mode memory request' message, which includes the subscriber's DID number 701, via its RF transmitter 225. This message is received by packet radio transceiver 9 and sent to the CAF 125 via data line 10. The CAF 125 then sends a "change to new mode memory" message to CPF 100 via data network interface 3801. CPF 100 then copies the mode memory referred to in the message to this subscriber's "subscriber master record" 700. To further illustrate this process, consider the example of a hospital operating room where an ultrasonic transmitter 12 is transmitting a message containing a mode memory number which corresponds to the "message center" call handling mode. If a doctor, carrying a Communicator 11 enters the operating room, then the Telephone Control System is automatically programmed to send his calls to the "message center."

Figure 41:
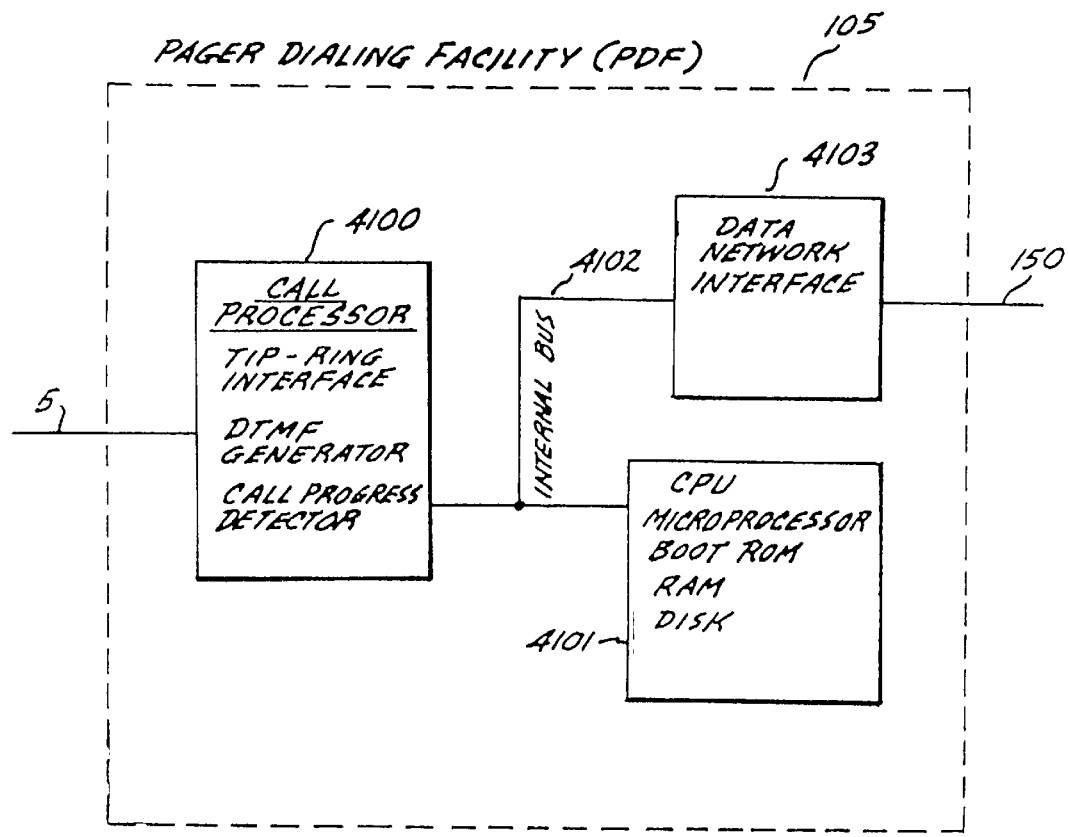
FIG. 41 is a block diagram illustrating the principle components of the Pager Dialing Facility.

A block diagram of the Pager Dialing Facility (PDF) 105 is illustrated in FIG. 41. Standard tip-ring line 5 is shown connected to call processor 4100, which contains a tip-ring interface, DTMF generators, call progress detectors. The functions of call processor 4100 are well known in the art, and many products, such as the Model D41B manufactured by Dialogic Corporation, exist commercially which can accomplish these functions. The PDF 105 also contains a CPU 4101 which contains a microprocessor, a boot ROM, a RAM, and a disk. The PDF 105 also contains a data network interface module 4103 which connects to the high speed data network 150. The functions of data network interface 4103 are well known in the art, and many products, such as the Model COM4i from Digiboard Corporation, exist commercially which can accomplish these functions. The call processor 4100, the CPU 4101, and the data network interface 4103 are all shown connected to an internal data bus 4102. The CPU 4101 initializes itself at power-up using the boot ROM and then loads a control program into memory which it then executes.

Figure 42:
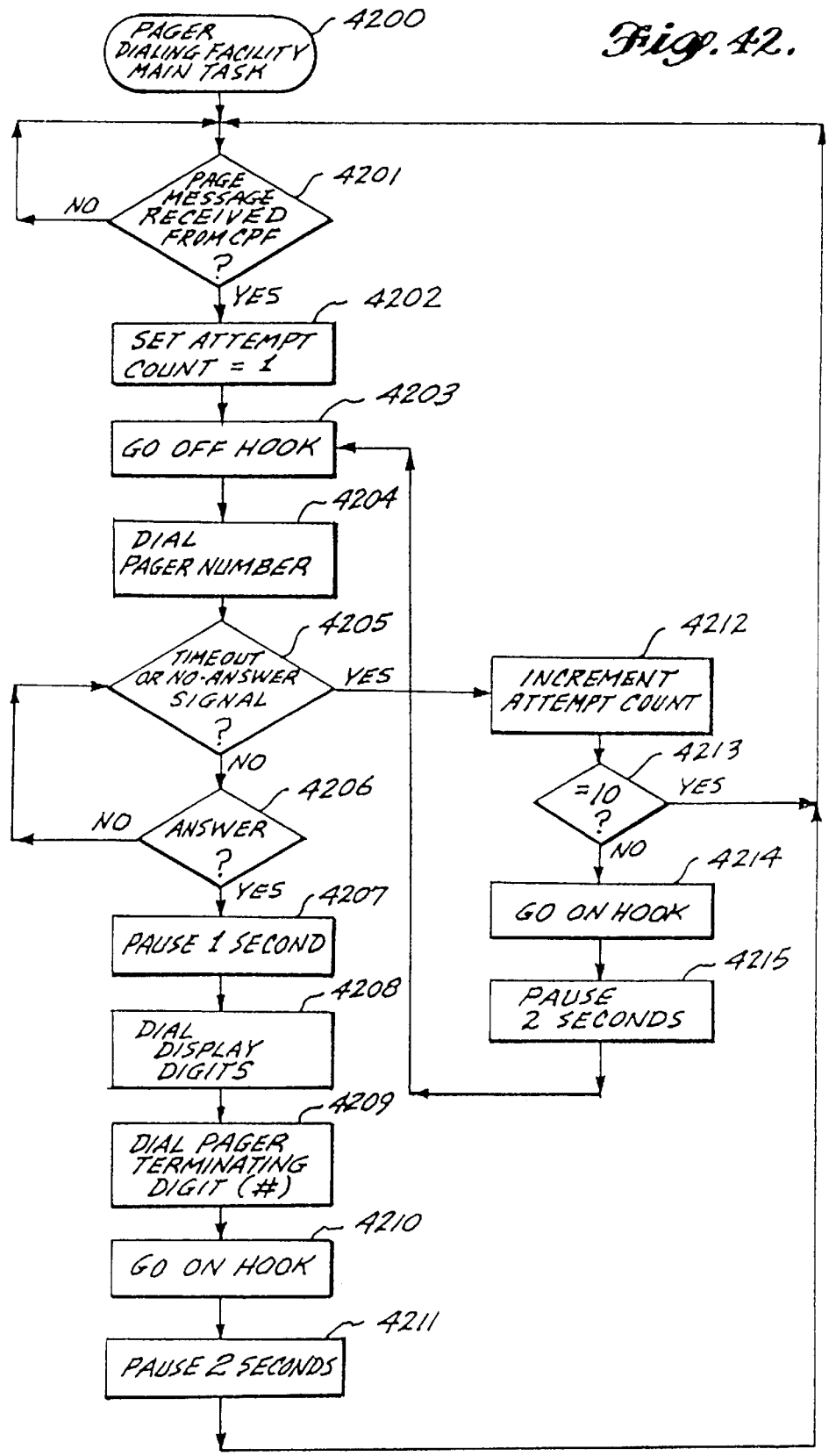
FIG. 42 is a flowchart of the Pager Dialing Facility Main Task.

A flowchart of the Pager Dialing Facility Main Task is illustrated in FIG. 42. This program is loaded into memory and executed by CPU 4101 of the PDF 105. The Pager Dialing Facility Main Task is entered at step 4200 and control passes to step 4201 where a determination is made as to whether a 'page' message is received from CPF 100 via data network interface 4201, and if the message is not received then control remains at step 4201. If a 'page' message is received, then the 'pager number' and the 'display digits' are retrieved from the message, and control passes to step 4202 where an 'attempt count' is set to a value of 1. Control then passes to step 4203, where line 5 is taken off hook, and then control passes to step 4204 where call processor 4100 dials the 'pager number'. Control then passes to step 4205 where a determination is made as to whether the call has not been answered due to a time-out or a non-answer signal such as operator intercept, busy, or reorder. If such a signal or time-out condition is not detected then control passes to step 4206 where a determination is made as to whether the call has been answered by the paging terminal, and if the call has not been answered, control returns to step 4205. If at step 4206 it is determined that the call is answered, then control passes to step 4207 where a 1 second pause is initiated, and then control passes to step 4208 where the 'display digits' are dialed by call processor 4100. Control then passes to step 4209 where the pager termination digit '#' is dialed, and then control passes to step 4210 where the line 5 is placed on hook. Control then passes to step 4211 where a 2 second delay is initiated before returning control to step 4201. If at step 4205 it is determined that a time-out or non-answer signal is detected, then control passes to step 4212 where the 'attempt count' is incremented. Control then passes to step 4213 where the 'attempt count' is checked and if it is found to be not equal to ten then control passes to step 4214 where the line 5 is placed on hook and then after a 2 second pause a step 4215, control returns to step 4203 to make another attempt at dialing this number. If at step 4213 it is found that the 'attempt count' is now equal to 10, then this page is abandoned by returning control to step 4201.

Figure 43:
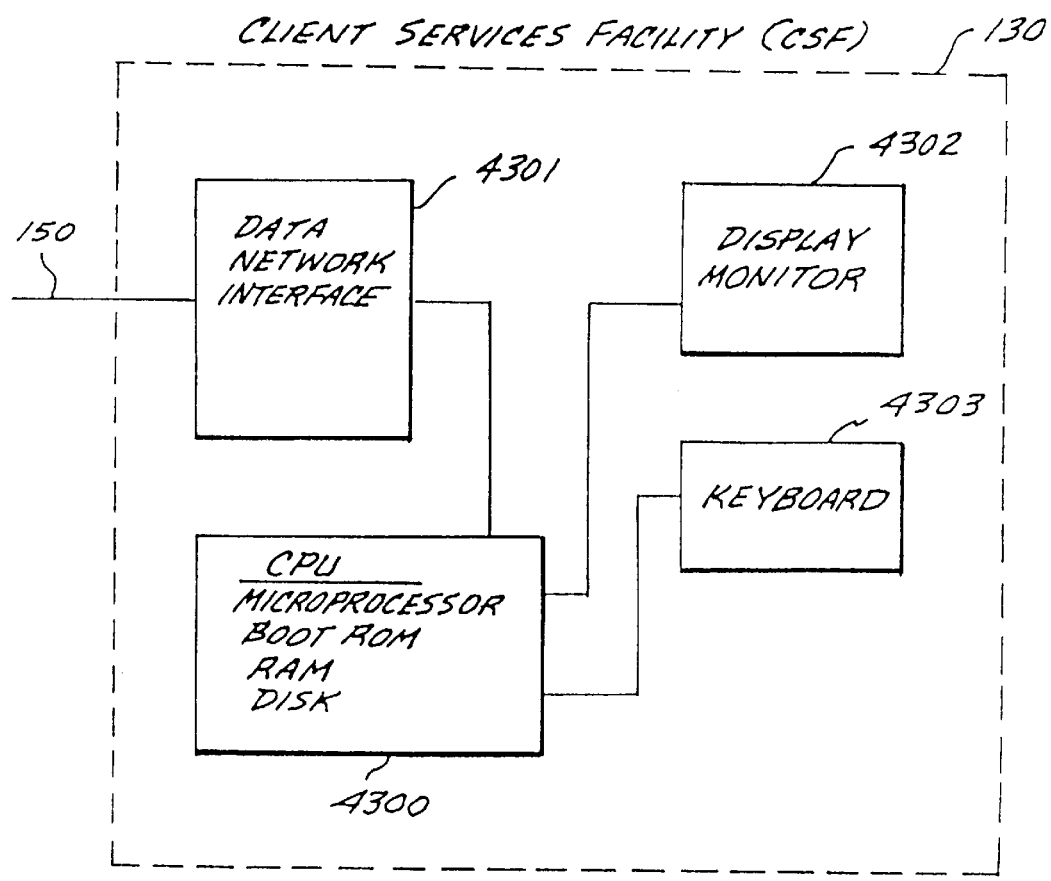
FIG. 43 is a block diagram illustrating the principle components of the Client Services Facility.

A block diagram of the Client Services Facility (CSF) 130 is illustrated in FIG. 43. The Client Services Facility (CSF) 130 is used by the service bureau which provides the Telephone Control System service to it's subscribers. The CSF 130 allows a client services representative to gain access to the database contained in the CPF 100, and thus be able to review and modify the subscriber master records 700 and mode memories 800 of the subscribers. The CSF 130 contains a CPU 4300 which contains a microprocessor, a boot ROM, a RAM, and a disk. The CSF 130 also contains a data network interface module 4301 which connects to the high speed data network 150. The functions of data network interface 4301 are well known in the art, and many products, such as the Model COM4i from Digiboard Corporation, exist commercially which can accomplish these functions.

Also shown is a display monitor 4302, and a keyboard 4303. The CPU 4300 initializes itself at power-up using the boot ROM and then loads a control program into memory which it then executes.

Figure 44:
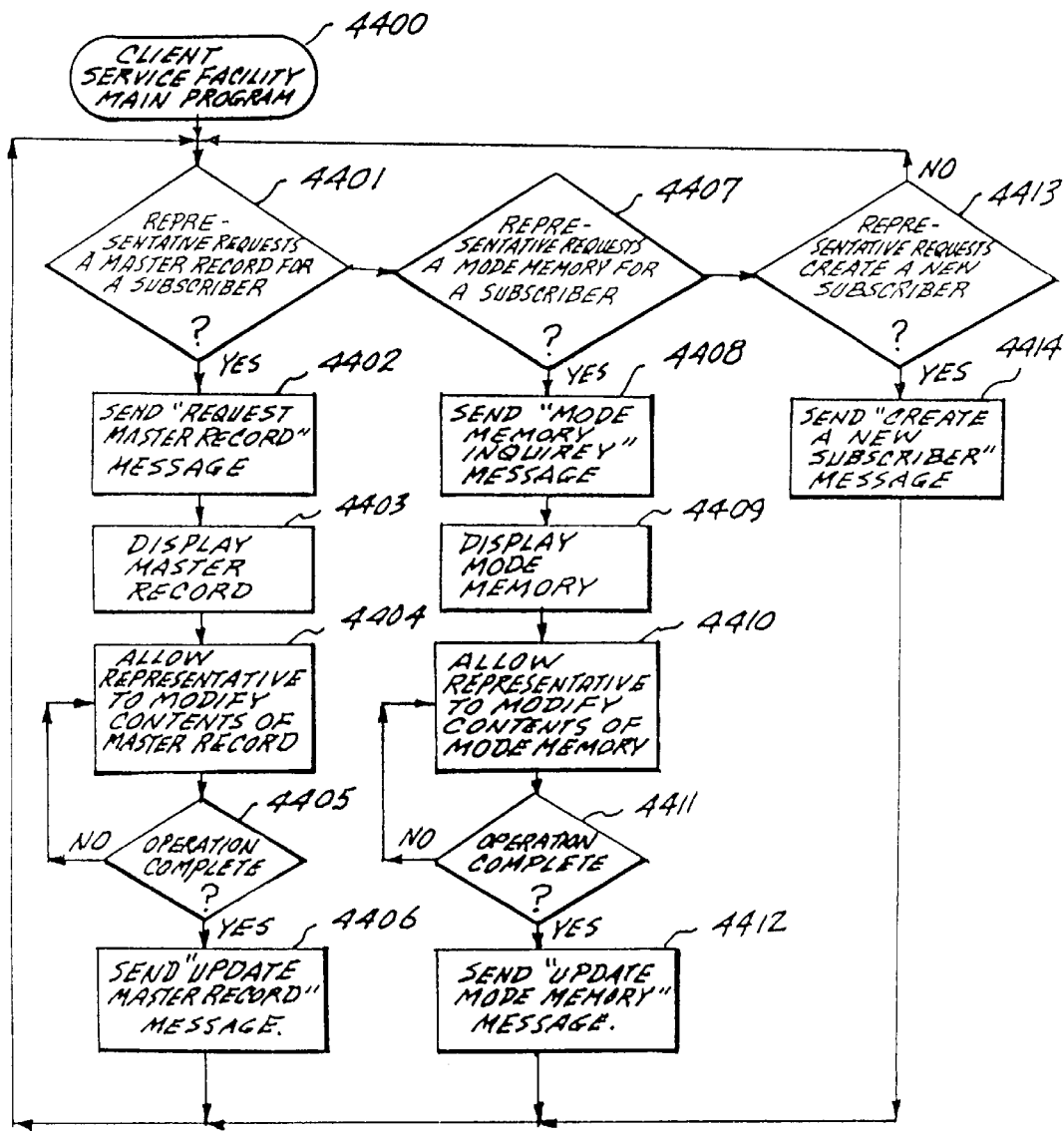
FIG. 44 is a flowchart of the Client Services Facility Main Task.

A flowchart of the Client Services Facility Main Program is illustrated in FIG. 44. This program is loaded into memory and executed by CPU 4300 of the CSF 130. The Client Services Facility Main Program is entered at step 4400 and control passes to step 4401 where a determination is made as to whether the client services representative has entered the DID number for a particular subscriber and has requested a subscriber master record 700, and if this is the case then control passes to step 4402 where a 'request master record' message is sent via data network interface 4301 to CPF 100. Control then passes to step 4403 where the subscriber master record 700 is removed from the response message from the CPF 100, and is displayed on monitor 4302. Then at step 4404, the client services representative is allowed to review and modify the contents of the subscriber master record 700 using monitor 4302 and keyboard 4303. Then at step 4405 a determination is made as to whether the client services representative is completed with this operation, and if not, then control returns to step 4404. When the operation is complete, then control passes to step 4406 where an 'update master record' message is constructed and sent to CPF 100 via data network interface 4301. Control then returns to step 4401. If at step 4401 it is determined that the client services representative is not requesting a subscriber master record 700, then control passes to step 4407 where a determination is made as to whether the client services representative has entered the DID number for a particular subscriber and has requested a subscriber mode memory 800, and if this is the case then control passes to step 4408 where a 'mode memory inquiry' message is sent via data network interface 4301 to CPF 100. Control then passes to step 4409 where the mode memory 800 is removed from the response message from the CPF 100, and is displayed on monitor 4302. Then at step 4410, the client services representative is allowed to review and modify the contents of the mode memory 800 using monitor 4302 and keyboard 4303. Then at step 4411 a determination is made as to whether the client service representative is completed with this operation, and if not, then control returns to step 4410. When the operation is complete, then control passes to step 4412 where an 'update mode memory' message is constructed and sent to CPF 100 via data network interface 4301. Control then returns to step 4401. If at step 4407 it is determined that the client services representative is not requesting a new mode memory, the control passes to step 4413 where a determination is made as to whether the client services representative has entered a DID number and wishes to activate a new subscriber for this number. If this is the case then control passes to step 4414 where a 'create a new subscriber message' is generated with this DID number and the message is sent to CPF 100 via data network interface 4301. Control then returns to step 4401. If at step 4413 it is determine that the client services representative does not wish to create a new subscriber, then control returns to step 4401.

While a preferred embodiment of the invention has been described in detail it should be apparent that many modifications and variations thereto are possible, all of which fall within the true spirit and scope of the invention.

For example, while the preferred embodiment of the control system provides voice synthesized type courtesy messages, any appropriate tones, beeps, etc. would serve as a courtesy message and such is the use of that term throughout the claims appended hereto. In addition, the term "line" as used herein and in the claims appended hereto includes both lines and trunks.

In addition, whereas the preferred embodiment of the invention uses the term "line" to describe the interconnecting medium between the control system and the central exchange, it should be understood throughout the specification and claims that "line" refers to tip and ring pairs, trunks or any other form of connecting circuits.

We claim:

1. A telecommunications system capable of receiving telephone calls for meet-me subscribers and telephone calls for non-meet-me subscribers from a telephone network, wherein the subscribers are provided with portable paging receivers, comprising:

a paging system, which, in response to meet-me page requests, generates pages and broadcasts the pages to paging receivers;

a meet-me unit connected to the telephone network for handling telephone calls to the meet-me page subscribers and for handling telephone calls from the meet-me page subscribers, wherein said meet-me unit, in response to an incoming call for a specific meet-me page subscriber, generates a meet-me page request and holds the incoming call, and wherein said meet-me unit is connected to said paging system for forwarding meet-me page requests thereto, said meet-me unit also determining from which meet-me page subscriber that a meet-me page subscriber call has been received, determining if said held call is for the calling meet-me page subscriber; and, if said held call is for the meet-me page subscriber, establishing a signal link between said held call and the call from the meet-me page system subscriber wherein said meet-me unit includes means to indicate to the calling meet-me subscriber that verbal communication via said signal link may commence.

2. A telecommunications system capable of receiving telephone calls for meet-me subscribers and telephone calls for non-meet-me subscribers from a telephone network, wherein the subscribers are provided with portable paging receivers, comprising:

a paging system, which, in response to meet-me page requests, generates pages and broadcasts the pages to paging receivers;

a meet-me unit connected to the telephone network for handling telephone calls to the meet-me page subscribers and for handling telephone calls from the meet-me page subscribers, wherein said meet-me unit, in response to an incoming call for a specific meet-me page subscriber, generates a meet-me page request and holds the incoming call, and wherein said meet-me unit is connected to said paging system for forwarding meet-me page requests thereto, said meet-me unit also determining from which meet-me page subscriber that a meet-me page subscriber call has been received, determining if said held call is for the calling meet-me page subscriber; and, if said held call is for the meet-me page subscriber, establishing a signal link between said held call and the call from the meet-me page system subscriber wherein said meet-me unit includes means for selectively disabling establishment of said signal link in response to an election by the meet-me page system subscriber.

3. The telecommunications system of claim 2, wherein, before said signal link is established between said held call and the meet-me page system subscriber, said meet-me unit causes a message to be played announcing to the subscriber that a meet-me call has been receive.

4. A telecommunications system capable of receiving telephone calls for meet-me subscribers and telephone calls for non-meet-me subscribers from a telephone network, wherein the subscribers are provided with portable paging receivers, comprising:
- a paging systems, which, in response to meet-me page requests, generates pages and broadcasts the pages to paging receivers;
- a meet-me unit connected to the telephone network for handling telephone calls to the meet-me page subscribers and for handling telephone calls from the meet-me page subscribers, wherein said meet-me unit, in response to an incoming call for a specific meet-me page subscriber, generates a meet-me page request and holds the incoming call, and wherein said meet-me unit is connected to said paging system for forwarding meet-me page requests thereto, said meet-me unit also determining from which meet-me page subscriber that a meet-me page subscriber call has been received, determining if said held call is for the calling meet-me page subscriber; and, if said held call is for the meet-me page subscriber, establishing a signal link between said held call and the call from the meet-me page system subscriber wherein said meet-me unit, in response to receiving telephone calls to at least some of the meet-me page system subscribers, monitors the telephone calls for transmission of an access code, and said meet-me unit generates a specific indication to said meet-me page subscribers that a meet-me call request is pending only in the event said access code is received.

5. A telecommunications system capable of receiving telephone calls for meet-me subscribers and telephone calls for non-meet-me subscribers from a telephone network, wherein the subscribers are provided with portable paging receivers, comprising:
- a paging system, which, in response to meet-me page requests, generates pages and broadcasts the pages to paging receivers;
- a meet-me unit connected to the telephone network for handling telephone calls to the meet-me page subscribers and for handling telephone calls from the meet-me page subscribers, wherein said meet-me unit, in response to an incoming call for a specific meet-me page subscriber, generates a meet-me page request and holds the incoming call, and wherein said meet-me unit is connected to said paging system for forwarding meet-me page requests thereto, said meet-me unit also determining from which meet-me page subscriber that a meet-me page subscriber call has been received, determining if said held call is for the calling meet-me page subscriber; and, if said held call is for the meet-me page subscriber, establishing a signal link between said held call and the call from the meet-me page system subscriber wherein, before said circuitry establishes said signal link between said held call and said meet-me page system subscriber, said meet-me unit causes a message to be played announcing to the meet-me page system subscriber that a meet-me call has been received.

6. A telecommunications system capable of receiving telephone calls for meet-me subscribers and telephone calls for non-meet-me subscribers from a telephone network, wherein the subscribers are provided with portable paging receivers, comprising:
- a paging system, which, in response to meet-me page requests, generates pages and broadcasts the pages to paging receivers;
- a meet-me unit connected to the telephone network for handling telephone calls to the meet-me page subscribers and for handling telephone calls from the meet-me page subscribers, wherein said meet-me unit, in response to an incoming call for a specific meet-me page subscriber, generates a meet-me page request and holds the incoming call, and wherein said meet-me unit is connected to said paging system for forwarding meet-me page requests thereto, said meet-me unit also determining from which meet-me page subscriber that a meet-me page subscriber call has been received, determining if said held call is for the calling meet-me page subscriber; and, if said held call is for the meet-me page subscriber, establishing a signal link between said held call and the call from the meet-me page system subscriber wherein said meet-me unit, in response to receiving a call from a meet-me page subscriber who has a call held, signals the meet-me page subscriber that there is a held call, waits to receive an accept code from the meet-me page subscriber, if said accept code is received, proceeds to establish said signal link between said held call and the meet-me page subscriber, and, if said accept code is received, plays a message to the caller; and, as said signal link between said held call and said meet-me page subscriber is being established, signalling the meet-me page subscriber to indicate that the caller is being connected.

7. The telecommunications system of claim 3, wherein after said meet-me unit generates said meet-me page request, said meet-me unit causes a message to be played to the caller indicating that the called subscriber is being paged.

8. The telecommunications system of claim 3, wherein each meet-me page subscriber is assigned a single telephone number, said meet-me unit receives calls to the meet-me subscribers and from the meet-me subscribers over said single number, and said meet-me unit evaluates signals entered over said single telephone number to determine if a call is to the meet-me subscriber or from the meet-me subscriber.

9. The telecommunications system of claim 3, wherein said paging system and said meet-me unit are spaced apart from each other.

10. A telecommunications system comprising:
- a paging system responsive to received paging requests for broadcasting said pages in response thereto;
- a control unit for receiving telephone calls directed to meet-me page subscribers and for receiving telephone calls from the meet-me page subscribers, wherein said control unit distinguishes between calls to the meet-me page subscribers and calls from the meet-me page subscribers and in response to an incoming call for a specific meet-me subscriber, generating a meet-me page request and forwarding said meet-me page request to said paging system; and
- a processor for determining which meet-me page subscriber said meet-me page subscriber call is from, determining if said incoming call for the specific meet-me subscriber is for the calling meet-me page subscriber and, if the incoming call for the specific meet-me subscriber is for the calling meet-me page subscriber, establishing a signal link between the incoming call for the specific meet-me subscriber and the call from the meet-me page subscriber, said processor including means to indicate (i) to the calling meet-me page subscriber and (ii) to a party making the incoming call for the specific meet-me subscriber, upon the signal link between the incoming call for the specific meet-me subscriber and the call from the meet-me page subscriber being established, that verbal communication via said signal link may commence.

11. The telecommunications system of claim 10, wherein: said control unit and said processor cooperate to determine if a call is to be a non-meet-me page subscriber, to a meet-me page subscriber, or from a meet-me page subscriber and when said call is to a meet-me page subscriber, generates either a standard page request or a meet-me page request and when the call is from a meet-me page subscriber, establishes a signal link to said held call to the meet-me page subscriber.

12. The telecommunications system of claim 10, wherein, as said control unit and said processor cooperate to establish said signal link between said held call and said meet-me page system subscriber, said control unit and said processor cooperate to play a message to the meet-me page system subscriber announcing that said held call is waiting.

13. The telecommunications system of claim 10, wherein said control unit, in response to receiving telephone calls to at least some of the meet-me page system subscribers, monitors the telephone calls for transmission of an access code, and said control unit generates said meet-me page requests only when said access code is received.

14. The telecommunications system of claim 11, wherein said control unit, in response to receiving telephone calls to at least some of the meet-me page system subscribers, monitors the telephone calls for transmission of an access code, and said first processing circuit generates said meet-me page requests only when said access code is received.

15. The telecommunications system of claim 10, wherein said control unit and processor cooperate, in response to receiving a call from a meet-me page system subscriber who has a call held, to signal the meet-me page system subscriber that there is a held call, to wait to receive an accept code from the meet-me page system subscriber, if said accept code is received, to proceed to establish said signal link between said held call and the meet-me page system subscriber, and, if said accept code is not received, to cause a message to be played to the caller that the meet-me page system subscriber cannot be reached and inviting the caller to leave a message in a voice mail box of said meet-me page system subscriber.

16. The telecommunications system of claim 10, wherein said control unit, in cooperation with the processor and in response to receiving a call from a meet-me page system subscriber who has a call held, signals the meet-me page system subscriber that there is a held call, waits to receive an accept code from the meet-me page system subscriber, if said accept code is received, proceeds to establish said signal link between said held call and the meet-me page system subscriber, and, if said accept code is not received, plays a message to the caller that the meet-me page system subscriber cannot be reached and disconnects the call to the meet-me page system subscriber.

17. The telecommunications system of claim 15, wherein after said meet-me unit generates said meet-me page request, said control unit plays a message to the caller indicating that the called subscriber is being paged.

18. The telecommunications system of claim 16, wherein each meet-me page subscriber is assigned a single telephone number, said meet-me unit receives calls to the meet-me subscribers and from the meet-me subscribers over said single number, and said control unit evaluates signals entered over said single telephone number to determine if a call is to the meet-me subscriber or from the meet-me subscriber.

19. A control system for connection to a telephone network, said control system comprising:

(a) communication means for connection to communication facilities of said network for processing telephone calls via said facilities;

(b) control means for controllably routing a call placed to one telephone network address to another telephone address of said network;

(c) memory means for storing signals including signals representative of telephone network addresses; and (d) electronic processing means for processing a telephone call received via said communication means, said processing means including a call processing mode, wherein the electronic processing means responds to an incoming call with a prompt indicating to the caller that said incoming call can be routed to any one of a plurality of locations, each location having a telephone network address represented in said memory means and, responsive to the caller transmitting a command identifying one of said locations, causing said control means to route said incoming call to the telephone network address corresponding to said one of said locations identified by said caller, said processing means also having a meet-me mode wherein the user has a pager and wherein said electronic processing means further comprises means for storing as a user mode control signal a meet-me mode signal and, upon recalling said meet-me mode signal in processing an incoming call, recalling from said memory means a user notification procedure, and controlling a paging system to provide a notice to the user on their pager indicating that the user has a call waiting, and upon receiving a telephone call from the user while the incoming call is waiting, placing the incoming call and the user into telecommunication only after first signalling the user that connection to the incoming call is imminent.

20. A method of receiving and processing incoming telephone calls to a telephone control system, which telephone calls are directed to a user who has a pager, said method comprising the steps of:

(a) processing an incoming telephone call from a caller, and, upon recalling a meet-me mode signal in processing an incoming call, recalling from said memory means a user notification procedure, and controlling a paging system to provide a notice to the user on their pager indicating that the user has a call waiting, and (b) upon processing a telephone call from the user while the incoming call processed in step (a) is waiting, placing the incoming call and the user into telecommunication only after first signalling the user that connection to the incoming call is imminent.

21. The telecommunications system of claim 3, wherein said system handles calls for a plurality of subscribers with each subscriber being able to invoke at least one of a plurality of different call handling modes for handling incoming calls directed to the subscriber, said call handling modes including a meet-me call handling mode, and wherein said meet-me unit responds to an incoming call for a specific meet-me page subscriber by generating a meet-me page request only when said specific meet-me page subscriber has invoked said meet-me call handling mode.

* * * * *